(12) United States Patent
Mitarai et al.

(10) Patent No.: US 8,340,439 B2
(45) Date of Patent: Dec. 25, 2012

(54) IMAGE CONVERSION METHOD AND APPARATUS, AND PATTERN IDENTIFICATION METHOD AND APPARATUS

(75) Inventors: Yusuke Mitarai, Tokyo (JP); Masakazu Matsugu, Yokohama (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/819,003

(22) Filed: Jun. 18, 2010

(65) Prior Publication Data
US 2010/0329556 A1 Dec. 30, 2010

(30) Foreign Application Priority Data
Jun. 26, 2009 (JP) .................. 2009-152870

(51) Int. Cl.
*G06K 9/62* (2006.01)

(52) U.S. Cl. ........ 382/224; 382/170; 382/162; 382/165; 382/117; 382/305; 382/277; 382/260; 382/225; 382/251; 382/253

(58) Field of Classification Search .............. 382/224, 382/170, 162, 165, 117, 260, 305, 277, 225, 382/251, 253
See application file for complete search history.

(56) References Cited

U.S. PATENT DOCUMENTS

| | | | | |
|---|---|---|---|---|
| 6,381,376 | B1 * | 4/2002 | Toyoda | 382/284 |
| 2006/0050957 | A1 * | 3/2006 | Naccari et al. | 382/165 |
| 2007/0160308 | A1 | 7/2007 | Jones et al. | |

FOREIGN PATENT DOCUMENTS

| | | |
|---|---|---|
| JP | 2007-188504 A | 7/2007 |
| JP | 2007-241418 A | 9/2007 |

OTHER PUBLICATIONS

Kenichi Maeda, et al., "Pattern Matching Method with Local Structure", IEICE(D), vol. J68-D, No. 3, pp. 345-352, 1985.

George Arfken, et al., "Gram-Schmidt Orthogonalization", Mathematical Methods for Physicists, 6th Edition, Academic Press, pp. 642-648, 2005.

Michael J. Swain, et al., "Color Indexing", International Journal of Computer Vision, vol. 7, No. 1, pp. 11-32, 1991.

Yossi Rubner, et al., "The Earth Mover's Distance as a Metric for Image Retrieval", International Journal of Computer Vision, vol. 40, No. 2, pp. 99-121, 2000.

(Continued)

*Primary Examiner* — Mike Rahmjoo
(74) *Attorney, Agent, or Firm* — Fitzpatrick, Cella, Harper & Scinto

(57) ABSTRACT

In an image conversion method, a value which reflects the mutual relationship between the classes of pixel patterns each formed from a pixel classified as one of a plurality of classes and peripheral pixels is set as a converted value corresponding to each of the plurality of classes, a pixel of interest is sequentially selected from the input image, and a pixel pattern formed from the selected pixel of interest and a predetermined number of pixels around it is classified as one of the plurality of classes in accordance with a neighboring pattern obtained based on the relationship between the value of the pixel of interest and the values of peripheral pixels located at predetermined relative positions with respect to the pixel of interest. The value of the pixel of interest is converted into a converted value set for a class to which the pixel of interest has been classified.

11 Claims, 23 Drawing Sheets

OTHER PUBLICATIONS

Stuart P. Lloyd, "Least Squares Quantization in PCM", IEEE Transactions on Information Theory, IT-2, pp. 129-137, 1982.

Jianbo Shi, et al., "Normalized Cuts and Image Segmentation", IEEE Transactions on Pattern Analysis and Machine Intelligence, vol. 22, No. 8, pp. 888-905, 2000.

Sam T. Roweis, et al., "Nonlinear Dimensionality Reduction by Locally Linear Embedding", Science, vol. 290, pp. 2323-2326, 2000.

Xiaofei He, et al., "Locality Preserving Projections", Advances in Neural Information Processing Systems, vol. 16, pp. 585-591, 2003.

Guoying Zhao, et al., "Dynamic Texture Recognition Using Volume Local Binary Patterns with an Application to Facial Expressions", IEEE Transactions on Pattern Analysis and Machine Intelligence, vol. 29, No. 6, pp. 915-928, 2007.

T. Ojala, et al., "A Comparative Study of Texture Measures with Classification Based on Feature Distributions", Pattern Recognition, vol. 29, pp. 51-59, 1996.

R. Zabih, et al., "A Non-parametric Approach to Visual Correspondence", IEEE Transactions on Pattern Analysis and Machine Intelligence, 1996.

S. Marcel, et al., "On the Recent Use of Local Binary Patterns for Face Authentication", International Journal on Image and Video Processing Special Issue on Facial Image Processing, 2007.

Koji Kotani, et al., "Face Recognition Using Vector Quantization Histogram Method", International Conference on Image Processing, vol. 2, pp. II-105-II-108, 2002.

J.C. Gower, "Some Distance Properties of Latent Root and Vector Methods used in Multivariate Analysis", Biometrika, vol. 53, pp. 325-338, 1966.

Robert W. Floyd, "Algorithm 97:Shortest Path", Communications of the ACM, vol. 5, Issue 6, p. 345, 1966.

H. Jin, et al., "Face Detection Using Improved LBP under Bayesian Framework", International Conference on Image and Graphics, pp. 306-309, 2004.

T. Maenpaa, et al., "Texture Classification by Multi-Predicate Local Binary Pattern Operators", International Conference of Pattern Recognition, vol. 3, pp. 951-954, 2000.

T. Ojala, et al., "Multiresolution Gray-scale and Rotation Invariant Texture Classification with Local Binary Patterns", IEEE Transactions on Pattern Analysis and Machine Intelligence, vol. 24, pp. 971-987, 2002.

Joshua B. Tenenbaum, et al., "A Global Geometric Framework for Nonlinear Dimensionality Reduction", Science, vol. 290, pp. 2319-2323, 2000.

Teuvo Kohonen, "The Self-Organizing Map", Proceedings of the IEEE, vol. 789, No. 9, pp. 1464-1480, 1990.

\* cited by examiner

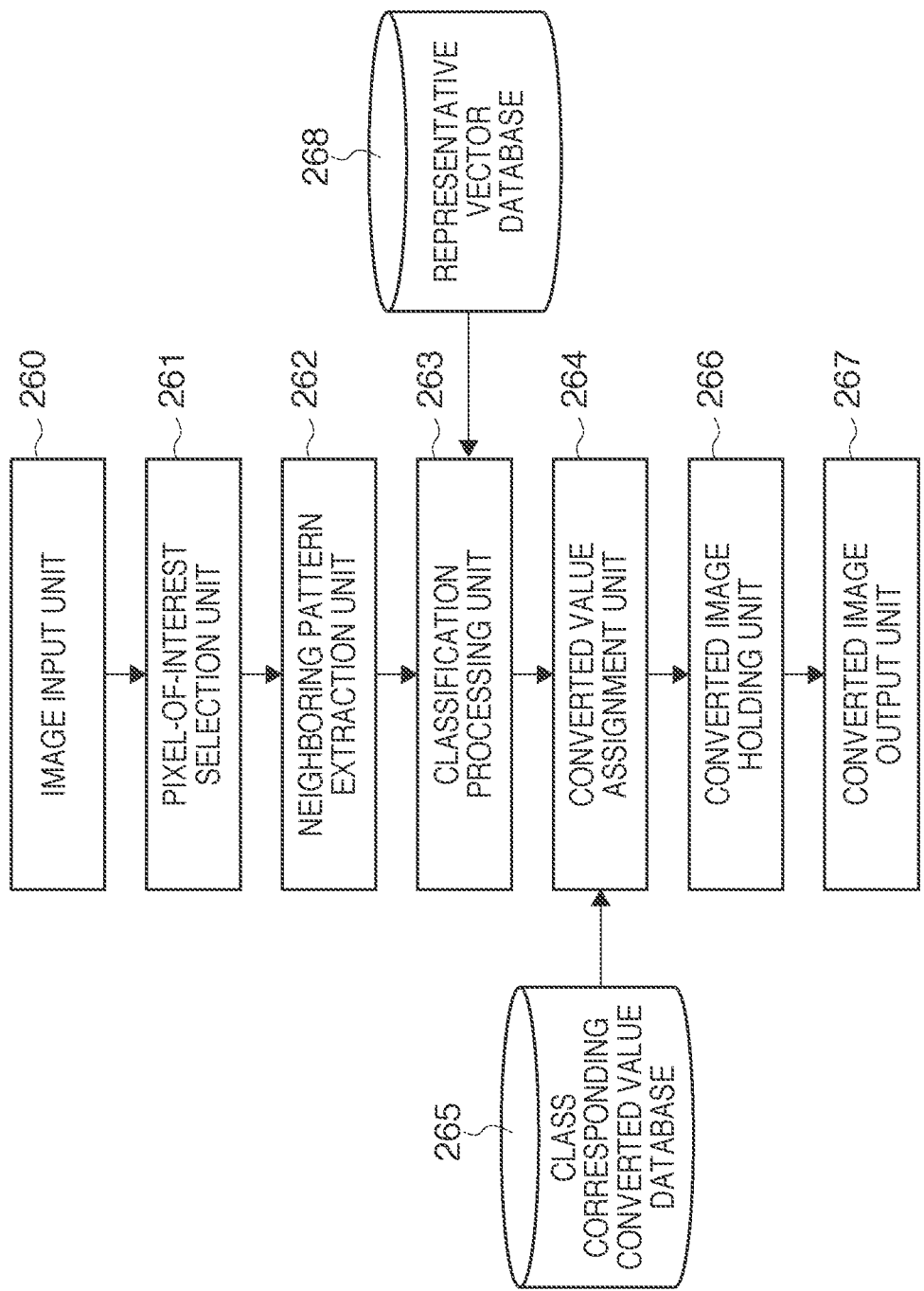

| 255 | 135 | 29  | 253 | 176 | 84  | 169 |
| --- | --- | --- | --- | --- | --- | --- |
| 255 | 221 | 214 | 225 | 215 | 68  | 248 |
| 85  | 96  | 71  | 146 | 249 | 146 | 214 |
| 173 | 158 | 205 | 164 | 77  | 38  | 94  |
| 178 | 187 | 210 | 96  | 60  | 89  | 43  |
| 255 | 253 | 19  | 222 | 174 | 5   | 56  |
| 48  | 209 | 255 | 255 | 231 | 211 | 107 |

FIG. 24A

| 0 | 0.1 | 0 |
|---|---|---|
| 0.1 | 0.6 | 0.1 |
| 0 | 0.1 | 0 |

FIG. 24B

| 3 | 0 | 1 | 3 | 1 |
|---|---|---|---|---|
| 1 | 0 | 4 | 2 | 2 |
| 0 | 1 | 3 | 1 | 2 |
| 0 | 1 | 0 | 1 | 1 |
| 1 | 1 | 2 | 3 | 2 |

→ blur →

FIG. 24C

|  | 0.3 | 0 | 0.1 | 0.3 | 0.1 |  |
|---|---|---|---|---|---|---|
| 0.3 | 1.9 | 0.4 | 1.3 | 2.2 | 1.1 | 0.1 |
| 0.1 | 0.9 | 0.6 | 3 | 2.2 | 1.7 | 0.2 |
| 0 | 0.2 | 1 | 2.4 | 1.4 | 1.6 | 0.2 |
| 0 | 0.2 | 0.8 | 0.7 | 1.1 | 1.1 | 0.1 |
| 0.1 | 0.7 | 1 | 1.6 | 2.3 | 1.6 | 0.2 |
|  | 0.1 | 0.1 | 0.2 | 0.3 | 0.2 |  |

IMAGE CONVERSION METHOD AND APPARATUS, AND PATTERN IDENTIFICATION METHOD AND APPARATUS

BACKGROUND OF THE INVENTION

1. Field of the Invention

The present invention relates to an image conversion method and apparatus and a pattern identification method and apparatus which are robust against a variation in the brightness or contrast of an image caused by a difference of illumination environment or the like.

2. Description of the Related Art

As image conversion methods robust against a variation in the brightness or contrast of an image, for example, LBP (Local Binary Pattern) of reference 1 and CT (Census Transform) of reference 2 have received attention. These methods fundamentally convert the value at a position corresponding to a pixel of interest into a sequence of a plurality of numerical values or one scalar value calculated from them based on the result of luminance value comparison between the pixel of interest and each neighboring pixel. Improved methods (reference 3) and pattern identification methods using these conversion methods have also been proposed (Japanese Patent Laid-Open Nos. 2007-188504 and 2007-241418).

In CT, the obtained numerical value sequence is directly used as a converted value. In LBP, one scalar value calculated based on the numerical value sequence is used as a converted value. This will be described using a detailed example. FIGS. 3A to 3C show local images used in LBP, each having 3×3 pixels with a pixel of interest at the center, and the luminance values of the pixels. In LBP, a pixel of interest is sequentially selected from a conversion target image in the raster scan order, and a converted value for the selected pixel of interest is obtained.

For example, in FIG. 3A, the luminance value of a pixel $30a$ of interest is compared with those of eight neighboring pixels $31a$ to $38a$. If the luminance value of a neighboring pixel is larger than that of the pixel of interest, 1 is obtained. Otherwise, 0 is obtained. The obtained values are simply arranged. The result is "00000010". In LBP, this sequence is regarded as an 8-bit numerical value so that the value "00000010"=2 is obtained as a converted value. At this time, since the absolute magnitude of the difference between the compared values is not taken into consideration, robustness against a variation in brightness or the like is ensured. In this method, however, the numerical value "2" after conversion is merely an index, and the value "2" itself has no particular significance.

FIG. 3B shows a pattern obtained by rotating the pattern in FIG. 3A clockwise by 90°. In LBP, the converted value corresponding to the pattern in FIG. 3A is 2, and that corresponding to the pattern in FIG. 3B is 128. That is, the value largely changes. In LBP, a converted value is only a symbol describing each pattern. For example, calculation between numerical values to obtain, for example, the difference between numerical values has no significance. Additionally, the pattern in FIG. 3B, which is a slight variation of the pattern in FIG. 3A, yields a converted value 64 times as large. As described above, a conversion method such as LBP may largely change the converted value for a pattern variation such as rotation, and is therefore supposed to be less robust.

In CT, an 8-bit numerical value is regarded as an eight-dimensional vector value. The values of the patterns in FIGS. 3A and 3B are "00000010" and "10000000", respectively. In this case, the Euclidean distance between the converted values in FIGS. 3A and 3B is $\sqrt{2}$. That is, in CT, a converted value or the result of calculation between numerical values is significant as compared to normal LBP.

In CT, however, the Euclidean distance between a converted value ("00010000") corresponding to the pattern shown in FIG. 3C and each of the converted values corresponding to the patterns in FIGS. 3A and 3B is $\sqrt{2}$. That is, the converted values corresponding to the three patterns in FIGS. 3A to 3C hold the same relationship in any combination. From the viewpoint of a pattern identification method using a converted image, as described in Japanese Patent Laid-Open No. 2007-241418, it is supposed to be preferable that the converted values of similar patterns be similar, and those of nonsimilar patterns be different. When viewed from the pattern in FIG. 3A, the pattern in FIG. 3B is the result of 90° clockwise rotation, and the pattern in FIG. 3C is the result of 135° counterclockwise rotation. That is, the pattern in FIG. 3C varies from the pattern in FIG. 3A more largely than the pattern in FIG. 3B. For this reason, the relationship of the converted value corresponding to the pattern in FIG. 3A to that corresponding to the pattern in FIG. 3C is preferably farther than that to the converted value corresponding to the pattern in FIG. 3B.

In CT, since a converted value corresponding to a pixel of interest is a high-dimensional value, a problem called "curse of dimensionality" arises at high probability in pattern identification using a converted image.

That is, LBP or CT is robust against a variation in brightness or the like. However, since a converted value has little significance as a numerical value, or is a high-dimensional value, it is impossible to preferably reflect the difference between conversion source patterns.

LBP or CT can be regarded as a kind of vector quantization in a broad sense. Vector quantization is sometimes used in the field of pattern identification, as in reference 4.

The technique described in reference 4 identifies a pattern using the frequency histogram of vectors that match representative vectors after vector quantization. In this technique, when indices corresponding to two patterns are handled as numerical values, only a less significant result is obtained from calculation between the numerical values to obtain, for example, the difference between the indices, like LBP.

In the method using vector quantization, a representative vector itself that matches is also usable as a converted value. In this case, however, the converted value is a vector value of relatively high dimensions (the same dimensions as those of a conversion source pattern), as in CT.

[Reference 1] T. Ojala, M. Pietikainen, D. Harwood, "A Comparative Study of Texture Measures with Classification Based on Feature Distributions", Pattern Recognition, Vol. 29, pp. 51-59, 1996

[Reference 2] R. Zabih, J. Woodfill, "A Non-parametric Approach to Visual Correspondence", IEEE Transactions on Pattern Analysis and Machine Intelligence, 1996

[Reference 3] S. Marcel, Y. Rodriguez, G. Heusch, "On the Recent Use of Local Binary Patterns for Face Authentication", International Journal on Image and Video Processing Special Issue on Facial Image Processing, 2007

[Reference 4] Koji Kotani, Chen Qiu, Tadahiro Ohmi, "Face Recognition Using Vector Quantization Histogram Method", International Conference on Image Processing, Vol. 2, pp. 11-105-11-108, 2002

[Reference 5] J. C. Gower, "Some Distance Properties of Latent Root and Vector Methods used in Multivariate Analysis", Biometrika, Vol. 53, pp. 325-338, 1966

[Reference 6] Robert W. Floyd, "Algorithm 97: Shortest Path", Communications of the ACM, Vol. 5, Issue 6, p. 345, 1966

[Reference 7] H. Jin, Q. Liu, H. Lu, X. Tong, "Face Detection Using Improved LBP under Bayesian Framework", International Conference on Image and Graphics, pp. 306-309, 2004

[Reference 8] T. Maenpaa, M. Pietikainen, T. Ojala, "Texture Classification by Multi-Predicate Local Binary Pattern Operators", International Conference of Pattern Recognition, Vol. 3, pp. 951-954, 2000

[Reference 9] T. Ojala, M. Pietikainen, T. Maenpaa, "Multi-resolution Gray-scale and Rotation Invariant Texture Classification with Local Binary Patterns", IEEE Transactions on Pattern Analysis and Machine Intelligence, Vol. 24, pp. 971-987, 2002

[Reference 10] Joshua B. Tenenbaum, Vin de Silva, John C. Langford, "A Global Geometric Framework for Nonlinear Dimensionality Reduction", Science, Vol. 290, pp. 2319-2323, 2000

[Reference 11] Teuvo Kohonen, "The Self-Organizing Map", Proceedings of The IEEE, Vol. 789, No. 9, pp. 1464-1480, 1990

[Reference 12] Kenichi Maeda and Sadakazu Watanabe, "Pattern Matching Method with Local Structure", IEICE (D), Vol. J68-D, No. 3, pp. 345-352, 1985

[Reference 13] George Arfken, Hans Weber, "Gram-Schmidt Orthogonalization", Mathematical Methods for Physicists, 6th Edition, Academic Press, pp. 642-648, 2005

[Reference 14] Michael. J. Swain, Dana. H. Ballard, "Color Indexing", International Journal of Computer Vision, Vol. 7, No. 1, pp. 11-32, 1991

[Reference 15] Yossi Rubner, Carlo Tomasi, Leonidas J. Guibas, "The Earth Mover's Distance as a Metric for Image Retrieval", International Journal of Computer Vision, Vol. 40, No. 2, pp. 99-121, 2000

[Reference 16] Stuart P. Lloyd, "Least Squares Quantization in PCM", IEEE Transactions on Information Theory, IT-2, pp. 129-137, 1982

[Reference 17] Jianbo Shi, Jitendra Malik, "Normalized Cuts and Image Segmentation", IEEE Transactions on Pattern Analysis and Machine Intelligence, Vol. 22, No. 8, pp. 888-905, 2000

[Reference 18] Sam T. Roweis, Lawrence K. Saul, "Nonlinear Dimensionality Reduction by Locally Linear Embedding", Science, Vol. 290, pp. 2323-2326, 2000

[Reference 19] XiaofeiHe, Partha Niyogi, "Locality Preserving Projections", Advances in Neural Information Processing Systems, Vol. 16, pp. 585-591, 2003

[Reference 20] Guoying Zhao, Matti Pietikainen, "Dynamic Texture Recognition Using Volume Local Binary Patterns with an Application to Facial Expressions", IEEE Transactions on Pattern Analysis and Machine Intelligence, Vol. 29, No. 6, pp. 915-928, 2007

Note that references 5 to 20 are referred in "DESCRIPTION OF THE EMBODIMENTS".

As described above, to implement pattern identification robust against a variation in brightness or the like, an image conversion method is demanded, which allows converted values having dimensions lower to some extent to preferably express the difference between conversion source patterns while maintaining the effect of robustness against a variation in brightness or the like.

SUMMARY OF THE INVENTION

According to an aspect of the present invention, there are provided an image conversion method and apparatus and a pattern identification method and apparatus, which allow converted values having dimensions lower to some extent to preferably express the difference between conversion source patterns in image conversion using LBP or vector quantization.

According to one aspect of the present invention, there is provided an image conversion method comprising: a setting step of setting a value as a converted value corresponding to each of a plurality of classes, the value reflecting a mutual relationship between classes of pixel patterns each formed from a pixel classified as one of the plurality of classes and peripheral pixels; a selection step of sequentially selecting a pixel of interest from an input image; a classification step of classifying the selected pixel of interest as one of the plurality of classes in accordance with a neighboring pattern obtained based on a relationship between a value of the pixel of interest and values of peripheral pixels located at predetermined relative positions with respect to the pixel of interest; and a conversion step of converting the value of the pixel of interest into a converted value set for a class to which the pixel of interest has been classified in the classification step.

According to another aspect of the present invention, there is provided an image conversion apparatus comprising: a setting unit configured to set a value as a converted value corresponding to each of a plurality of classes, the value reflecting a mutual relationship between classes of pixel patterns each formed from a pixel classified as one of the plurality of classes and peripheral pixels; a selection unit configured to sequentially select a pixel of interest from an input image; a classification unit configured to classify the selected pixel of interest as one of the plurality of classes in accordance with a neighboring pattern obtained based on a relationship between a value of the pixel of interest and values of peripheral pixels located at predetermined relative positions with respect to the pixel of interest; and a conversion unit configured to convert the value of the pixel of interest into a converted value set for a class to which the pixel of interest has been classified by the classification unit.

Further features of the present invention will become apparent from the following description of exemplary embodiments with reference to the attached drawings.

BRIEF DESCRIPTION OF THE DRAWINGS

FIG. 2 is a block diagram showing the process blocks of an image conversion method according to the fifth embodiment;

FIGS. 24A to 24C are views showing spatial filters that convolute a two-dimensional histogram.

DESCRIPTION OF THE EMBODIMENTS

The embodiments of the present invention will now be described with reference to the accompanying drawings.

First Embodiment

Figure 3A:
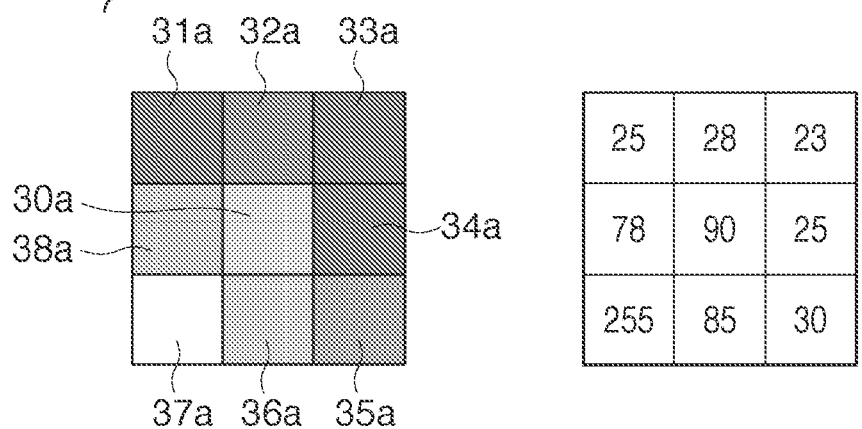
FIGS. 3A to 3C are views showing examples of local images used to obtain converted values, each of which includes 3×3 pixels with a pixel of interest at the center.
Figure 3B:
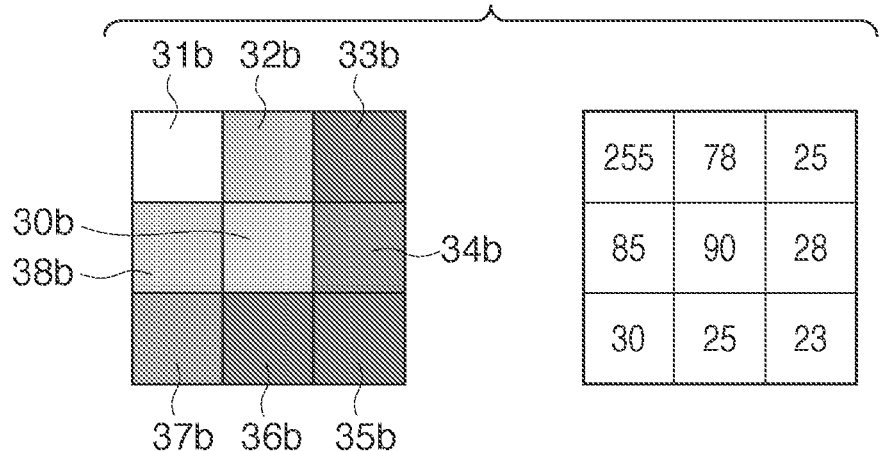
Figure 3C:
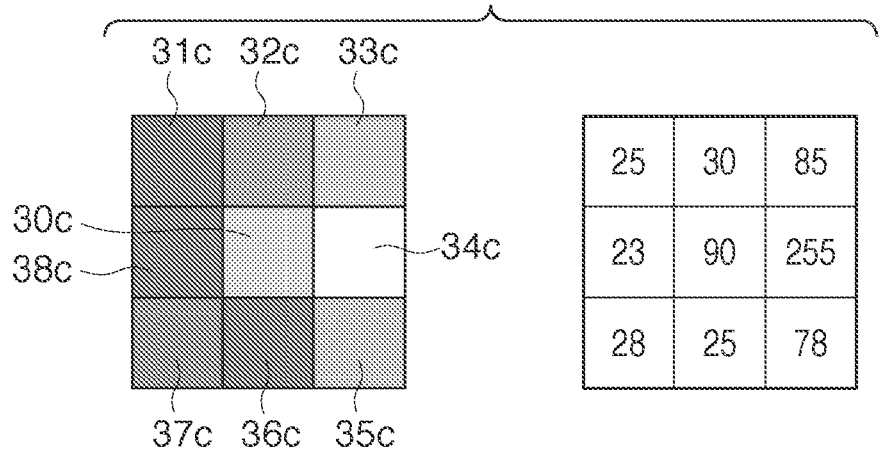

An outline of the first embodiment will be described first. In an image conversion method according to this embodiment shown in FIGS. 1 and 4, an image input unit 10 sequentially selects a pixel of interest of an input image (steps 40 and 41). A neighboring pattern extraction unit 12 acquires a neighboring pattern based on the values of peripheral pixels at predetermined positions relative to the position of the selected pixel of interest (step 42). As the peripheral pixels, eight pixels at the periphery of a 3×3 pixel pattern with a pixel of interest at the center as shown in FIGS. 3A to 3C are usable.

Next, a classification processing unit 13 classifies the neighboring pattern as one of a plurality of classes defined in advance (step 43). In the first embodiment, classification is performed based on the pixel value comparison result between the selected pixel of interest and the peripheral pixels. This will be explained later in detail.

Based on the mutual relationship between the plurality of classes, a converted value assignment unit 14 refers to a value predetermined for each of the plurality of classes, and converts the value of the pixel of interest into a value predetermined for the class determined above (step 44). At this time, the converted value assignment unit 14 refers to a class corresponding converted value database 15 in which converted values are registered for the plurality of classes in correspondence with the mutual relationship between the plurality of classes. The converted value is the distance or similarity between the plurality of classes. In the first embodiment, the converted value is the distance or similarity between the classes, which is obtained based on the pattern of the pixel values of the pixel of interest classified as one of the classes and a predetermined number of peripheral pixels around it. This will be described later in detail.

An example will be described below as the first embodiment of the present invention, in which a grayscale image corresponding to an extracted human face is input and converted robustly against a variation in brightness or the like. An example of a pattern identification method of identifying a converted image as the face image of a specific person will also be described.

Figure 1:
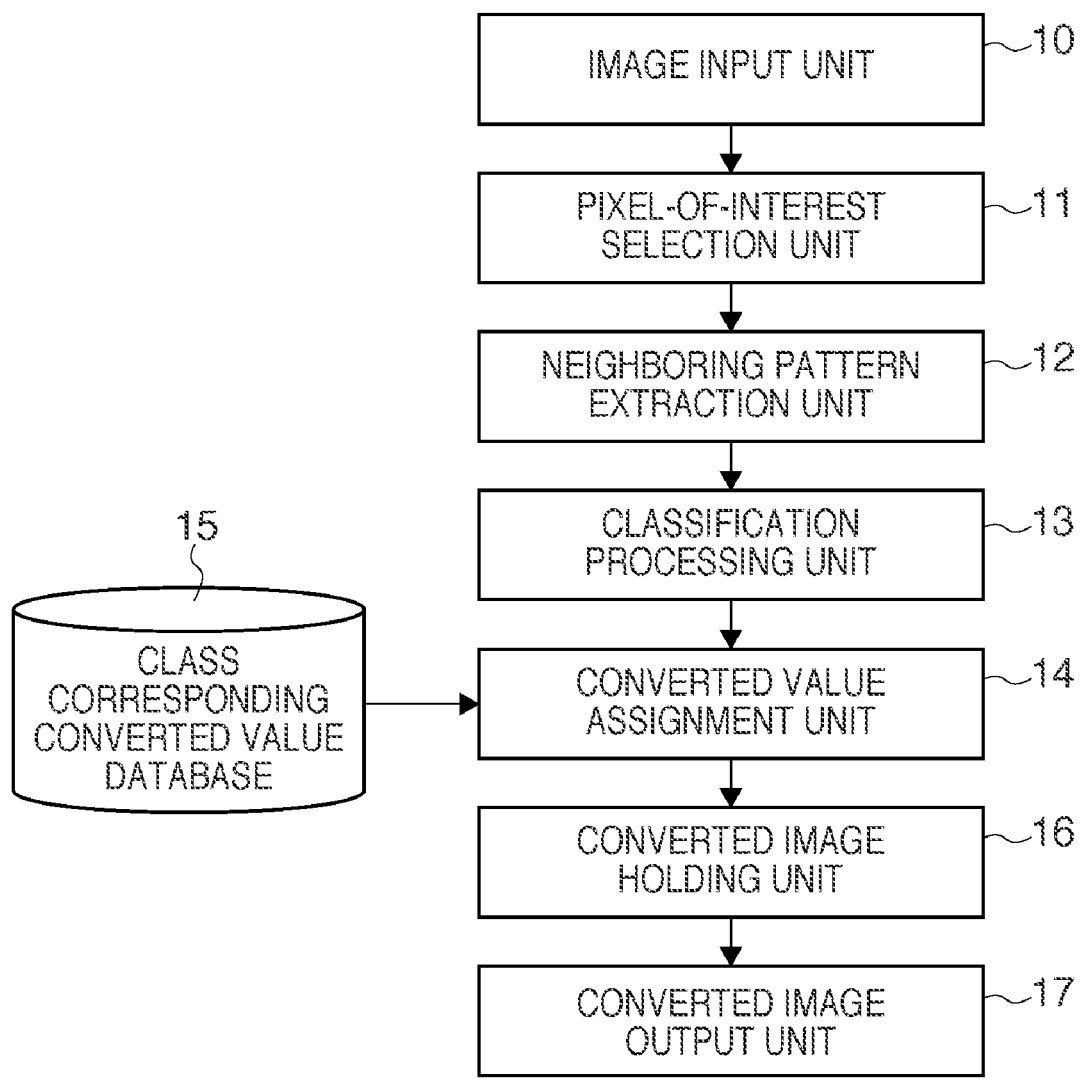
FIG. 1 is a block diagram showing the process blocks of an image conversion method according to the first embodiment.
Figure 4:
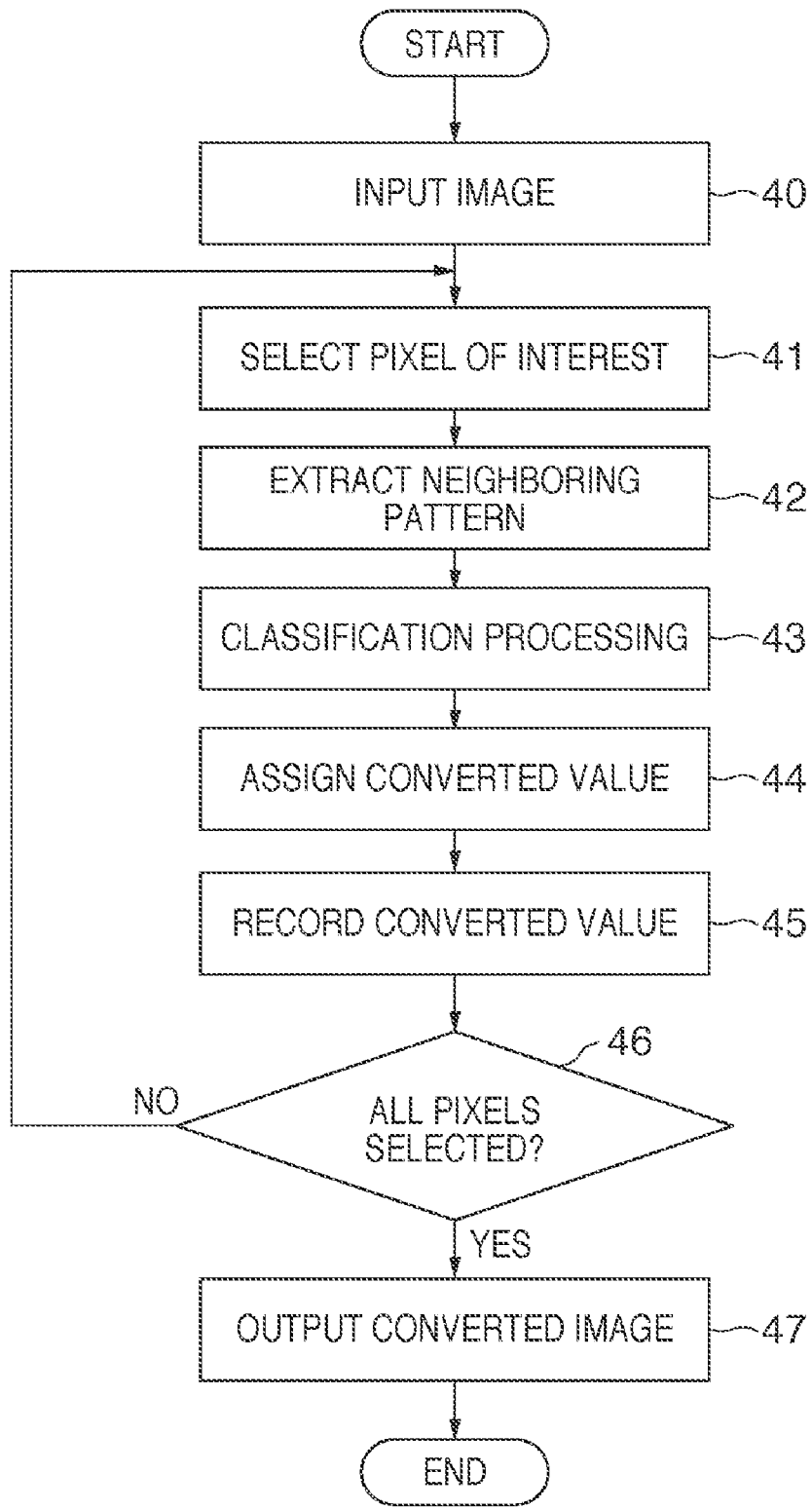
FIG. 4 is a flowchart illustrating processing of the image conversion method according to the first embodiment.

FIG. 1 is a block diagram showing the process blocks of an image conversion method according to the first embodiment. FIG. 4 is a flowchart illustrating the processing procedure of the image conversion method according to the first embodiment.

First, the image input unit 10 inputs a grayscale image (to be simply referred to as an input image hereinafter) corresponding to an extracted human face and including 20×20 pixels in the vertical and horizontal directions (step 40).

A pixel-of-interest selection unit 11 sequentially selects a pixel of interest in the raster scan order from the upper left corner of the input image. The neighboring pattern extraction unit 12 at the succeeding stage uses eight neighboring pixel values around the pixel of interest. To do this, eight neighboring pixels need to exist around the pixel of interest. Hence, the pixel-of-interest selection unit 11 sequentially selects a pixel of interest from a place except one pixel line of each of the upper, lower, left, and right edges of the input image (step 41).

Subsequently, the neighboring pattern extraction unit 12 extracts a 3×3 pixel pattern including, at the center, the pixel of interest selected by the pixel-of-interest selection unit 11 (step 42).

The classification processing unit 13 compares the pixel of interest with each of the eight neighboring pixels in the extracted 3×3 pixel pattern, thereby obtaining a numerical value sequence of eight {0,1}s by the same criterion as in LBP or CT. Each of 256 numerical value sequence patterns each formed from eight {0,1}s is defined as one class. The extracted 3×3 pixel pattern is classified as a class corresponding to the obtained numerical value sequence. As in LBP, the numerical value sequence is regarded as an 8-bit numerical value and converted into a decimal number which expresses the number of a class. That is, the classification processing unit 13 classifies the 3×3 pixel pattern extracted by the neighboring pattern extraction unit 12 as one of classes 0 to 255 (step 43).

Processing up to this point is the same as in LBP or CT. However, the next processing of the converted value assignment unit 14 is different from LBP or CT. In this embodiment, the converted value assignment unit 14 refers to the class corresponding converted value database 15, and reads out a value corresponding to the class determined by the classification processing unit 13. The value is used as a converted value corresponding to the pixel of interest selected by the pixel-of-interest selection unit 11 (step 44). The class corresponding converted value database 15 to be referred here records a two-dimensional vector value formed from two numerical values for each class as a converted value corresponding to the class. The two-dimensional vector values are determined in advance based on the mutual relationship between the classes. How to determine the two-dimensional vector values will be described later in detail.

A converted image holding unit 16 holds the converted value obtained by the converted value assignment unit 14 as the converted value corresponding to the pixel of interest selected by the pixel-of-interest selection unit 11 (step 45).

With the above-described processing, the converted image holding unit 16, records the converted value that is a two-dimensional vector value in correspondence with the pixel of interest selected by the pixel-of-interest selection unit 11. Such converted values are obtained for 18×18 pixels. If an unselected pixel remains, the process returns to the pixel-of-interest selection processing. If all pixels have been processed, the process advances to the next processing (step 46).

When converted values are recorded for all the 18×18 pixels, a converted image output unit 17 outputs the result recorded in the converted image holding unit 16 to the outside (step 47). The image conversion processing is thus completed. With the above-described processing, an image in which two-dimensional vector values obtained for the pixels of interest are arranged in correspondence with the 18×18 pixels is output to the outside.

Figure 7:
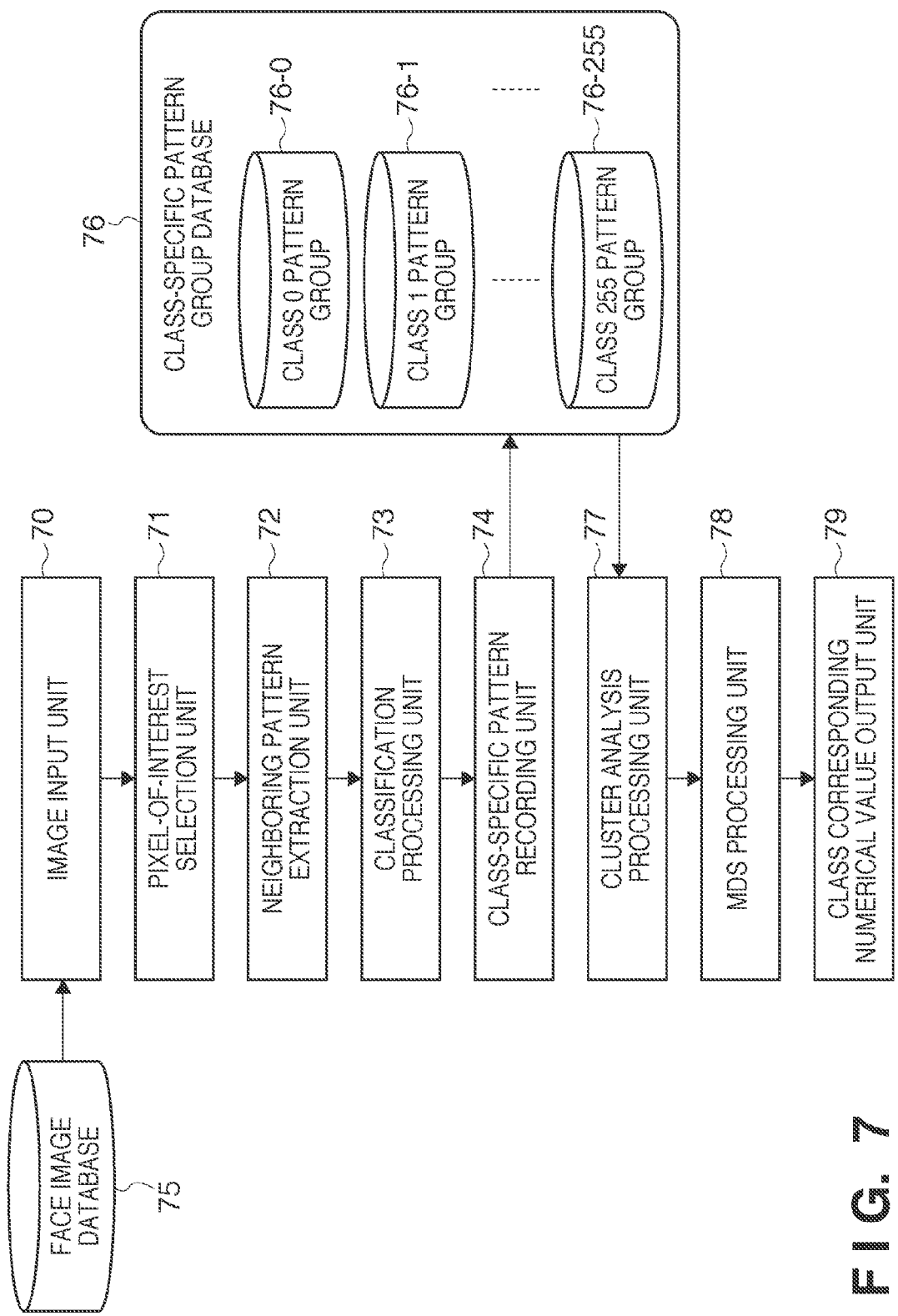
FIG. 7 is a block diagram showing the process blocks of a method of obtaining converted values corresponding to classes based on the mutual relationship between the classes according to the first embodiment.
Figure 8:
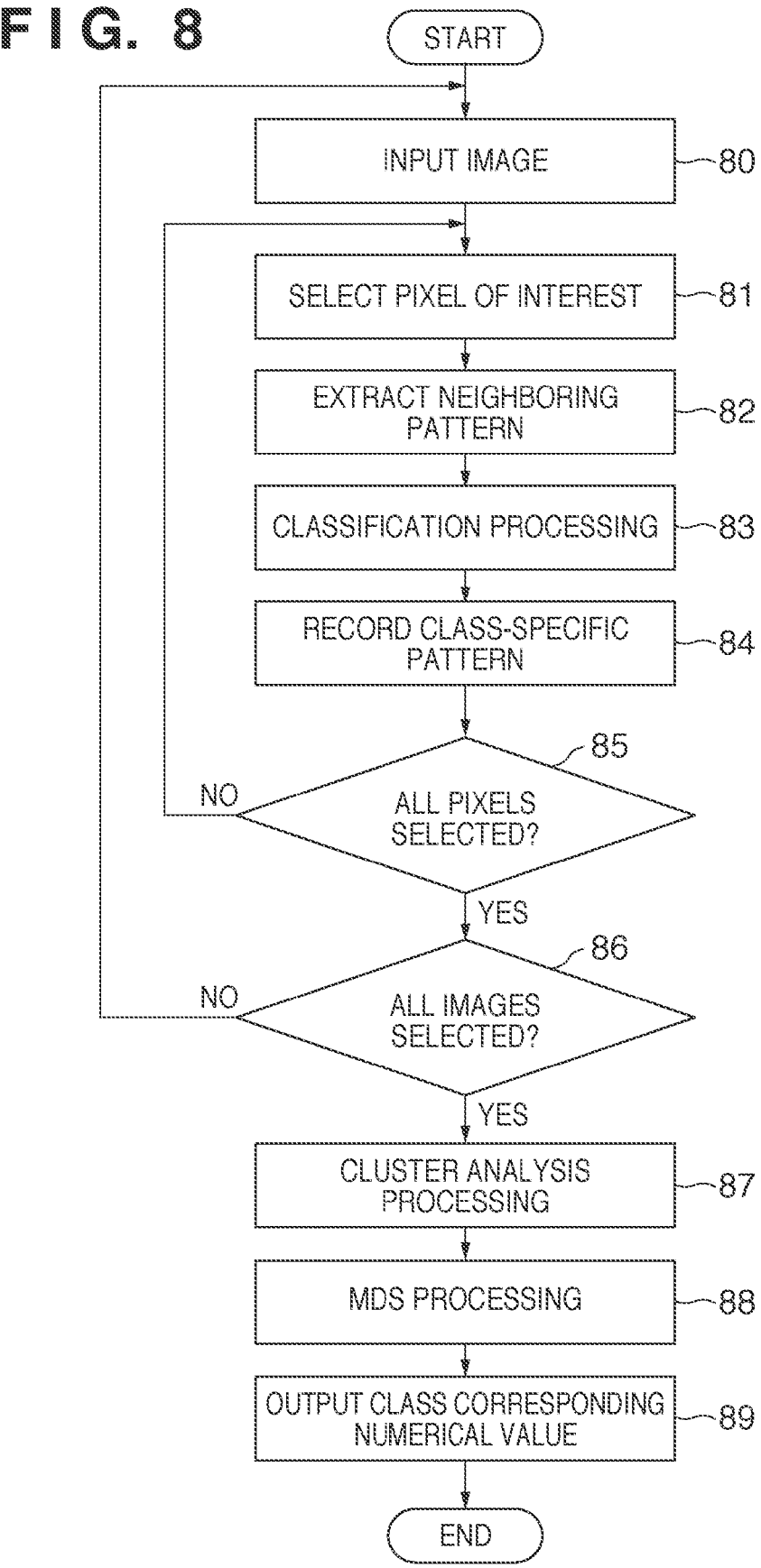
FIG. 8 is a flowchart illustrating processing of the method of obtaining converted values corresponding to classes based on the mutual relationship between the classes according to the first embodiment.

How to obtain converted values corresponding to classes will be explained next. In this embodiment, cluster analysis is applied to a class-specific pattern sample group prepared in advance, thereby obtaining the cluster distance or cluster similarity between the plurality of classes as the distance or similarity between the classes. FIG. 7 is a block diagram showing the process blocks configured to obtain converted values corresponding to classes based on the mutual relationship between the classes according to this embodiment. FIG. 8 illustrates the processing procedure of the method of obtaining the converted value.

First, an image input unit 70 selectively inputs one of a number of images held in a face image database 75. The face image database 75 holds a lot of grayscale images of extracted faces of various persons, each including 20×20 pixels in the vertical and horizontal directions. The face images held in the face image database 75 are preferably normalized to almost the same size and rotation angle, and their brightness and contrast are also preferably adjusted to almost the same conditions. Especially, the brightness and contrast of an image are preferably normalized because they influence processing of a cluster analysis processing unit 77 to be described later. In this embodiment, 2,000 face images (for about 200 persons: eight to 12 images per person) each normalized based on the width between eyes, the tilt of a line segment that connects eyes, and the average luminance value/standard deviation of the image are used. The image input unit 70 selectively inputs each of the 2,000 face images. The images are input in the order of, for example, indices given to the images (step 80).

A pixel-of-interest selection unit 71, neighboring pattern extraction unit 72, and classification processing unit 73 of the next stages are the same as the pixel-of-interest selection unit 11, neighboring pattern extraction unit 12, and classification processing unit 13 in FIG. 1, and a description of the processing will not be repeated (steps 81 to 83).

A class-specific pattern recording unit 74 records, in a class-specific pattern group database 76, an extracted 3×3 pixel pattern as nine numerical values arranged from the upper left corner in the raster scan order based on the classification result (step 84).

The processing in steps 81 to 84 is executed for 18×18 pixels to be selected as a pixel of interest of one input image. If an unselected pixel remains, the process returns to the pixel-of-interest selection processing. If all pixels have been processed, the process advances to the next processing (step 85).

With the above-described processing, 18×18 patterns each including 3×3 pixels are recorded, in the class-specific pattern group database 76, as pattern groups corresponding to the classes of the respective patterns per image. This processing is executed for all images held in the face image database 75. If an image remains that is not input, the process returns to the image input processing. If all images have been processed, the process advances to the next cluster analysis processing (step 86).

Up to this point, a number of 3×3 pixel patterns are recorded in the class-specific pattern group database 76 for the classes corresponding to the patterns. If a class for which no pattern is recorded exists, the next cluster analysis processing suffers. In this case, an image is added to the face image database 75, and the processing is continued until at least one pattern is recorded for each class.

Subsequently, the cluster analysis processing unit 77 obtains the cluster distances between the classes using a number of patterns recorded in the class-specific pattern group database 76 by the above-described processing. In this embodiment, the cluster distance is obtained by the group average method.

More specifically, for example, the cluster distance between a class i and a class j ($i \neq j$) is obtained in accordance with the following procedure. First, distances are obtained in all combinations of all 3×3 pixel patterns recorded for a class i pattern group 76-$i$ and a class j pattern group 76-$j$. Any distance scale is usable as the distance between patterns. In this embodiment, a Euclidean distance is used. The obtained distances are averaged to obtain the cluster distance between the class i and the class j. The cluster analysis processing unit 77 obtains such cluster distances in all class combinations (step 87).

In this embodiment, since the number of classes is 256, 256×255/2=32,640 cluster distances are obtained. Although this processing needs a very long calculation time, the calculation can be done offline in advance. That is, converted value setting for each class is performed before image conversion, the calculation poses no problem at the time of conversion. The method of obtaining the cluster distance is not limited to the group average method. For example, a cluster distance scale by the nearest neighbor method, farthest neighbor method, centroid method, median method, flexible method, or Ward method may be used.

Next, an MDS processing unit 78 maps points corresponding to the classes on a target space having predetermined dimensions using the cluster distances between the classes (step 88). The points corresponding to the classes allow the Euclidean distances between the points on the target space to preserve the cluster distances between the classes as much as possible. This processing to obtain obtaining converted values preserves the mutual relationship between the classes (in this embodiment, the distance between the classes) as much as possible. The position coordinates of a point corresponding to each class represent a converted value corresponding to the class. In this embodiment, MDS (Multi-Dimensional Scaling) is used to obtain such points (for MDS, see reference 5).

The number of dimensions of the target space is (number of classes—1) at maximum. That is, in this embodiment, the target space has 255 dimensions (the number of dimensions may be 255 or less depending on the conditions of the cluster distances between the classes). A higher-dimensional target space can preserve the cluster distances between the classes at a higher accuracy. However, if the dimension of the target space is too high, the dimension of a converted value becomes higher. This causes so-called "curse of dimensionality" in pattern identification processing later. Hence, the dimension of the target space is preferably low to some extent. In this embodiment, a two-dimensional target space is used. However, the number of dimensions need only be at least one. Most preferably, the number of dimensions is determined using so-called Cross Validation.

With the processing of the MDS processing unit 78, position coordinates on the target space corresponding to the 256 classes are obtained. In this embodiment, since the number of dimensions of the target space is two, the position coordinates are expressed by two numerical values. Position coordinates represented by two numerical values for each class indicate the converted value of a two-dimensional vector value corresponding to each class, which is determined in advance based on the mutual relationship between the classes. Although the calculation cost of MDS processing is relatively high, the processing can be done offline in advance. In actual image conversion, the values obtained in advance are referred to. It is therefore possible to suppress the calculation cost low at the time of image conversion.

Finally, a class corresponding numerical value output unit 79 outputs the two-dimensional coordinate values obtained by the MDS processing unit 78 in correspondence with the classes to the outside (step 89). The output two-dimensional coordinate values corresponding to the classes are held in the class corresponding converted value database 15. Upon image conversion, the converted value assignment unit 14 refers to the values and uses them as converted values corresponding to the classes.

As described above, class-specific pattern sample groups are prepared in advance in the class-specific pattern group database 76. Converted values defined based on the mutual relationship between the plurality of classes are determined to preserve the distance or similarity between the plurality of classes as much as possible. As a converted value, a scalar value or a vector value is used.

In this embodiment, converted values corresponding to the classes are consequently determined based on the distances between the pattern groups (the mutual relationship between the classes) as the class generation sources, and used for conversion. This allows image conversion capable of preferably expressing the difference between conversion source patterns using values having dimensions lower to some extent such that, for example, similar converted values represent similar patterns.

An example of a pattern identification method will be explained next, which converts a grayscale image corresponding to an extracted human face and including 20×20 pixels in the vertical and horizontal directions using the above-described image conversion method, and identifies the converted image as the face image of a specific person.

Figure 5:
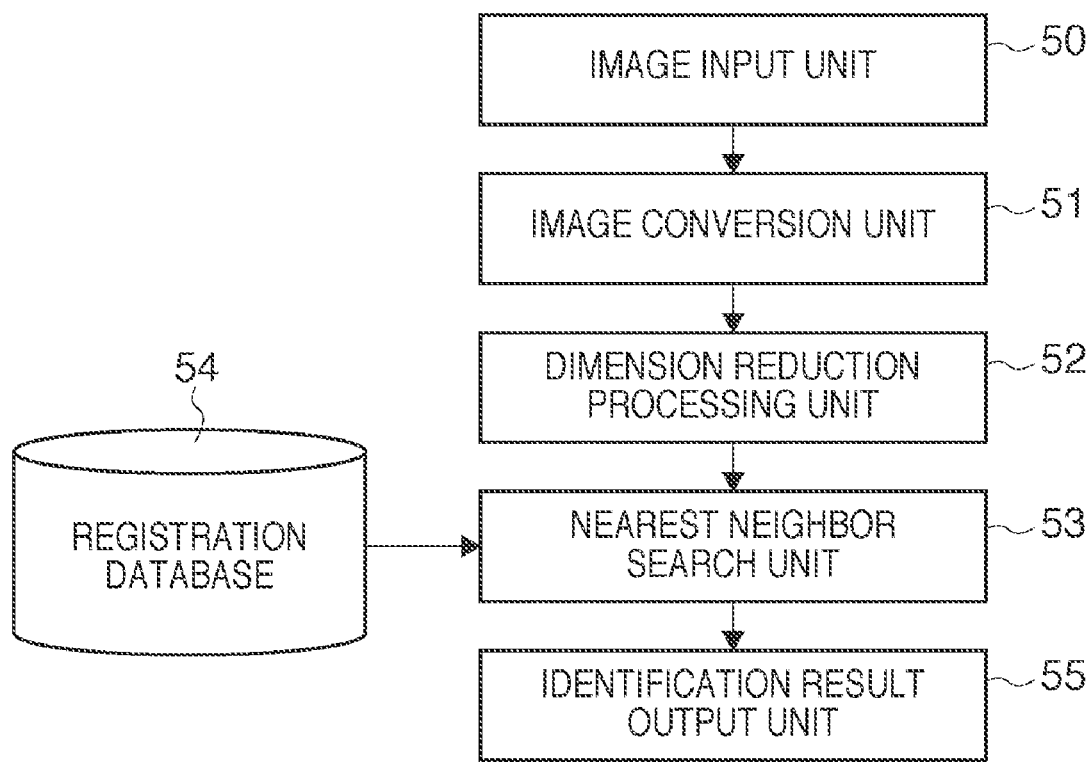
FIG. 5 is a block diagram showing the process blocks of a pattern identification method according to the first embodiment.
Figure 6:
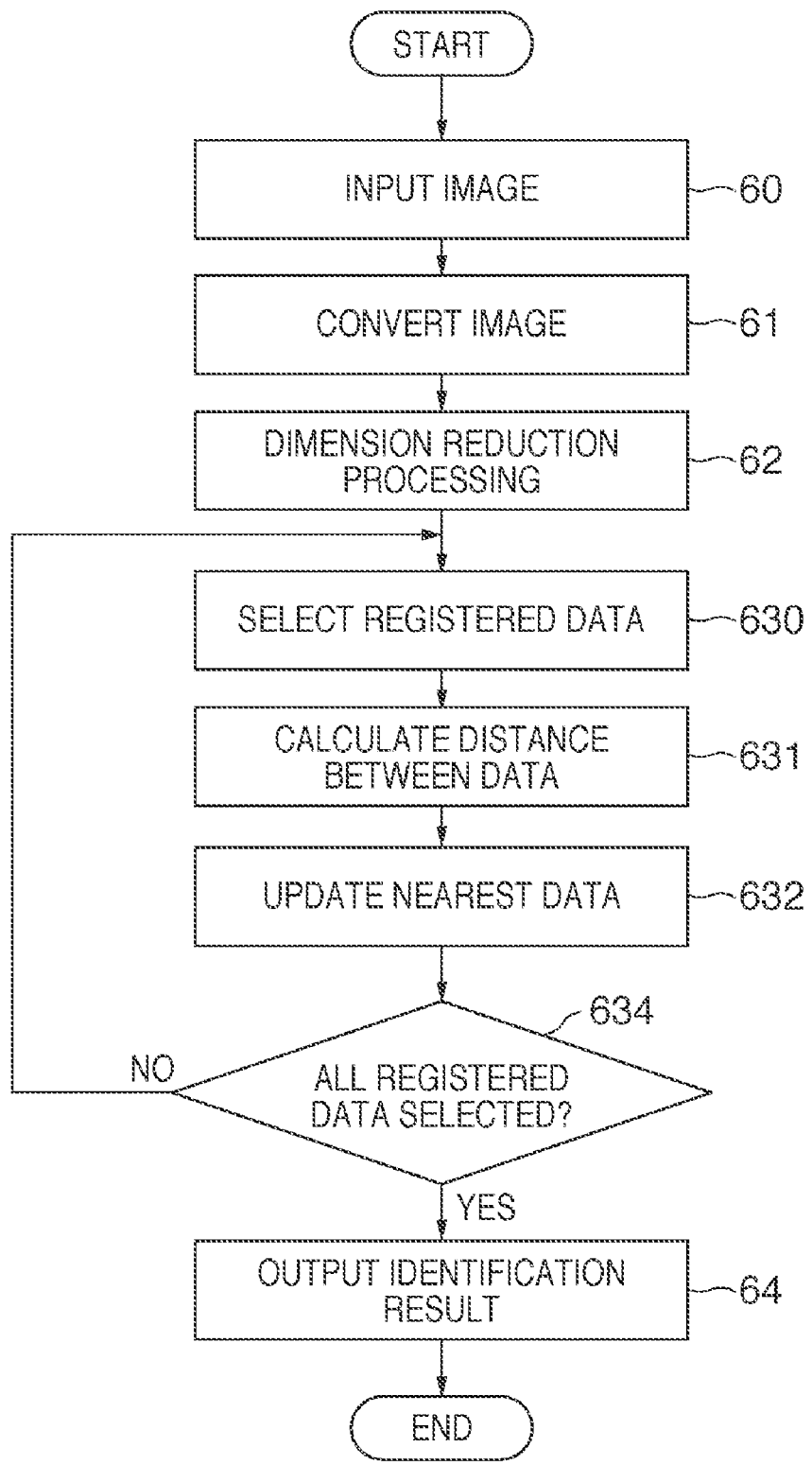
FIG. 6 is a flowchart illustrating processing of the pattern identification method according to the first embodiment.

FIG. 5 is a block diagram showing the process blocks of the pattern identification method according to the first embodiment. FIG. 6 is a flowchart illustrating the processing procedure of the pattern identification method according to the first embodiment.

First, an image input unit 50 inputs a grayscale image (to be simply referred to as an input image hereinafter) corresponding to an extracted human face and including 20×20 pixels in the vertical and horizontal directions (step 60).

An image conversion unit 51 converts the input image using the image conversion method of this embodiment. With this conversion, a converted value that is a two-dimensional vector value including two numerical values is obtained for each of 18×18 pixels, as described above. That is, a converted image in which the pixel value of each of the 18×18 pixels is replaced with a converted value is acquired (step 61). As described above, the image conversion unit 51 need not perform processing of high calculation cost, unlike the above-described MDS processing, and can therefore perform processing at a relatively low calculation cost.

A dimension reduction-processing unit 52 reduces the number of dimensions of the conversion result from the image conversion unit 51 (step 62). The conversion result from the image conversion unit 51 has two numerical values as a converted value corresponding to each of the 18×18 pixels. These values are regarded as an 18×18×2=648-dimensional vector. Directly using such a high-dimensional vector for pattern identification processing often impedes attaining satisfactory performance. To prevent this, the number of dimensions is preferably reduced. In this embodiment, dimension reduction using PCA (Principal Component Analysis) is performed.

In dimension reduction using PCA, a number of grayscale images of extracted faces of various persons are prepared in advance by conversion of the image conversion unit 51. PCA is performed for the images, and dimension reduction is done using the result. With the PCA, a plurality of eigenvalues and eigenvectors are obtained. A predetermined number of eigenvalues are selected in descending order. The above-described 648-dimensional vector is projected to the eigenvectors corresponding to the eigenvalues, thereby obtaining a dimension-reduced vector.

In this embodiment, the predetermined number is 20. The dimension reduction-processing unit 52 projects the 648-dimensional vector to the 20 eigenvectors, thereby converting the vector into a vector having the projected values as elements. Hence, the number of dimensions is reduced from 648 to 20. The eigenvectors can be obtained and recorded in advance. In actual processing, dimension reduction is implemented by referring to the recorded eigenvectors. In this embodiment, dimension reduction using PCA is performed. However, dimension reduction may be done using, for example, independent component analysis or kernel based nonlinear principal component analysis. The target number of dimensions to be obtained by compression is not limited to 20. The number of dimensions may be determined using Cross Validation.

A nearest neighbor search unit 53 of the next stage obtains the distance to, out of the data of registered persons held in a registration database 54, data nearest to the dimension-reduced data. The data of registered persons held in the registration database 54 are obtained by executing the processing of the image input unit 50 to the dimension reduction-processing unit 52 in advance for at least one grayscale image corresponding to the extracted face of each registered person. For at least one 20-dimensional vector corresponding to each registered person, the registration database 54 records the label of the person.

In the processing of the nearest neighbor search unit 53, first, the 20-dimensional vectors recorded in the registration database 54 are sequentially selected one by one (step 630). The Euclidean distance between the selected 20-dimensional vector and that obtained by processing the input image using the above-described method is calculated (step 631). If the obtained Euclidean distance is smaller than those obtained so far, the obtained Euclidean distance and the label of a person corresponding to the 20-dimensional vector selected then are updated (step 632). These processes are executed for all data in the registration database 54. If registered data that has not been selected in step 630 remains, the process returns to step 630. If all registered data have been selected and processed, the process advances to the next processing (step 634). The label (person) corresponding to the minimum Euclidean distance is thus obtained.

Finally, an identification result output unit 55 outputs, based on the processing result from the nearest neighbor search unit 53, an identification result representing the person corresponding to the input image (step 64). In this case, final determination is performed based on the label obtained by the nearest neighbor search unit 53 in correspondence with data with the minimum Euclidean distance and the distance, and the result is output to the outside as the identification result. More specifically, if the minimum Euclidean distance is equal to or smaller than a predetermined threshold, the identification result output unit 55 outputs an identification result representing that the input image is of a person of the corresponding label. If the minimum distance is larger than the predetermined threshold, the identification result output unit 55 outputs a result representing that the input image is of a person other than the registered persons. The predetermined threshold is determined experimentally such that the ratio of erroneously determining the image of an unregistered person as the image of a registered person and the ratio of conversely erroneously determining the image of a registered person as the image of an unregistered person maintain a desired balance.

The processing from the image input unit 50 to the identification result output unit 55 enables to convert a grayscale image corresponding to an extracted human face using the image conversion method of this embodiment and identify the converted image as the face image of a specific person. This makes it possible to perform in advance conversion robust against a variation in brightness or the like (invariable against variations in brightness and contrast, like LBP). Identification processing is performed for an image converted using the image conversion method of this embodiment. Even when a variation in brightness or the like has occurred in the input image, it is possible to identify the image as the face image of a specific person robustly against the variation. If 3×3 pixel patterns as the conversion sources are similar, similar converted values are obtained using the image conversion method of this embodiment. For this reason, recognition can be done robustly not only against a variation in brightness or contrast but also against, for example, a slight variation in the size of the input image.

As the pattern identification method of this embodiment, an example of pattern identification using dimension reduction by PCA and the so-called nearest neighbor method has been described. However, pattern identification may be done using a neural network or SVM.

In the first embodiment, an example of a method of converting a grayscale image of an extracted human face robustly against a variation in brightness or the like has been described above. In addition, an example of a pattern identification method of identifying an image converted using the conversion method as the face image of a specific person has been described.

As described above, in the image conversion method of this embodiment, first, based on the pattern of pixel values at predetermined relative positions with respect to the position of a selected pixel of interest, the pattern is classified as one of a plurality of classes. Values determined in advance for the plurality of classes based on the mutual relationship between the plurality of classes are referred to, and a value corresponding to the determined class is used as the converted value of the pixel of interest, thereby converting the input image. This enables image conversion which allows converted values having dimensions lower to some extent to preferably express the difference between conversion source patterns.

In the pattern identification method using the image conversion method, since converted values having dimensions lower to some extent can preferably express the difference between conversion source patterns, the pattern identification performance improves at higher possibility.

Second Embodiment

In the second embodiment, an example will be described in which the method used in the first embodiment to obtain converted values corresponding to classes is modified.

As the mutual relationship between the plurality of classes, the distance or similarity between representative patterns set for the classes is usable. For example, a numerical value sequence formed from eight {0,1}s based on a value comparison result described above is defined as the representative pattern of each class. The distance or similarity between them can be used. A case in which a numerical value sequence representing a result of value comparison is used will be described below.

In the first embodiment, numerical values which can preserve the distances between the 3×3 pixel pattern groups serving as the generation sources of the classes as much as possible are used as converted values corresponding to the classes. In the second embodiment, however, instead of performing statistical processing using pixel value patterns serving as the generation sources of the classes, distances are directly defined for the patterns of the 256 classes. Then, numerical values which can preserve the defined distances as much as possible are used as converted values corresponding to the classes. The second embodiment is different from the first embodiment only in the part of obtaining the distances between the classes, and a description of the same parts as in the first embodiment will not be repeated.

The arrangement of processing units in an image conversion method according to this embodiment is the same as in the first embodiment (FIG. 1). The processing procedure is also the same as in the first embodiment (FIG. 4). The second embodiment is different only in converted values corresponding to the classes which a converted value assignment unit 14 reads out from a class corresponding converted value database 15.

How to obtain converted values corresponding to classes according to this embodiment will be explained.

First, the distances between the classes are calculated using patterns each formed from eight {0,1}s corresponding to each of the 256 classes. The patterns each formed from eight {0,1}s corresponding to each class are the same as in the first embodiment. When a Hamming distance is used as the distance between bit strings like the patterns, all the distances between the three patterns shown in FIGS. 3A to 3C are 2. As described above, when viewed from the pattern in FIG. 3A, the relationship to the pattern in FIG. 3C is supposed to be preferably farther than to the pattern in FIG. 3B. In this embodiment, the normal Hamming distance is modified so as to reflect the spatial arrangement relationship of bits, and the distances between the patterns each formed from eight {0,1}s, that is, the distances between the classes is calculated using the modified Hamming distances.

The modified Hamming distance will be explained here. In the normal Hamming distance, if the bits at corresponding positions are not identical, the distance is incremented by one. In the modified Hamming distance, if the bits at corresponding positions are not identical, the distance is incremented in accordance with the following procedure.

When, viewed from one of two patterns, the bit at an adjacent position in the counter pattern is identical, the distance is incremented by 0.125. The numerical value at the leftmost position is assumed to be connected to that at the rightmost position. If the bit at the adjacent position is not identical, but the bit at the second adjacent position in the counter pattern is identical, the distance is incremented by 0.25. If the bit at the second adjacent position is not identical either, the distance is incremented by 0.5. This processing is performed for all the eight bits in each of the two patterns. The sum of the distances is used as the modified Hamming distance.

The pattern "00000010" of class 2 corresponding to the pattern shown in FIG. 3A and the pattern "10000000" of class 128 corresponding to the pattern shown in FIG. 3B will be described as an example. The two patterns are compared. Since the leftmost bits and the second bits from the right are different, distances are calculated for these bits. The bits other than those at the two positions are identical, the distances corresponding to them are 0.

The bits at the leftmost positions will be explained first. When the pattern of class 128 is viewed from the pattern of class 2, the same bits "0" as that at the leftmost position of class 2 exist at positions (the second position from the left and the rightmost position) adjacent to the leftmost position. Hence, the distance is incremented by 0.125. When the pattern of class 2 is viewed from the pattern of class 128, the same bits "1" as that at the leftmost position of class 128 do not exist at positions (the second position from the left and the rightmost position) adjacent to the leftmost position. The second adjacent positions (the third position from the left and the second position from the right) of class 2 are examined. Then, the same bit "1" as that at the leftmost position of class 128 exists at the second position from the right. Hence, the distance is incremented by 0.25. The sum of distances up to this point is 0.375. Distance calculation for the leftmost bits thus ends. Calculation is similarly performed for the second position from the right. When the pattern of class 128 is viewed from the pattern of class 2, the same bit "1" exists at the second adjacent position, and the distance is incremented by 0.25. When the pattern of class 2 is viewed from the pattern of class 128, the same bits "0" exist at the adjacent positions, and the distance is incremented by 0.125. As a result, the sum of distances is 0.75. This is the modified Hamming distance.

In the modified Hamming distance used in this embodiment, even if the bits at the same position are different, the distance is obtained in consideration of the bit state in the neighborhood. Hence, a distance that should reflect the variation amount of the bit positions can be obtained as compared to the normal Hamming distance. The distances between the classes are calculated using the modified Hamming distances and the patterns each formed from eight {0,1}s corresponding to each class. In this embodiment as well, since the number of classes is 256, 256×255/2=32,640 inter-class distances are obtained, as in the first embodiment.

Next, the modified Hamming distances between the classes are corrected using the Floyd-Warshall method described in reference 6.

Note that the above-described modified Hamming distance may not satisfy the triangle inequality in the distance axiom. Even if the triangle inequality is not satisfied, no serious problem is posed. However, in this embodiment, the obtained inter-class distances are corrected using the Floyd-Warshall method so that the distances between the classes satisfy the triangle inequality.

As a detailed example of modified Hamming distances which do not satisfy the triangle inequality, the relationship between the modified Hamming distances of classes 1, 2, and 6 will be described. The modified Hamming distance between a class i and a class j is represented by $d_{rh}(i,j)$. The pattern corresponding to class 1 is "00000001". The pattern corresponding to class 6 is "00000110". The modified Hamming distance $d_{rh}(1,6)$ between class 1 and class 6 is $d_{rh}(1,6)=0.875$ based on the above-described modified Hamming distance calculation method. Similarly, the modified Hamming distance $d_{rh}(1,2)$ between class 1 and class 2 is 0.5, and the modified Hamming distance $d_{rh}(2,6)$ between class 2 and class 6 is 0.25. The distances between the three classes hold a relationship $d_{rh}(1,6)=0.875 > d_{rh}(1,2)+d_{rh}(2,6)=0.5+0.25=0.75$, and do not satisfy the triangle inequality $d_{rh}(1,6) \le d_{rh}(1,2)+d_{rh}(2,6)$.

In this state, the distances are updated to satisfy $d_{rh}(1,6)=d_{rh}(1,2)+d_{rh}(2,6)=0.75$. That is, the distance from class 1 to class 6 is updated to the distance from class 1 to class 6 via class 2. This processing can be implemented by applying the Floyd-Warshall method to a modified Hamming distance matrix $D_{rh}$ which has, as the element on the ith row and jth column, the modified Hamming distance $D_{rh}(i,j)$ between the class i and the class j. As the elements of the modified Hamming distance matrix $D_{rh}$, values obtained as the inter-class modified Hamming distances are used. Although a modified Hamming distance $d_{rh}(k,k)$ between identical classes is not obtained, $d_{rh}(k,k)=0$, as a matter of course, according to the definition of the modified Hamming distance. In addition, $d_{rh}(i,j)=d_{rh}(j,i)$. The total number of classes is 256. For these reasons, the modified Hamming distance matrix $D_{rh}$ is a 256th-order symmetric matrix in which all diagonal elements are 0, and the remaining elements are positive real numbers. Processing of applying the Floyd-Warshall method to the modified Hamming distance matrix $D_{rh}$ to obtain a corrected modified Hamming distance matrix $D'_{rh}$ is performed.

Using the corrected modified Hamming distance matrix $D'_{rh}$, points corresponding to the classes are mapped on a target space having predetermined dimensions so as to preserve the distance relationship as much as possible. This processing is the same as that of the MDS processing unit 78 in the first embodiment except that the corrected modified Hamming distances are used in place of the cluster distances, and a detailed description thereof will be omitted.

Position coordinates on the target space corresponding to the 256 classes are thus obtained. The position coordinates represent the converted values of two-dimensional vector values corresponding to the classes, which are determined in advance based on the mutual relationship between the classes, as in the first embodiment.

Finally, the obtained two-dimensional coordinate values corresponding to the classes are output to the outside. The output two-dimensional coordinate values corresponding to the classes are held in the class corresponding converted value database 15, and used as converted values corresponding to the classes upon image conversion, as in the first embodiment.

As described above, according to this embodiment, a neighboring pattern is used as a pattern that represents each class. The distances between the neighboring patterns are defined, and converted values corresponding to the classes are determined based on the distance relationship. If converted values are similar, the classes determined for the conversion source patterns are similar. That is, it is possible to perform image conversion capable of preferably expressing the difference between conversion source patterns using values having dimensions lower to some extent. In this embodiment, the distances between the classes are defined using the modified Hamming distances. However, the distances between the classes may be defined by any other method using, for example, simple Hamming distances.

An example has been described above as the second embodiment, in which the method used in the first embodiment to obtain converted values corresponding to classes is modified. Note that the image conversion method of this embodiment is also applicable to pattern identification using a converted image, as in the first embodiment.

Third Embodiment

In the third embodiment, an example will be described in which the process contents of the processing units in the first embodiment are modified. An example of a pattern identification method of identifying a converted image as the face image of a specific person will also be described, as in the first embodiment.

The arrangement of processing units according to this embodiment is the same as in the first embodiment shown in FIG. 1. The processing procedure is also the same as in FIG. 4. However, the process contents of the processing units are slightly different. Parts where the process contents are different from those of the first embodiment will be described with reference to FIGS. 1 and 4, and a description of the remaining parts will not be repeated.

First, an image input unit 10 inputs a grayscale image corresponding to an extracted human face and including 20×20 pixels, as in the first embodiment (step 40).

A pixel-of-interest selection unit 11 selects a pixel of interest from the input image (step 41). In this case as well, the pixel-of-interest selection unit 11 sequentially selects a pixel of interest from the upper left corner of the input image. In the first embodiment, since eight neighboring pixel values around the pixel of interest are used, the pixel-of-interest selection unit 11 selects a pixel of interest from a place except one pixel line of each of the upper, lower, left, and right edges of the input image. In the third embodiment, however, pixel values vertically and horizontally spaced apart from the pixel of interest by three pixels are used. To do this, the pixel-of-interest selection unit 11 sequentially selects a pixel of interest from a place except three pixel lines of each of the upper, lower, left, and right edges of the input image. In this embodiment, since the input image includes 20×20 pixels, a pixel of interest is selected from 14×14 pixels.

Figure 11A:
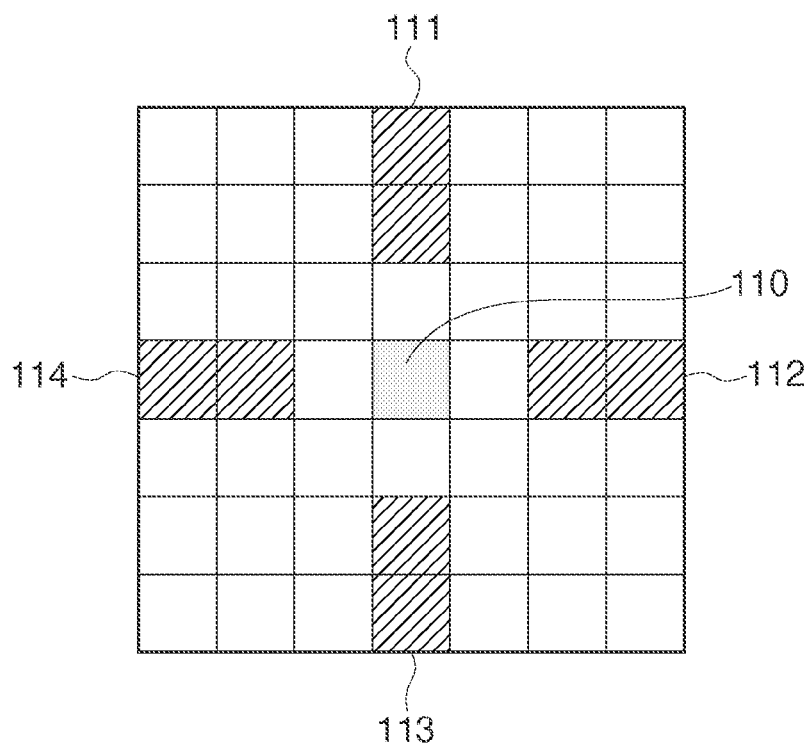
FIGS. 11A to 11C are views showing a pixel of interest and four neighboring regions.

Subsequently, as shown in FIG. 11A, a neighboring pattern extraction unit 12 extracts the average values of pixel values in four regions 111 to 114 (indicated by hatched regions in FIG. 11A) based on a selected pixel 110 of interest. That is, in this embodiment, the average values of a plurality of pixel values at positions slightly far from the pixel of interest are extracted (step 42).

A classification processing unit 13 compares the pixel value of the pixel of interest with the average value of each of the four regions extracted by the neighboring pattern extraction unit 12, thereby obtaining a numerical value sequence of four $\{0,1\}$s. More specifically, which one of the following three conditions is satisfied by each region is determined.

Condition 1: average value of region>pixel value of pixel of interest×(1+predetermined ratio)
Condition 2: average value of region<pixel value of pixel of interest×(1−predetermined ratio)
Condition 3: other than conditions 1 and 2

When a region satisfies condition 1, a numerical value corresponding to that region is set to 2. Otherwise, 0 is set for condition 2, and 1 is set for condition 3. The predetermined ratio can be an arbitrary value from 0 (inclusive) to 1 (exclusive). In this embodiment, the predetermined ratio is 0.1. More preferably, the value is determined using Cross Validation to be described later. Such numerical values are obtained for the regions 111 to 114 in FIG. 11A and arranged in order to obtain a numerical value sequence.

Figures 11B, 11C:
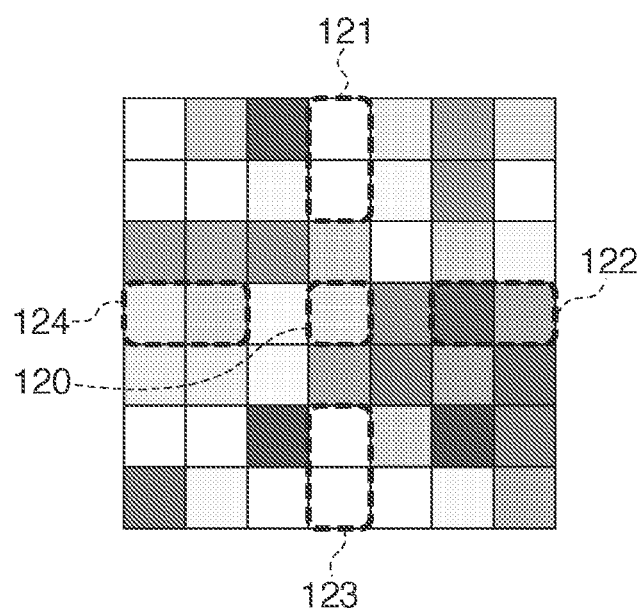

A detailed example of obtaining the numerical value sequence will be described using the patterns shown in FIGS. 11B and 11C. FIG. 11B shows a 7×7 pixel pattern with a selected pixel 120 of interest at the center. FIG. 11C shows the pixel values in the pattern shown in FIG. 11B.

A region corresponding to the region 111 in FIG. 11A is a region 121 in FIG. 11B. Referring to FIG. 11C, the two values in this region are 253 and 225. The average value of this region is (253+225)/2=239. When the predetermined ratio is 0.1, pixel value of pixel of interest×(1+predetermined ratio)=164×(1+0.1)=180.4. This region is determined to satisfy condition 1, and a corresponding numerical value is "2". Similarly, a region 122 corresponding to the region 112 is determined to satisfy condition 2. Hence, a numerical value corresponding to the region 122 is "0". Numerical values corresponding to regions 123 and 124 are "2" and "1", respectively. Hence, a numerical value sequence corresponding to the pattern shown in FIG. 11B is "2021".

The numerical value sequence obtained here is robust to some extent against a variation in the brightness or the like of the pattern, as in LBP or CT. LBP or CT is invariable against a variation in brightness, that is, bias and contrast, that is, a multiple of a positive constant for the pattern. This embodiment is not necessarily completely invariable against a variation in bias because of the above-described determination using the predetermined ratio. However, the method has robustness against a variation in bias to some extent. Since a comparison result can be expressed by three values, a higher pattern expressive power can be attained.

In the first embodiment, each numerical value sequence pattern formed from eight $\{0,1\}$s is defined as one class. In the third embodiment, each of a total of $3^4=81$ numerical value sequence patterns each formed from four $\{0,1,2\}$s is defined as one class. An extracted pattern is classified as one of the classes. The numerical value sequence formed from four $\{0,1,2\}$s is regarded as a ternary value and converted into a decimal number which expresses the number of a class. For example, "1201" is $1\times3^3+2\times3^2+2\times3^2+0\times3^1+1\times3^0=46$, and is expressed as class 46. That is, the classification processing unit 13 classifies each numerical value sequence pattern as one of the classes based on the extracted average values of four regions and the pixel value of the pixel of interest (step 43). The classification method is not limited to the above-described one. For example, classification may be done by criterion as in Improved LBP of reference 7. A method such as Multi-Scale LBP of reference 8 or Uniform-LBP of reference 9 is also applicable.

Next, a converted value assignment unit 14 reads out a value corresponding to the determined class from a class corresponding converted value database 15, and defines the value as a converted value corresponding to the selected pixel of interest (step 44). The class corresponding converted value database 15 records a three-dimensional vector value formed from three numerical values for each class. How to determine the three-dimensional vector value will be described later in detail.

A converted image holding unit 16 holds the converted value that is a three-dimensional vector value obtained by the converted value assignment unit 14 as the converted value corresponding to the selected pixel of interest (step 45).

With the above-described processing, the three-dimensional vector value is recorded as the converted value corresponding to the selected pixel of interest. Such converted values are obtained for 14×14 pixels. If an unselected pixel remains, the process returns to the processing of the pixel-of-interest selection unit 11. If all the 14×14 pixels have been selected and processed, the process advances to the next processing (step 46).

Finally, a converted image output unit 17 outputs the result recorded in the converted image holding unit 16 to the outside (step 47). The image conversion processing is thus completed. With the above-described processing, a converted value that is a three-dimensional vector value is obtained for each of the 14×14 pixels other than the three pixel lines of each of the upper, lower, left, and right edges of the input image including 20×20 pixels. That is, an image in which three-dimensional vector values are arranged in correspondence with the 14×14 pixels is output to the outside.

Figure 13:
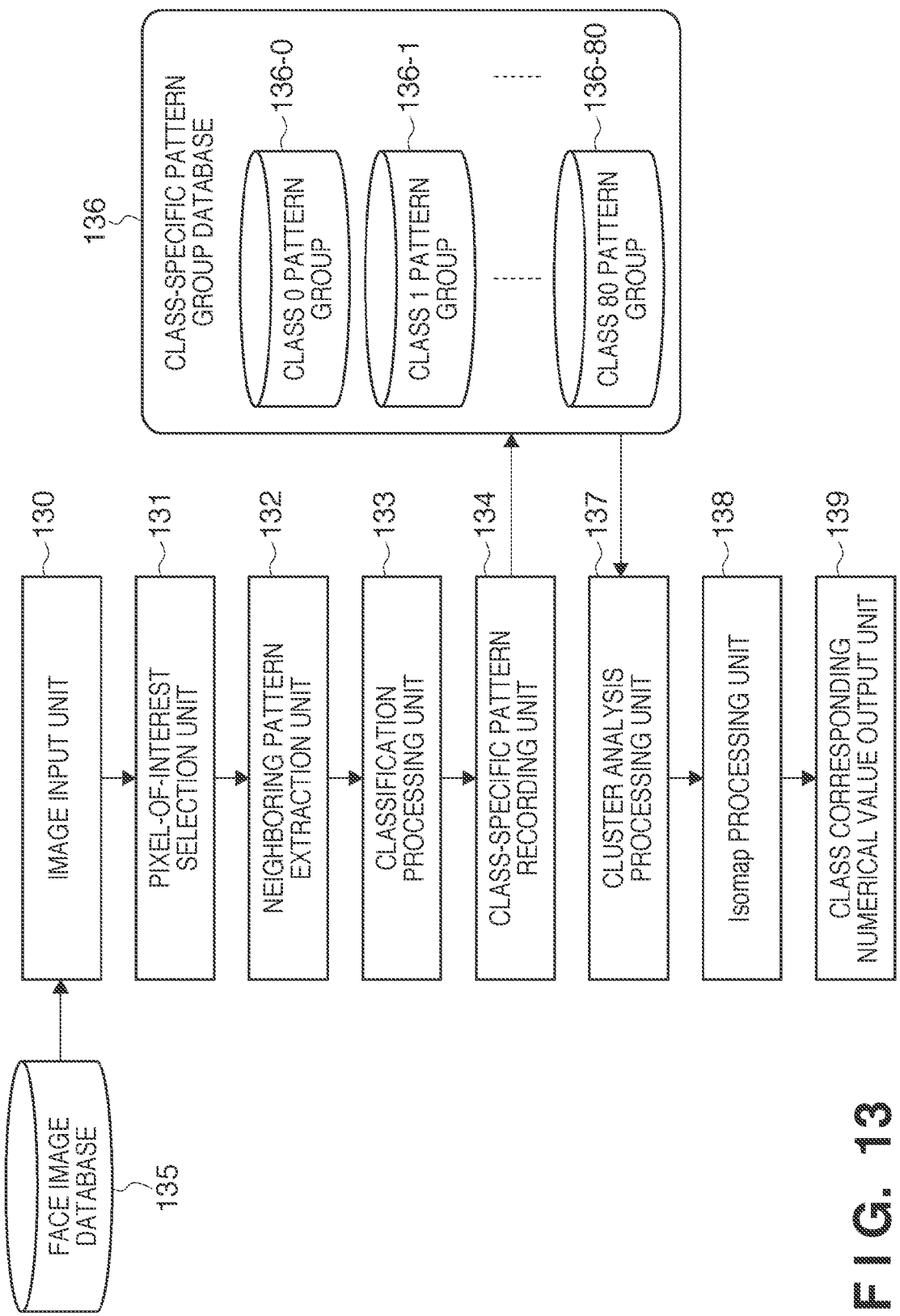
FIG. 13 is a block diagram showing the process blocks of a method of obtaining converted values corresponding to classes based on the mutual relationship between the classes according to the third embodiment.
Figure 14:
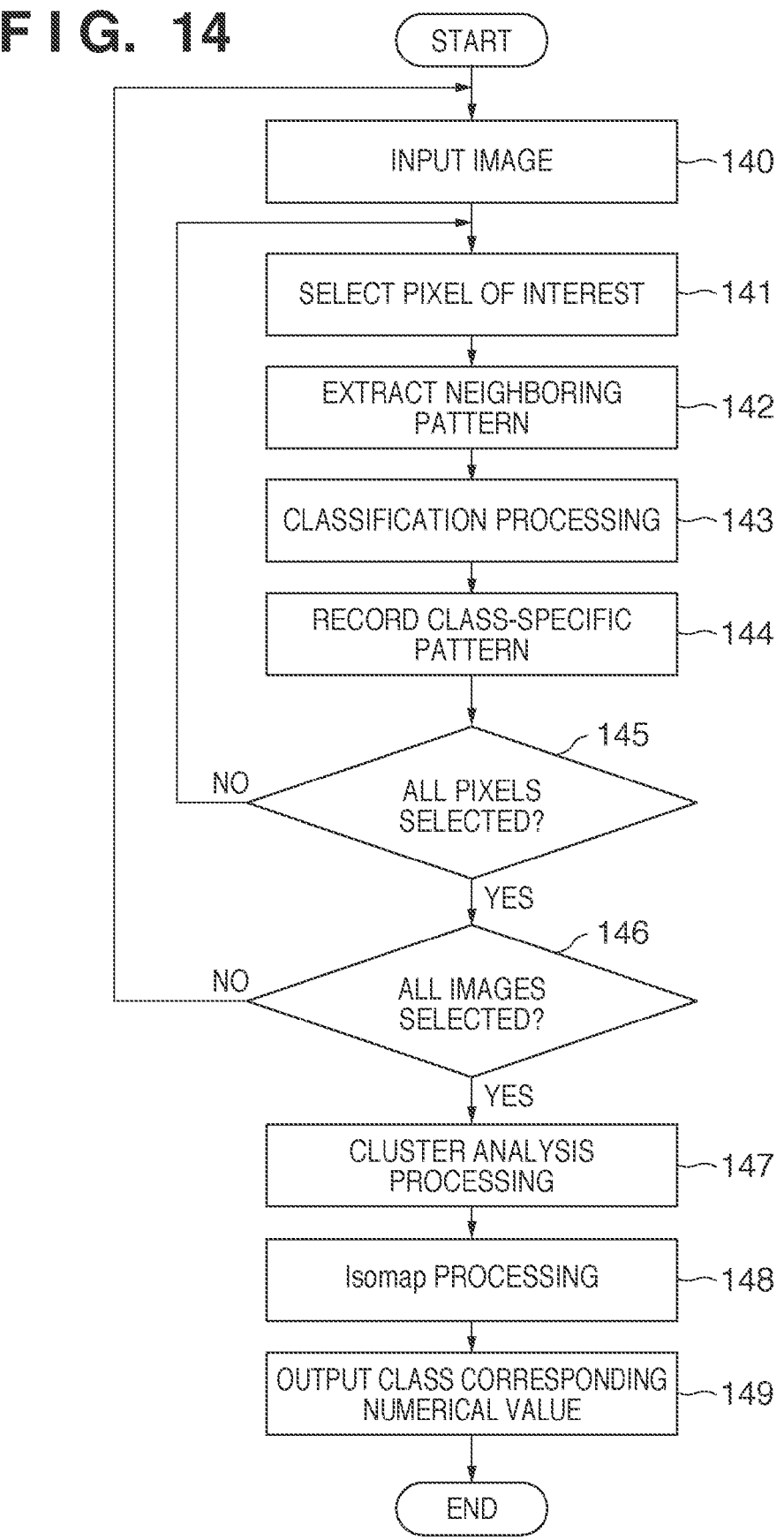
FIG. 14 is a flowchart illustrating processing of the method of obtaining converted values corresponding to classes based on the mutual relationship between the classes according to the third embodiment.

How to obtain converted values corresponding to classes will be explained next. In the first embodiment, 3×3 pixel value patterns in class-specific pattern sample groups are used. In the third embodiment, however, cluster analysis is performed using 5×5 pixel patterns and associated information. FIG. 13 is a block diagram showing the process blocks of a method of obtaining converted values corresponding to classes according to this embodiment. FIG. 14 is a flowchart illustrating the processing procedure of the method of obtaining a converted value. As is apparent from FIGS. 13 and 14, the method of obtaining converted values corresponding to classes of this embodiment is basically the same as in the first embodiment. The processing of each process block will be explained below, and a description of the same parts as in the first embodiment will not be repeated.

First, an image input unit 130 selectively inputs one image from a face image database 135, as in the first embodiment (input step 140).

A pixel-of-interest selection unit 131 to a classification processing unit 133 are the same as the pixel-of-interest selection unit 11 to the classification processing unit 13 of the first embodiment. That is, a pixel of interest is selected from the input face image, the average values of four regions around the pixel of interest are extracted, thereby classifying the pattern (steps 141 to 143).

A class-specific pattern recording unit 134 records, in a class-specific pattern group database 136, the number of the input image and the position coordinates of the pixel of interest together with the 5×5 pixel pattern with the pixel of interest at the center based on the classification result (step 144). In the first embodiment, only the 3×3 pixel pattern used for classification is recorded in the database. In the third embodiment, however, not the average values of the four regions used by the classification processing unit 133 but the 5×5 pixel pattern with the pixel of interest at the center is recorded.

As a detailed example, when the pattern with the pixel of interest at the center is the pattern shown in FIG. 11B, it is classified as class 61. Hence, the pattern is recorded in a class 61 pattern group 136-61. At this time, 25 pixel values in the 5×5 pixel region with the pixel 120 of interest at the center are arranged in the raster scan order from the upper left corner, and recorded.

Not only the pixel value pattern but also associated information representing at which position of which image (spatial position information) the pattern has been extracted is recorded. For example, information of the number of the input image and the position coordinates of the pixel of interest is described as associated information. The pattern of the pixel values of the 5×5 pixels and associated information recorded here are used to obtain the cluster distances between the classes later.

The processing in steps 141 to 144 is executed for all 14×14 pixels to be selected as a pixel of interest of one input image. If an unselected pixel remains, the process returns to the processing of the pixel-of-interest selection unit 131. If all the 14×14 pixels have been selected and processed, the process advances to the next processing (step 145).

With the above-described processing, 14×14 patterns each including 5×5 pixels and their associated information are recorded in the class-specific pattern group database 136 per image. This processing is executed for all images held in the face image database 135. If an uninput image remains, the process returns to the processing of the image input unit 130. If all images have been input and processed, the process advances to the processing of a cluster analysis processing unit 137 (step 146).

In this embodiment as well, 2,000 face images are used. When 14×14 patterns are extracted from each image, a total of 2000×14×14=392,000 patterns each including 5×5 pixels and their associated information are recorded in the class-specific pattern group database 136. As in the first embodiment, if a class for which no pattern is recorded exists, an image is added. The processing is continued until at least one pattern is recorded for each class.

Subsequently, the cluster analysis processing unit 137 obtains the cluster distances between the classes by the group average method using a number of patterns recorded in the class-specific pattern group database 136, as in the first embodiment. When obtaining the distances between the patterns, the distances are calculated using the associated information of each pattern, unlike the first embodiment in which Euclidean distances are simply obtained. In this embodiment, if two patterns are extracted from the same image, the Euclidean distance between the patterns is reduced by a predetermined ratio in accordance with the distance between the position coordinates at which the patterns are extracted. If the patterns are not extracted from the same image, the Euclidean distance is defined as the distance between the patterns. More specifically, in this embodiment, a distance $d'(x_{(n,(s,t))}, y_{(m,(u,v))})$ between a 5×5 pixel pattern $x_{(n,(s,t))}$ extracted from a position (s,t) of an nth image and a 5×5 pixel pattern $y_{(m,(u,v))}$ extracted from a position (u,v) of an mth image is obtained by $$d'(x_{(n,(s,t))}, y_{(m,(u,v))}) = d(x, y) \times \left[1 - \delta_{nm} \cdot \exp\left\{-\frac{(s-u)^2 + (t-v)^2}{2\sigma^2}\right\}\right] \quad (1)$$

where d(x,y) is the Euclidean distance between the patterns, $\delta_{nm}$ is the Kronecker delta which is 1 only when n=m, and 0 otherwise, and σ is a positive constant. That is, when the image numbers recorded as the associated information of the patterns are different (n≠m), a normal Euclidean distance is defined as the distance between the patterns. If the image numbers are identical (n=m), the Euclidean distance between the patterns is multiplied by 1−exp {−(distance between pattern extraction positions)$^2$/2σ$^2$} to obtain the distance between the patterns. The value 1−exp {−(distance between pattern extraction positions)$^2$/2σ$^2$} is always smaller than 1. For this reason, the distance is shorter than the normal Euclidean distance. The shorter the distance between the pattern extraction positions becomes, the higher the distance reduction ratio becomes. That is, the distance between the patterns is reduced based on the relative spatial arrangement relationship between the patterns to be compared. The distance reduction ratio is determined by the value σ. In this embodiment, σ=1.5. In this case, for example, if the distance between the patterns corresponds to one pixel, the normal Euclidean distance is multiplied by about 0.199 so that the distance is reduced by about 80%. If the distance between the patterns corresponds to about five pixels, the scaling factor is about 0.996. Hence, the distance is rarely reduced and almost equals the normal Euclidean distance.

As described above, as the distance between the patterns becomes shorter, the distance is reduced largely. For example, when a pattern belonging to the class j often exists at a position spatially adjacent to a pattern belonging to the class i, the inter-class distance between the class i and the class j relatively becomes shorter. The inter-class distance is associated with the distance between converted values corresponding to the classes, as in the first embodiment. As a result, the difference between the converted values corresponding to the class i and the class j relatively becomes smaller. That is, the converted values corresponding to the class i and the class j are similar. Hence, in the pattern identification of this embodiment, the variation in the converted value can be suppressed small relative to the variation in the position so that the robustness against the variation in the position can be increased. The robustness can be controlled by the value σ. To implement higher robustness, the value σ is made large. However, if the value σ is too large, all patterns extracted from the same image have short distances. To prevent this, the value σ is determined experimentally in accordance with the resolution of the image to be used or the like. Preferably, the value σ is also determined using Cross Validation.

In this embodiment, the distance is obtained in consideration of the pattern extraction positions in the above-described way. However, the present invention is not limited to this. The distance may be calculated using any other associated information. For example, to increase robustness against rotation in pattern identification, patterns may be prepared by rotating each extracted pattern a little, and the distance between the rotated patterns may be corrected based on the difference in rotation angle. When patterns are extracted from human face images, and two patterns are extracted from near the same position of the same person (for example, near the outer canthus of the left eye), the distance may be reduced. This allows to increase robustness against a variation between different images at the same position of the same person. For different persons, the distance between patterns extracted from near the same position may be increased. In this case, the difference between converted values at the same position of different persons can be made large so that the pattern identification performance can be improved. Using associated information to calculate the distance between patterns enables image conversion with a desired characteristic. In the above embodiment, the associated information includes information for specifying an image and information representing a spatial arrangement position in the image. However, only the information for specifying an image may be used.

When calculating the cluster distances between the classes, the cluster analysis processing unit 137 of this embodiment performs the same processing as that of the cluster analysis processing unit 77 of the first embodiment except for obtaining the distance in consideration of the pattern extraction positions as described above. That is, for example, the cluster distance between the class i and the class j (i≠j) is obtained by the above-described method in all combinations of the class i pattern and the class j pattern. The obtained distances are averaged to obtain the cluster distance between the class i and the class j.

The cluster analysis processing unit 137 obtains such cluster distances in all class combinations (step 147). In this embodiment, since a total of 81 classes 0 to 80 are present, unlike the first embodiment, 81×80/2=3,240 cluster distances are obtained. This calculation processing can also be done offline in advance. In this embodiment, the group average method is used to obtain the cluster distances. However, any other cluster distance scale by, for example, the nearest neighbor method, farthest neighbor method, centroid method, median method, flexible method, or Ward method may be used.

Next, an Isomap processing unit 138 maps points corresponding to the classes on a target space having predetermined dimensions using the cluster distances between the classes, as in the first embodiment (step 148). In the first embodiment, MDS is used for the mapping processing. In the third embodiment, Isomap of reference 10 is used.

Using the Isomap, the points corresponding to the classes are mapped on the target space while preserving the cluster distances. That is, the points corresponding to the classes allow the Euclidean distances between the points on the target space to preserve the geodesic distances between the classes based on the cluster distances between the classes as much as possible. The geodesic distances between the classes are distances considering the neighborhood/non-neighborhood between the classes (determined based on the cluster distances between the classes). In this case, as the geodesic distance between neighbor classes, the cluster distance between the classes is directly used. The geodesic distance between non-neighbor classes is the minimum value of the sums of cluster distances on routes that pass through neighbor classes.

How to obtain the geodesic distance will be described. First, a matrix is prepared, which has, as the element on the ith row and jth column, the value of the cluster distance between the class i and the class j if the class i and the class j are neighbor, or an infinite value (or such a large value that is can be regarded as infinite) if the classes are non-neighbor. The Floyd-Warshall method described in reference 6 is applied to the matrix. This allows to obtain the geodesic distance between the class i and the class j as the element on the ith row and jth column (=jth row and ith column) of the matrix to which the Floyd-Warshall method is applied.

As the criterion to determine neighborhood/non-neighborhood, the k-neighborhood reference or ϵ-sphere reference is generally used. In the k-neighborhood reference, k classes in ascending order of the cluster distance from a given class are determined as neighborhood. In the ϵ-sphere reference, classes whose cluster distances from a given class are equal to or smaller than a constant ϵ are determined as neighborhood. In this embodiment, the k-neighborhood reference is used, and the value k is set to 7. The reference to be used, the k-neighborhood reference or ϵ-sphere reference, and the value k or ϵ are determined experimentally in accordance with the image to be applied. If the value k or ϵ is too small, non-neighbor classes may not reach each other even via neighbor classes, and it may be impossible to obtain the geodesic distance. In such a case, the value k or ϵ is made slightly larger, and the neighborhood/non-neighborhood determination is performed again to obtain the geodesic distance. Most preferably, Cross Validation is used.

In the Isomap processing, as described above, the neighborhood/non-neighborhood between classes is determined first. The matrix is prepared based on the determination result, and MDS is executed using a matrix obtained by applying the Floyd-Warshall method to the prepared matrix. Even when Isomap is used, the number of dimensions of the target space is (number of classes−1) at maximum, as in the MDS of the first embodiment. That is, in this embodiment, the target space has 80 dimensions. Note that the number of dimensions may be 80 or less depending on the conditions of the cluster distances between the classes. As in the first embodiment, a higher dimension can preserve the cluster distances between the classes at a higher accuracy. However, if the dimension of the target space is too high, the dimension of a converted value becomes higher. This causes so-called "curse of dimensionality" in pattern identification processing later. Hence, the dimension of the target space is preferably low to some extent. In this embodiment, a three-dimensional target space is used. The number of dimensions is not limited to three, as a matter of course, and more preferably determined using Cross Validation.

With the Isomap processing, position coordinates on the target space corresponding to classes 0 to 80 are obtained. In this embodiment, since the number of dimensions of the target space is three, the position coordinates are expressed by three numerical values. Position coordinates represented by three numerical values for each class indicate the converted value of a three-dimensional vector value corresponding to each class. In this embodiment, the points corresponding to the classes are thus mapped using Isomap. This results in a growing tendency of allowing to topologically map a nonlinear variation between the classes (for example, a variation between the classes caused by translation or a variation in the viewpoint for a pattern or the three-dimensional orientation of the pattern itself). Hence, the difference in the position on the map can better express the nonlinear variation at higher possibility. For this reason, if the position coordinates on the map are used as the converted values corresponding to the classes, identification robust against a nonlinear variation in the pattern can be implemented at higher possibility in pattern identification later. That is, not only the MDS described in the first embodiment but also a method such as Isomap may be used in the processing of mapping the points corresponding to the classes.

Finally, a class corresponding numerical value output unit 139 outputs the three-dimensional coordinate values obtained by the Isomap processing unit 138 in correspondence with the classes to the outside (step 149). The output three-dimensional coordinate values corresponding to the classes are held in the class corresponding converted value database 15, and used as the converted values corresponding to the classes upon image conversion.

As described above, in this embodiment, the distances between the classes (the mutual relationship between the classes) are obtained using the patterns corresponding to the classes and the associated information of the patterns. Converted values corresponding to the classes are determined based on the distances, and used for conversion. This allows to preferably express the difference between conversion source patterns using values having dimensions lower to some extent such that, for example, similar converted values represent similar patterns, as in the first embodiment.

An example of a pattern identification method will be explained next, which converts a grayscale image corresponding to an extracted human face using the above-described image conversion method, and identifies the converted image as the face image of a specific person.

The arrangement of processing units of the pattern identification method according to this embodiment is also the same as in the first embodiment shown in FIG. 5. The processing procedure is also the same as in FIG. 6. In the description of the pattern identification method of the third embodiment, only parts where the process contents of the processing units are different from those of the first embodiment will be described with reference to FIGS. 5 and 6.

First, an image input unit 50 inputs a grayscale image (to be simply referred to as an input image hereinafter) corresponding to an extracted human face and including 20×20 pixels in the vertical and horizontal directions (step 60).

An image conversion unit 51 converts the input image. In this embodiment, 14×14 pixels of interest are selected, and three-dimensional vector values are obtained as converted values corresponding to the pixels of interest. For this reason, a converted image in which three-dimensional vector values corresponding to the 14×14 pixels are arranged is obtained (step 61).

Regarding the conversion result from the image conversion unit 51 as a 14×14×3=588-dimensional vector, a dimension reduction-processing unit 52 reduces the number of dimensions. The conversion result from the image conversion unit 51 has three numerical values as a converted value corresponding to each of the 14×14 pixels. As in the first embodiment, when three numerical values corresponding to each pixel are simply arranged, a sequence of 14×14×3 numerical values is obtained. This numerical value sequence is regarded as a 14×14×3=588-dimensional vector. Directly using such a high-dimensional vector often degrades the pattern identification performance. To prevent this, the dimension reduction-processing unit 52 performs dimension reduction using PCA, as in the first embodiment.

In dimension reduction using PCA, a number of grayscale images of extracted faces of various persons are prepared in advance by conversion, PCA is performed for the images, and dimension reduction is done using the result, as in the first embodiment. More specifically, for example, several thousand images are prepared by conversion, and PCA is performed for them to obtain a plurality of eigenvalues and eigenvectors. A predetermined number of eigenvalues are selected in descending order, and eigenvectors corresponding to the eigenvalues are recorded. The above-described 588-dimensional vector is projected to the eigenvectors, thereby obtaining a dimension-reduced vector. In this embodiment, 20 eigenvalues are selected in descending order, and 20 eigenvectors corresponding to them are recorded. The dimension reduction-processing unit 52 thus obtains a vector whose number of dimensions is reduced from 588 to 20. The eigenvectors can be obtained and recorded in advance. In actual processing, dimension reduction is performed by referring to the recorded eigenvectors (step 62). In this embodiment, dimension reduction using PCA is performed. However, the present invention is not limited to this, and, for example, independent component analysis or kernel based nonlinear principal component analysis may be used. The target number of dimensions to be obtained by compression may be determined using Cross Validation.

After the processing of the dimension reduction-processing unit 52, the process advances to processing of a nearest neighbor search unit 53. As in the first embodiment, the nearest neighbor search unit 53 searches the data of registered persons held in a registration database 54 for data nearest to the dimension-reduced data (steps 630 to 634).

Finally, an identification result output unit 55 outputs, based on the search result, an identification result representing the person corresponding to the input image (step 64). As in the first embodiment, final determination is performed based on the label corresponding to data with the minimum Euclidean distance in the registration database 54, which is obtained by the processing of the nearest neighbor search unit 53, the minimum distance, and a predetermined threshold. The result is output to the outside as the identification result.

The above-described processing enables to convert a grayscale image corresponding to an extracted human face using the image conversion method of this embodiment and identify the converted image as the face image of a specific person. In this embodiment, conversion invariable concerning contrast and robust to some extent concerning brightness is performed. When conversion robust against a variation in brightness or the like is performed in advance, even when a variation in brightness or the like has occurred in the input image, it is possible to identify the image as the face image of a specific person robustly against the variation. Additionally, even if the pattern slightly varies, converted values are almost similar. For this reason, recognition can be done robustly not only against a variation in brightness or contrast but also against, for example, a variation in the position of the input image.

As the pattern identification method of this embodiment, an example of pattern identification using dimension reduction by PCA and the so-called nearest neighbor method has been described, as in the first embodiment. However, the present invention is not limited to this. For example, pattern identification processing of a converted image may be done using a neural network or SVM.

In the third embodiment, an example of a method of converting a grayscale image of an extracted human face robustly against a variation in brightness or the like, and an example of a pattern identification method of identifying a converted image as the face image of a specific person robustly against a variation in brightness or the like have been described.

Fourth Embodiment

In the fourth embodiment, an example will be described in which image conversion is performed by a method different from the first to third embodiments. An example of a pattern identification method of converting a grayscale image of an extracted human face and identifying the converted image as the face image of a specific person will also be described, as in the first to third embodiments.

Figure 15:
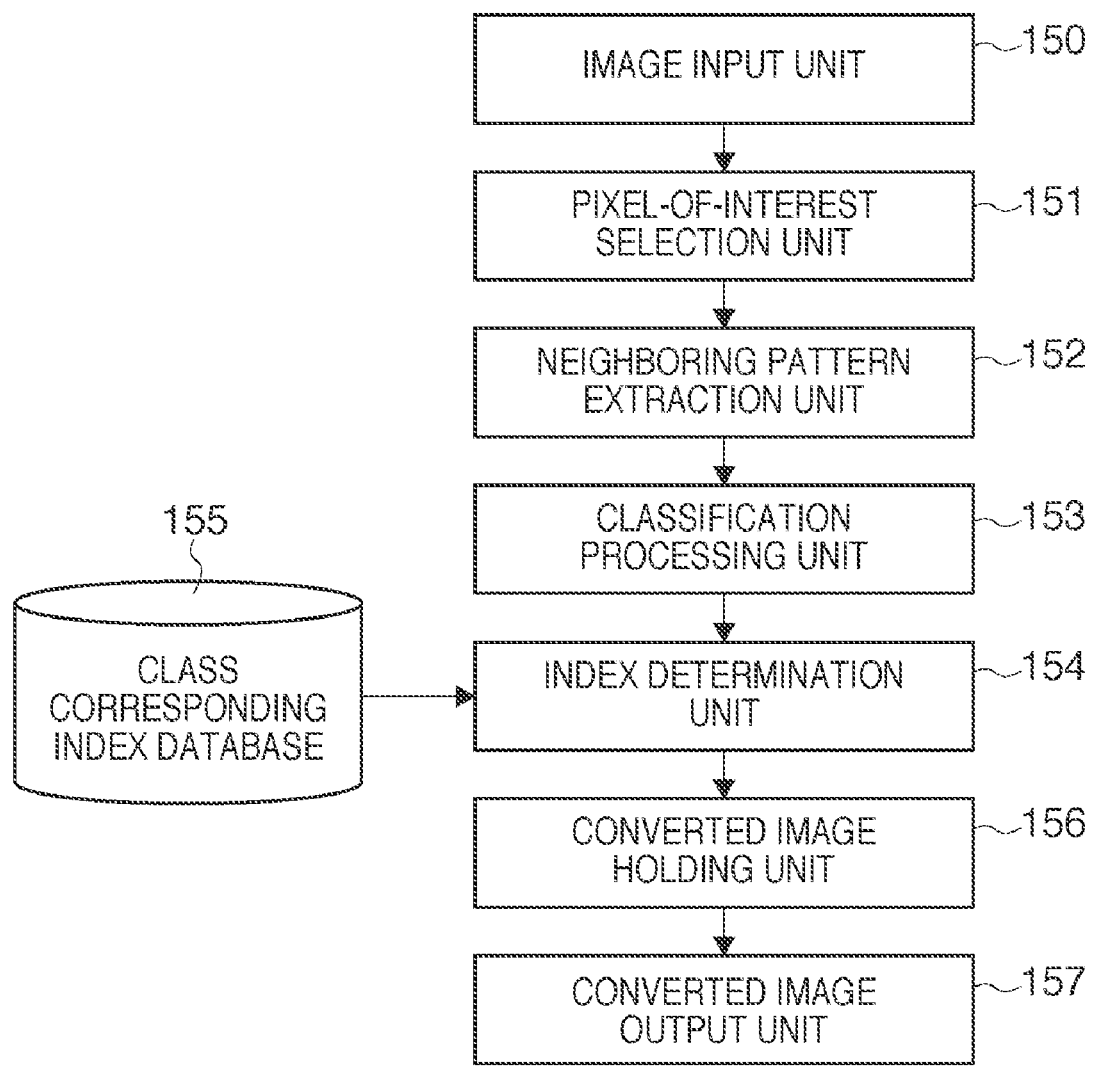
FIG. 15 is a block diagram showing the process blocks of an image conversion method according to the fourth embodiment.
Figure 16:
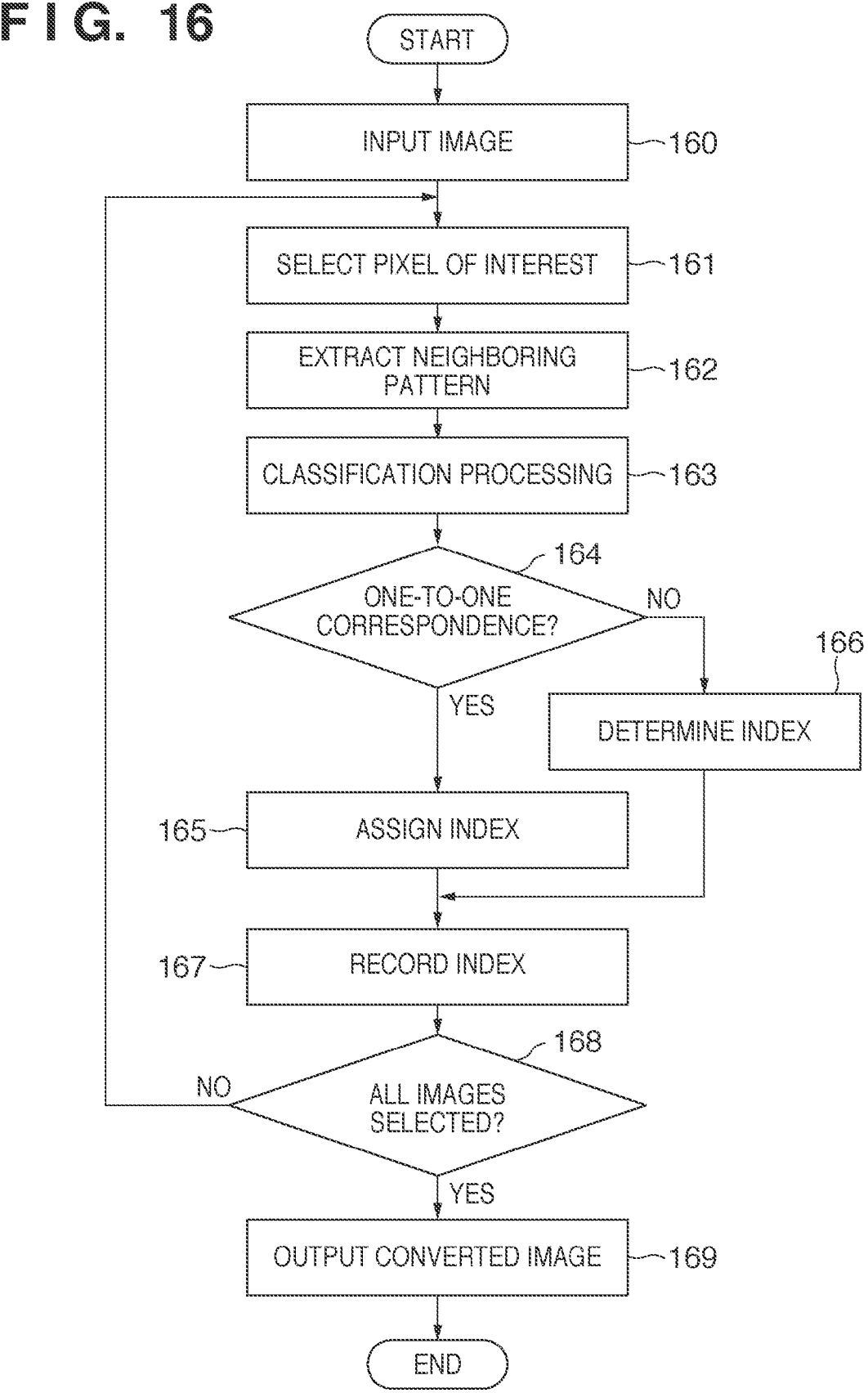
FIG. 16 is a flowchart illustrating processing of the image conversion method according to the fourth embodiment.

FIG. 15 is a block diagram showing the process blocks of an image conversion method according to the fourth embodiment. FIG. 16 is a flowchart illustrating the processing procedure of the image conversion method according to this embodiment. As can be seen from the arrangement in FIG. 15, the fundamental processing procedure of the image conversion method of this embodiment is the same as in the first embodiment. However, the process contents of an index determination unit 154 corresponding to the converted value assignment unit 14 of the first embodiment are different. In addition, converted values (indices in this embodiment) corresponding to classes, which are recorded in a class corresponding index database 155 corresponding to the class corresponding converted value database 15 of the first embodiment are different. A description of the same parts as in the first embodiment will not be repeated.

Processes from an image input unit 150 to a classification processing unit 153 (steps 160 to 163) are the same as in the first embodiment, and a description thereof will not be repeated. With the processing up to this point, a 3×3 pixel pattern having, at the center, a pixel of interest selected from an input image is classified as one of classes 0 to 255 based on the same criterion as that of LBP or CT.

Next, the index determination unit 154 determines indices corresponding to the determined classes by referring to the class corresponding index database 155 as the indices of the bins of a histogram corresponding to the selected pixel of interest. The number of dimensions of the histogram is the same as that of a self-organizing map. In this embodiment, a two-dimensional histogram having 5×5=25 bins in the vertical and horizontal directions is used. The index of a bin is formed from two integer values from 1 to 5 representing vertical and horizontal positions on the histogram. The indices recorded in the class corresponding index database 155 are indices corresponding to the classes defined based on the mutual relationship between the classes. Note that in this embodiment, the classes and the indices are not always in a one-to-one correspondence, and this will be described later in detail. How to define the indices will be explained later in detail.

In the first embodiment, the converted value assignment unit 14 reads out, from the class corresponding converted value database 15, converted values formed from real number values corresponding to the determined classes. In this embodiment, not converted values formed from real number values but indices formed from integer values are used. However, the processing makes no great difference. A large difference in processing from the first embodiment is as follows. In the first embodiment, since only one kind of value corresponds to each class, reading a numerical value corresponding to a determined class suffices. In the fourth embodiment, however, a plurality of kinds of values may correspond to each class. Hence, the processing branches first depending on whether one kind of value corresponds to a determined class (step 164). If one kind of value corresponds to the determined class, the corresponding value (an index formed from two integer values) is read out from the class corresponding index database 155, as in the first embodiment (step 165). On the other hand, if a plurality of kinds of values correspond to the determined class, first, a template corresponding to each value is compared with the 3×3 pixel pattern extracted by a neighboring pattern extraction unit 152. Each template is 3×3 pixels=nine-dimensional vector recorded in the class corresponding index database 155 in advance, and this will be described later in detail. In this comparison, the inner product of the extracted 3×3 pixel pattern and the template that is a nine-dimensional vector is simply obtained. Then, one kind of value (an index formed from two integer values) corresponding to a template having highest similarity (largest inner product) is selected and read out from the class corresponding index database 155 (step 166). How to obtain the template will be described later. That is, in this embodiment, a value is not necessarily determined for a class in a one-to-one correspondence. The value is sometimes determined by comparison with the templates, unlike the first embodiment.

The index determination unit 154 records and holds, in a converted image holding unit 156, an index formed from two integer values obtained in accordance with the above-described procedure as an index corresponding to the selected pixel of interest (step 167).

Such indices are obtained for all 18×18 pixels, as in the first embodiment. If an unselected pixel remains, the process returns to the pixel-of-interest selection processing. If all pixels have been selected and processed, the process advances to the next processing (step 168).

When the above processing has been completed for all 18×18 pixels, a converted image output unit 157 outputs the result recorded in the converted image holding unit 156 to the outside (step 169), and image conversion processing of this embodiment thus ends. With the above-described processing, an index formed from two integer values is obtained for each of the 18×18 pixels except one pixel line of each of the upper, lower, left, and right edges of the input image having 20×20 pixels. That is, an image in which indices each formed from two integer values are arranged in correspondence with the 18×18 pixels is obtained and output to the outside.

Figure 17:
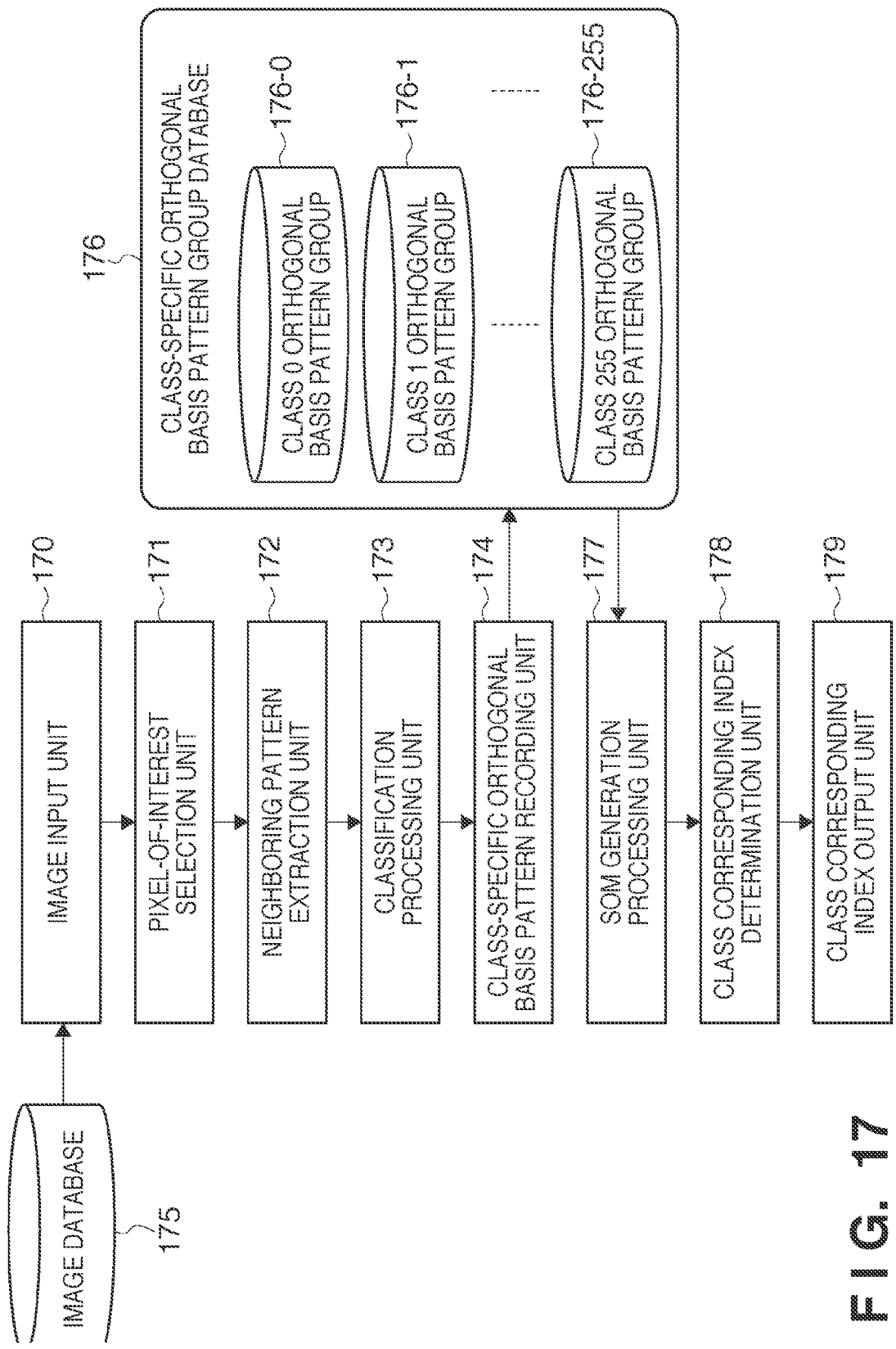
FIG. 17 is a block diagram showing the process blocks of a method of obtaining indices corresponding to classes according to the fourth embodiment.
Figure 18:
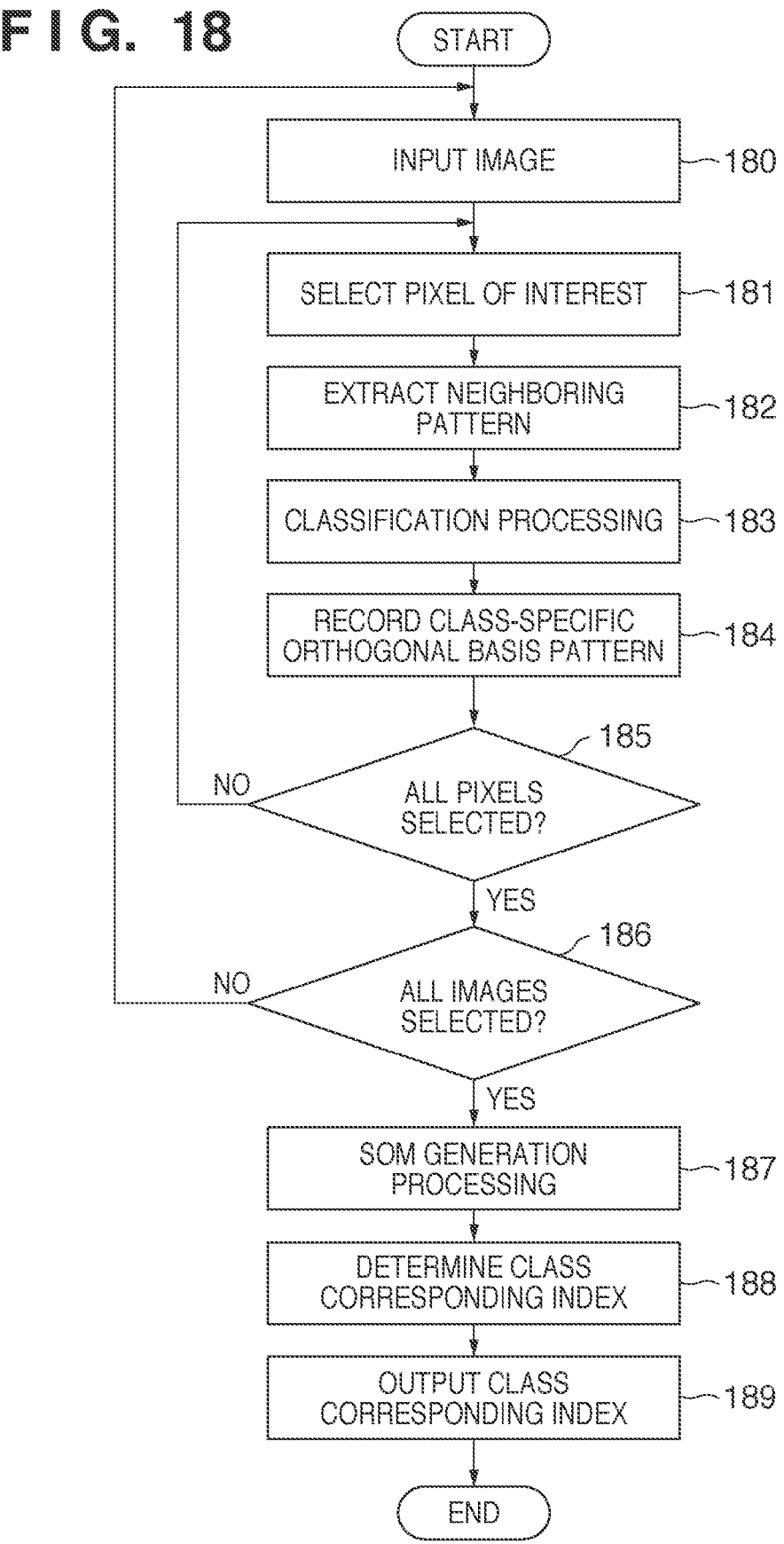
FIG. 18 is a flowchart illustrating processing of the method of obtaining indices corresponding to classes according to the fourth embodiment.

The method of obtaining indices corresponding to classes according to this embodiment will be described next. FIG. 17 is a block diagram showing the process blocks of the method of obtaining indices corresponding to classes according to this embodiment. FIG. 18 illustrates the processing procedure of the method of obtaining the indices. The fundamental procedure of the method of obtaining indices corresponding to classes according to this embodiment is the same as in the first and third embodiments. In the first and third embodiments, the distances between the classes are defined, and a map that preserves the distances between the classes as much as possible is generated to obtain the converted values corresponding to the classes. In the fourth embodiment, however, instead of explicitly obtaining the distances between the classes in advance, a map is directly generated using the SOM (Self-Organizing Map) technique of reference 11, and the indices corresponding to the classes are obtained based on the map.

In the first and third embodiments, the distances between patterns are obtained based on Euclidean distances. In the fourth embodiment as well, a SOM generation processing unit 177 to be described later needs to obtain the distances (similarities in fact) between patterns. In this embodiment, however, a distance scale (similarity) invariable against variations in brightness and contrast is used. The distance scale will be described later in detail.

The method of obtaining indices corresponding to classes will be explained below with reference to FIGS. 17 and 18. A description of the same parts as in the first and third embodiments will not be repeated.

An image input unit 170 selectively inputs one of a number of grayscale images held in an image database 175 (step 180). In the first and third embodiments, at the time of image input, grayscale images of extracted faces of various persons, each having 20×20 pixels in the vertical and horizontal directions and normalized concerning the size, rotation, brightness, and contrast, are input. In the fourth embodiment, however, an arbitrary grayscale image which has not undergone normalization of brightness and the like and is not always a human face image is input. Although the image can have an arbitrary size, an image including 640×480 pixels is used in this embodiment. Using such an arbitrary grayscale image allows a neighboring pattern extraction unit 172 to extract a variety of patterns other than patterns in a face image later. The indices corresponding to the classes obtained using such a variety of patterns are suitable for expressing various patterns. Hence, even when using an image other than a face image (for example, when detection a vehicle from an image), the method can directly be used. Note that the method can also be used even when extracting patterns from a face image, as in the first and third embodiments, but tends to be specialized to patterns usually existing in a face image. In the first and third embodiments, normalization of brightness and the like is performed in advance because without normalization, a problem arises when calculating the Euclidean distances between patterns. In the fourth embodiment, however, since a distance scale invariable against variations in brightness and contrast is used (to be described later in detail), normalization of brightness and the like is not particularly necessary.

Processes from a pixel-of-interest selection unit 171 to a classification processing unit 173 are the same as those from the pixel-of-interest selection unit 151 to the classification processing unit 153 in the first embodiment except that the input image has a size of 640×480 pixels. That is, the pixel-of-interest selection unit 171 sequentially selects pixels of interest for a total of 638×478=304,964 pixels except one pixel line of each of the upper, lower, left, and right edges of the input image. The classification processing unit 173 classifies the 3×3 pixel pattern with the selected pixel of interest at the center as one of classes 0 to 255 (steps 181 to 183).

Subsequently, a class-specific orthogonal basis pattern recording unit 174 calculates, from the 3×3 pixel pattern with the selected pixel of interest at the center, a 3×3 pixel orthogonal basis pattern which is perpendicular to the direction of brightness variation. The orthogonal basis pattern is used to obtain a similarity invariable against a variation in brightness or the like. How to obtain the orthogonal basis pattern will be described later. The calculated 3×3 pixel orthogonal basis pattern is recorded in a class-specific orthogonal basis pattern group database 176 based on the classification result (step 184). Unlike the first embodiment in which the extracted 3×3 pixel pattern is directly recorded in the database, the 3×3 pixel orthogonal basis pattern is obtained from the 3×3 pixel pattern and recorded.

The method of calculating the similarity between patterns will be described. In this embodiment, the nine-dimensional vector formed by arranging the pixel values of the 3×3 pixel pattern is represented by x. A pattern obtained by arbitrarily changing the brightness or contrast of the pattern x can be expressed as ax+b1, where a is an arbitrary positive real number, and b is an arbitrary real number (ax corresponds to a variation in contrast, and b1 corresponds to a variation in brightness). In this case, 1 represents a nine-dimensional vector whose all elements are 1. Additionally, a>0 because density inversion or the like of the pattern is not regarded as a variation in contrast. Considering that a (>0) or b of ax+b1 is changed arbitrarily, ax+b1 represents a two-dimensional subspace in the nine-dimensional space. Using the two-dimensional subspace in the nine-dimensional space allows to express a pattern including a variation in brightness or contrast. When obtaining the similarity between patterns, the similarity between such two-dimensional subspaces is obtained. This makes it possible to obtain similarity invariable against a variation in brightness or contrast. As the similarity between subspaces, the canonical angle of the subspaces, that is, the angle made by the two subspaces is used, as in the mutual subspace method of reference 12. The two-dimensional subspaces have two canonical angles (first and second canonical angles). The second canonical angle is used as the similarity between patterns. This is because the subspaces determined by two patterns whose similarity is to be obtained exhibit the same variation in brightness that is, in the direction of 1 independently of the types of the patterns, and therefore, the first canonical angle is always 0.

In the mutual subspace method of reference 12, letting P and Q be the two orthogonal projection operators to the subspaces, a canonical angle is obtained as the eigenvalue problem of PQP or QPQ (the obtained eigenvalue is the square of the cosine of the canonical angle). In this embodiment, however, since the first canonical angle is self-evident, and only one canonical angle remains, the second canonical angle (or its cosine) is obtained by a simple method to be described below.

First, two orthonormal bases of the two-dimensional subspace that expresses variations in the brightness and contrast of a pattern are obtained. To do this, the Gram-Schmidt orthogonalization process of reference 13 is used. At this time, a first basis $u_1$ is defined as a normal basis in the direction of brightness variation, that is, the direction of vector 1, which is common to an arbitrary pattern. That is, the first basis $u_1$ is defined as $1/|1|$ (nine-dimensional vector whose all elements are ⅓).

In this case, using the Gram-Schmidt orthogonalization process, a second orthonormal basis $u_2$ for the pattern x is obtained by $$u_2 = \frac{x - (u_1^T x) \cdot u_1}{|x - (u_1^T x) \cdot u_1|} \quad (2)$$

The second orthonormal basis $u_2$ is the 3×3 pixel (=nine-dimensional) orthogonal basis pattern that is obtained from the 3×3 pixel pattern x and is perpendicular to the direction of brightness variation. The second orthonormal basis $u_2$ is recorded in the class-specific orthogonal basis pattern group database 176. At this time, the cosine of the second canonical angle between the two patterns is obtained by calculating the inner product of the second orthonormal basis $u_2$ and each pattern. In the canonical angle calculation method of the mutual subspace method of reference 12, since the subspace to be compared is not a half space (a $\leq$0 is also included in the subspace ax+b1), the canonical angle is always 90° or less. For this reason, for example, if two patterns x and y hold y=−x (actually, since luminance values are positive, the two patterns never satisfy the expression), the second canonical angle between the two patterns is also 0. However, when the second canonical angle calculation method of this embodiment is used, the second canonical angle between the two pattern that satisfy y=−x is 180° (the cosine is −1). That is, for patterns with inverted luminance values, the cosine of the second canonical angle becomes small so that the difference between the patterns can be reflected well. In addition, the inner product of the orthogonal basis pattern $u_2$ corresponding to the pattern x and ax+b1 (which can be regarded as a vector representing an arbitrary point on the subspace corresponding to the pattern) always coincides with the sign of a. That is, when a>0, the inner product is 0 or more. Hence, the orthogonal basis pattern $u_2$ can be considered as a vector that should be on a half space of the subspace ax+b1, where a>0. For this reason, the second canonical angle obtained using the orthogonal basis pattern $u_2$ is the second canonical angle of the half space where a>0. The condition that the subspace that expresses a variation is a half space can also be satisfied.

The cosine of the second canonical angle between orthogonal basis patterns corresponding to two 3×3 pixel patterns is obtained as the inner product of two vectors. In this embodiment, the cosine of the second canonical angle is used as the similarity between the two patterns (which is 1 when the two patterns completely match). The orthogonal basis pattern never changes even when variations are applied by, for example, doubling each pixel value of the pattern (contrast variation), and subtracting 30 from the value (brightness variation). For this reason, the second canonical angle obtained as the similarity between the patterns is the same even in case of the above-described variations, and is invariable against a variation in contrast or brightness. As described above, in this embodiment, the similarity between patterns which is invariable against a variation in brightness or the like is calculated. To do this, the class-specific orthogonal basis pattern recording unit 174 records, in the class-specific orthogonal basis pattern group database 176, orthogonal basis patterns necessary for the similarity calculation as a sequence of nine numerical values.

The orthogonal basis pattern can be obtained from the 3×3 pixel pattern basically using equation (2). However, in a special case in which x=b1 (b is an arbitrary real number), the denominator of equation (2) is 0, and the value cannot be obtained. In this embodiment, the pattern x=b1 is almost insignificant in subsequent processing (the pattern is not used for calculation or is insignificant in using it), and may be neglected. However, in this embodiment, when x=b1, the orthogonal basis pattern is obtained as a nine-dimensional vector whose all elements are 0. At this time, the inner product of this orthogonal basis pattern and an orthogonal basis pattern obtained from another pattern, that is, the cosine of the second canonical angle between two subspaces is always 0. Basically, even if all elements of an orthogonal basis pattern are 0, the inner product can be defined as the similarity between the subspaces. In this embodiment, however, if x=b1 in both patterns, that is, only when all elements are 0 in both patterns, the similarity is set to 1 as a special action.

Revert to the description of the method of obtaining indices corresponding to classes. The processing in steps 181 to 184 is executed for a total of 638×478=304,964 pixels to be selected as a pixel of interest in one input image. If an unselected pixel remains, the process returns to step 181. If all the 304,964 pixels have been selected and processed, the process advances to the next processing (step 185).

With the above-described processing, 304,964 orthogonal basis patterns are recorded, in the class-specific orthogonal basis pattern group database 176, as orthogonal basis pattern groups corresponding to the determined classes per image. This processing is executed for all images held in the image database 175. If an uninput image remains, the process returns to the processing of the image input unit 170. If all images have been input and processed, the process advances to processing of the SOM generation processing unit 177 (step 186).

With the processing up to this point, a number of orthogonal basis patterns are recorded in the class-specific orthogonal basis pattern group database 176 for the classes corresponding to the patterns. In this embodiment, 100 images are used as the input images. Since 304,964 orthogonal basis patterns are extracted from each image, a total of 100×304,964=30,496,400 orthogonal basis patterns are recorded in the class-specific orthogonal basis pattern group database 176. If no orthogonal basis pattern is recorded for an orthogonal basis pattern group corresponding to a class, the processing is continued until at least one orthogonal basis pattern is recorded, as in the first and third embodiments.

Subsequently, the SOM generation processing unit 177 generates a predetermined dimensional map using the SOM technique of reference 11 based on a number of orthogonal basis patterns recorded in the class-specific orthogonal basis pattern group database 176 so far. The predetermined dimensional map is formed by arranging a plurality of neurons on a predetermined dimensional space in a grid pattern. Each neuron has a vector value called a weight vector. The number of dimensions of the map and the number of neurons of the map are arbitrary. In this embodiment, a two-dimensional map including 100×100 neurons arranged in a grid pattern in the vertical and horizontal directions is generated. The predetermined dimensional map generated by the SOM generation processing unit 177 will be simply referred to as a SOM hereinafter. A neuron that is the ith from the top and jth from the left of the generated SOM is expressed as a neuron at a position (i,j).

Figure 19:
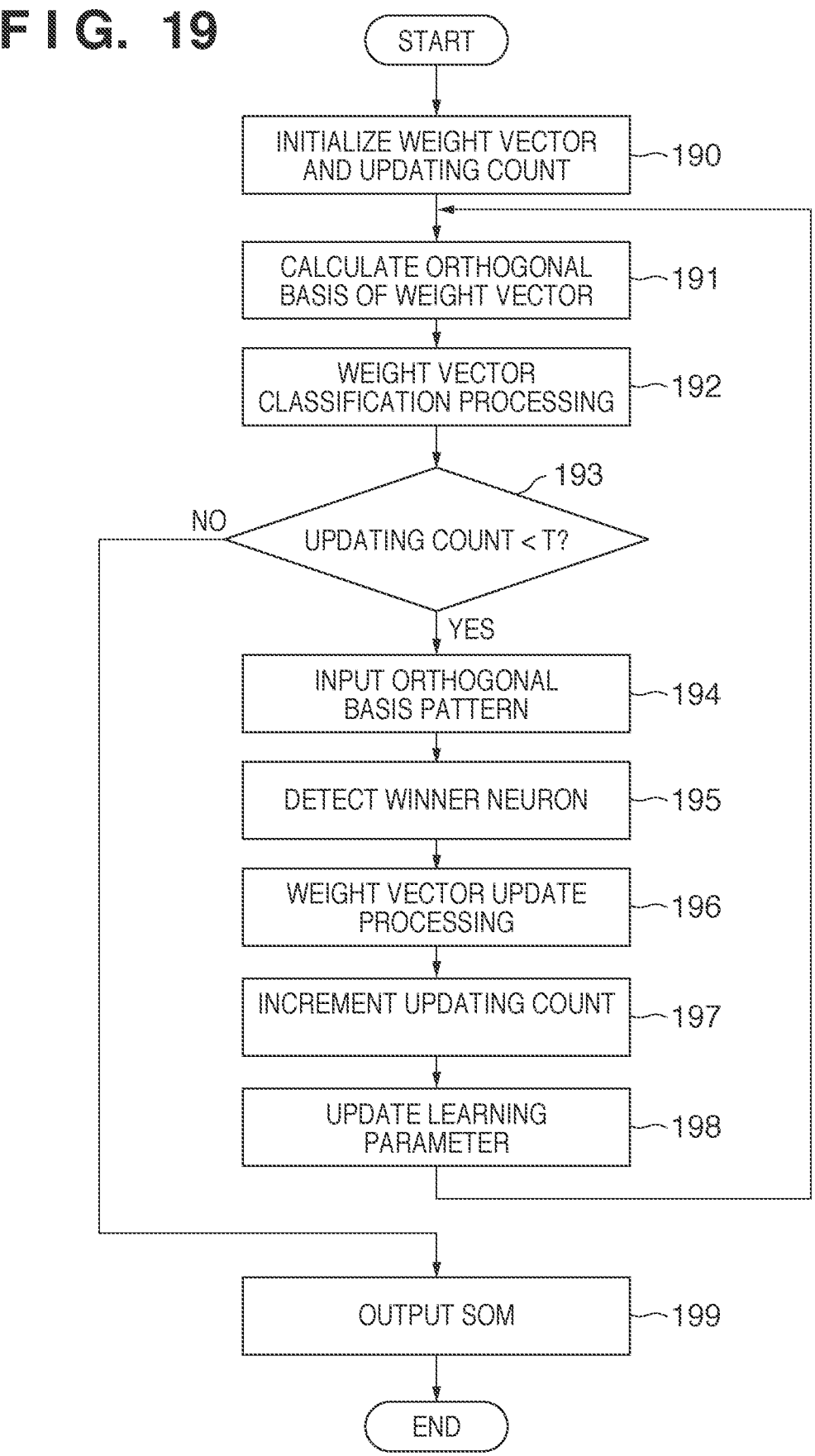
FIG. 19 is a flowchart illustrating SOM generation processing according to the fourth embodiment.

FIG. 19 illustrates the processing procedure of the SOM generation processing unit 177.

First, in step 190, the weight vectors of the neurons of the SOM are initialized at random, and an updating count t is set to 0. In this embodiment, since a two-dimensional SOM including 100×100 neurons in the vertical and horizontal directions is used, the weight vectors of the 100×100=10,000 neurons are initialized at random. Since the SOM of this embodiment uses the orthogonal basis patterns as inputs, the weight vector of each neuron is a nine-dimensional vector like the orthogonal basis pattern. Hence, nine numerical values are set for each neuron at random. However, if all the nine elements are 0, a problem arises in step 191. To prevent this, initialization is performed not to set 0 in all elements.

In step 191, an orthogonal basis pattern is obtained from the current weight vector using equation (2). More specifically, x in equation (2) is replaced with the current weight vector, and the orthogonal basis pattern $u_2$ at that time is obtained. The obtained orthogonal basis pattern replaces the current weight vector. The processing of calculating an orthogonal basis pattern from a weight vector and replacing the weight vector with the orthogonal basis pattern will be referred to as an orthogonal basis calculation hereinafter.

In step 192, the weight vector of each neuron is classified as a class. The classification is done based on the value of the weight vector of each neuron having undergone the orthogonal basis calculation in step 191 representative vector the same criterion as in the processing of step 183. The classification method will be described in detail using an example in which the weight vector of a neuron is $(w_1,w_2,w_3,w_4,w_5,w_6,w_7,w_8,w_9)^T$. This vector is regarded as a 3×3 pixel pattern. The value $w_5$ corresponding to the central position is regarded as the value of the pixel of interest. The value $w_5$ is compared with each of the eight values $w_1$ to $w_4$ and $w_6$ to $w_9$. If the comparison result is larger than $w_5$, 1 is defined. Otherwise, 0 is defined. A sequence of eight such values is regarded as a binary number and converted into a decimal number. The converted value represents the number of classes to which the weight vector belongs. The determined class number is recorded in each neuron together with its weight vector. The class number will be referred to as the class of each neuron hereinafter.

The processing of initializing the SOM is thus performed. From then on, the SOM is actually updated using the input data, that is, the orthogonal basis patterns recorded in the class-specific orthogonal basis pattern group database 176, thereby generating a SOM.

In step 193, if the updating count t has reached an upper limit T, the SOM updating ends, and the process advances to step 199. Otherwise, the process advances to step 194 to continue updating the SOM. The upper limit T need only be large to some extent. In this embodiment, the value T is about twice the number of orthogonal basis patterns recorded in the class-specific orthogonal basis pattern group database 176, that is, 30,496,400×2≈60,000,000. Immediately after the end of SOM initialization, t=0. Hence, the process advances to step 194.

In step 194, one orthogonal basis pattern is selectively input from the class-specific orthogonal basis pattern group database 176 at random. If all elements of the selected orthogonal basis pattern are 0, subsequent weight vector update processing is almost insignificant. In this case, another orthogonal basis pattern is selected again at random.

In step 195, a neuron (called a winner neuron) most coincident with the input orthogonal basis pattern is detected from the 100×100 neurons. In general SOM, the inner product or Euclidean distance between the input vector and the weight vector is calculated for all neurons. A neuron with the largest inner product or shortest Euclidean distance is detected as a winner neuron. In this embodiment, however, the inner product is corrected to detect a winner neuron. More specifically, based on the class to which the input orthogonal basis pattern belongs and the determined class of each neuron, a winner neuron is detected using a corrected value (coincidence) of the inner product.

Let $u_2$ be the input orthogonal basis pattern, $c^{in}$ be the class number to which the orthogonal basis pattern belongs, w be the weight vector, and $c^w$ be the class to which the orthogonal basis pattern belongs. The coincidence is obtained by $(u_2^T w + 1)\{1+\alpha\cdot\delta(c^{in},c^w)\}$, where $\delta(c^{in},c^w)$ is the Kronecker delta which is 1 only when $c^{in}=c^w$, and 0 otherwise, and $\alpha$ is a predetermined positive constant which determines the degree of increase in coincidence when the class of the orthogonal basis pattern and that of the neuron are the same. The detailed value $\alpha$ is appropriately determined within the range of 0 to 1. In this embodiment, $\alpha$=0.5. If $\alpha$=0, the processing is equivalent to using the inner product without considering the class of the orthogonal basis pattern. If $\alpha$=1, the coincidence for the same class is higher than that for different classes, except for a special case. The coincidence calculation considering the class of the orthogonal basis pattern is no essential element. However, this increases the probability that the neuron of the same class is detected as the winner neuron so that the tendency grows to cause neurons of the same class to form a cluster in the generated SOM.

In step 195, the above-described coincidence is obtained between the input orthogonal basis pattern and each of 100×100 neurons. A neuron with the highest coincidence is detected as the winner neuron. The coincidence to be used as the criterion to detect the winner neuron is basically obtained using the inner product of the orthogonal basis pattern and the weight vector of each neuron. The weight vector of each neuron have undergone the orthogonal basis calculation in step 191. For this reason, the inner product obtained here can be regarded as the cosine of the second canonical angle between the two subspaces. That is, the winner neuron is determined based on the second canonical angle between the subspace defined by its weight vector and the subspace corresponding to the original pattern and defined by the input orthogonal basis pattern (although in fact, correction is done due to the difference of classes).

Next in step 196, the weight vectors of the winner neuron and the neighboring neurons around it are updated based on the input orthogonal basis pattern. For weight vector updating in the SOM, various methods have been proposed, and any method is usable. In this embodiment, when the position of the detected winner neuron is represented by $(i_{win},j_{win})$, the weight vector is updated by $$w_{i,j}(k+1)=w_{i,j}(k)+\eta_k\cdot\Lambda_k\{(i,j),(i_{win},j_{win})\}\cdot\{u_2-w_{i,j}(k)\} \quad (3)$$

where $w_{i,j}(k)$ is the weight vector of a neuron at the position (i,j) when the updating count t=k. In this case, $w_{i,j}(k)$ is the weight vector of the neuron at the position (i,j) before updating, and $w_{i,j}(k+1)$ is that after updating. In addition, $u_2$ is the input orthogonal basis pattern, $\eta_k$ is the degree of weight vector updating, and $\Lambda_k$ is the updating range which is given by $$\eta_k = \eta_0 \cdot (1 - k/T) \quad (4)$$

$$\Lambda_k\{(i, j), (i_{win}, j_{win})\} = \begin{cases} 1 - \left(\beta + \gamma \cdot \dfrac{k}{T}\right) d(\Delta_{i,j}^{win}) & \left[\left(\beta + \gamma \cdot \dfrac{k}{T}\right) d(\Delta_{i,j}^{win}) < 1\right] \\ 0 & \left[\left(\beta + \gamma \cdot \dfrac{k}{T}\right) d(\Delta_{i,j}^{win}) \geq 1\right] \end{cases} \quad (5)$$

$$d(\Delta_{i,j}^{win}) = \sqrt{(i - i_{win})^2 + (j - j_{win})^2}$$

where $\eta_0$ in equation (4) is the initial learning coefficient which is a positive constant smaller than 1. The coefficient $\eta_0$ is appropriately determined within the range of about 0.1 to 1. In this embodiment, $\eta_0$=0.8. As is apparent from equation (4), $\eta_k$ gradually decreases as the updating count t increases, and becomes 0 when k=T. That is, when the updating count t is small, the degree of weight vector updating is high. As the updating count t increases, the degree of updating lowers.

Additionally, β in equations (5) is a parameter that adjusts the updating range of the neuron whose weight vector is to be updated at the initial updating count, and γ is a parameter that adjusts the updating range at the final stage of the updating count. Both the two parameters are positive constants and are basically set within a range that satisfies β+γ<1. Detailed values are appropriately set in accordance with the scale of the SOM to be generated. In this embodiment, β=0.02, and γ=0.8. As is apparent from equations (5), $\Lambda_k$ is a window function whose value decreases as the position separates from the position of the winner neuron (becomes 0 when the distance is equal to or more than a predetermined value). The (spatial) size of the window function gradually becomes small in accordance with the updating count. Using such a window function allows to generate a SOM as a topological map on which similar elements are arranged in the vicinity. When the size of the window function is decreased in accordance with the updating count, the range of influence of updating is gradually localized. For this reason, in updating at the latter half stage, importance is attached to the topology between closer arrangements, and the topology of the entire map built halfway through is not so largely changed.

In step 196, the weight vector of each neuron is updated using equation (3). The value of the updated portion (the second term of equation (3)) of a neuron at a position $\Lambda_k\{(i,j),(i_{win},j_{win})\}=0$ is 0. That is, the value is not updated actually. Hence, the weight vectors of all neurons except those at that position are updated.

After the weight vector updating has ended, the value of the updating count t is incremented by one in step 197. Accordingly, the degree of weight vector updating and the updating range for weight vector updating in step 196 of the next cycle are decreased, as described above (step 198). If the value t is incremented by one to yield t=T, the SOM updating ends. Hence, after the processing in steps 191 and 192, the process advances from step 193 to step 199.

After the end of processing up to step 198, the process returns to steps 191 and 192. At the initial stage (when t=0), the orthogonal basis calculation and classification are done for the weight vectors of all neurons in these steps. From the second or subsequent stage, only the neurons whose weight vectors have been updated undergo the orthogonal basis calculation and classification.

The above-described processing is repeatedly performed until t=T. That is, when t=T holds, after the processing in steps 191 and 192, the process advances from step 193 to step 199. In step 199, the weight vectors of all the 100×100 neurons and corresponding classes are output together with the positions of the neurons.

The processing (step 187) of the SOM generation processing unit 177 thus ends, and the process advances to the processing of a class corresponding index determination unit 178.

The processing of the class corresponding index determination unit 178 will be described next.

The class corresponding index determination unit 178 determines an index corresponding to each class based on the generated SOM. As described above, in this embodiment, a plurality of kinds of values may correspond to one class. In such a case, the class corresponding index determination unit 178 also performs processing to obtain a template (3×3 pixels=nine-dimensional vector to be used by the index determination unit 154) corresponding to each of the plurality of kinds of values.

Figure 20:
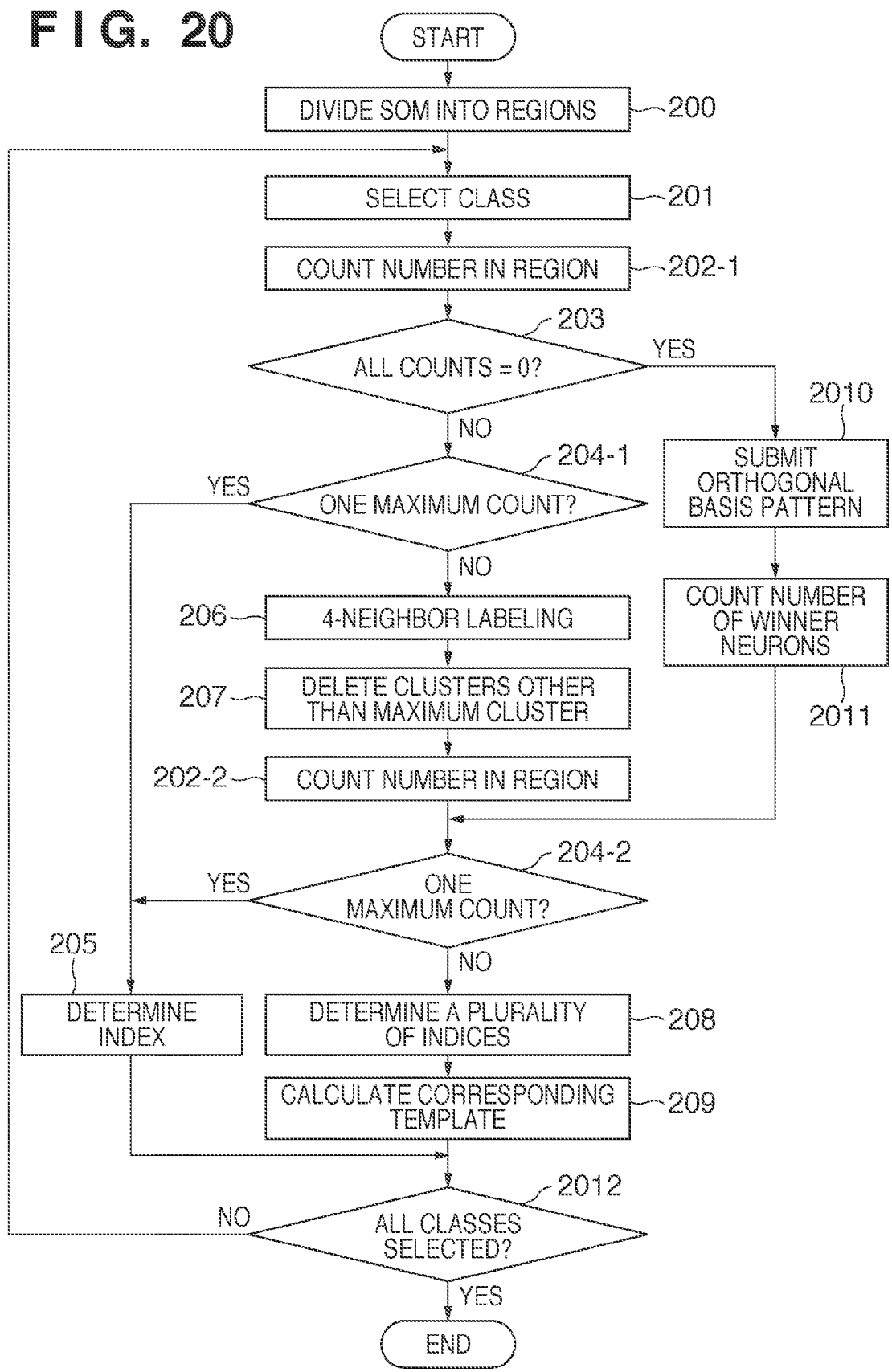
FIG. 20 is a flowchart illustrating class corresponding index determination processing according to the fourth embodiment.

FIG. 20 illustrates the procedure of processing of the class corresponding index determination unit 178.

First, in step 200, the generated SOM is divided into a plurality of regions. The regions are rectangular regions having the same size. However, the region size may be changed depending on the position (for example, a region at the center of the SOM has a smaller size). Each region may have not a rectangular shape but any other shape such as a hexagonal shape. In this embodiment, the generated SOM is divided into 5×5=25 square regions in the vertical and horizontal directions. Since the SOM of this embodiment includes 100×100 neurons, a region of 20×20=400 neurons corresponds to one divided region. A divided region that is the ith from the top and jth from the left of the generated SOM is expressed as a region (i,j).

In step 201, classes 0 to 255 are sequentially selected one by one. The classes can be selected in any order. In this embodiment, the classes are sequentially selected from class 0.

In step 202-1, out of the neurons in the divided region, the number of neurons whose weight vectors belong to the class that coincides with the selected class is obtained. This processing is performed for each of the divided regions. The classes to which the weight vectors belong are the classes determined in step 192. For example, if class 0 is selected, neurons classified as class 0 are counted in each region. The number of neurons in each region, which coincides with the selected class, will be referred to as a class coincidence count hereinafter.

In step 203, if the class coincidence count is 0 in all regions (in this embodiment, 5×5=25 regions), the process advances to step 2010. This state occurs if none of the neurons in the generated SOM is classified as the selected class. Without such a state, that is, if the class coincidence count is not 0 (total count≠0), the process advances to step 204-1. The processing in step 2010 will be described later. The case in which the process advances to step 204-1 will be described first.

In step 204-1, the processing branches depending on whether the number of regions having the maximum class coincidence count obtained in step 202-1 is 1. If the number of regions having the maximum class coincidence count is 1, the process advances to step 205. Otherwise, the process advances to step 206.

If the number of regions having the maximum class coincidence count is 1, only one kind of index corresponds to the selected class. Hence, the position (i,j) of the region with the maximum class coincidence count is defined as the index corresponding to the class (step 205). The index corresponding to one selected class is thus determined, and the processing for the one class ends. If not all classes have been selected, the process returns to the class selection step 201 to select the next class. If all classes have been selected and processed, the processing of the class corresponding index determination unit 178 ends (step 2012).

On the other hand, if the number of regions having the maximum class coincidence count is not 1, the process advances to step 206 to perform 4-neighbor labeling for neurons corresponding to the selected class. In this 4-neighbor labeling, it is determined whether neurons of the same class (neurons whose weight vectors are classified as the same class) exist at vertical or horizontal adjacent positions. If such neurons exist, they are connected as one cluster. This will be described later using a detailed example.

When the processing in step 206 has ended, the number of connections of each cluster is counted, and a cluster having the maximum number of connections is detected in step 207. Only the cluster with the maximum number of connections is left, and the neurons belonging to the remaining clusters are deleted. Deletion here means that when obtaining the class coincidence count in each region again in step 202-2, the deleted neurons are not counted as the class coincidence count. If there are a plurality of clusters having the maximum number of connections, all the plurality of clusters are left.

Next in step 202-2, the class coincidence count in each region is obtained, as in the processing of step 202-1. In this case, however, the neurons deleted in step 207 are not counted as the class coincidence count, as described above.

In step 204-2, the processing branches depending on whether the number of regions having the maximum class coincidence count is 1, as in step 204-1. If the number of regions having the maximum class coincidence count is 1, the process advances to step 205. If a plurality of regions have the maximum class coincidence count, the process advances to step 208.

If the number of regions having the maximum class coincidence count is 1, the process advances to step 205 at the branch in step 204-2. In this case, the same processing as in step 205 described above is performed. That is, only one kind of index corresponds to the class selected in step 201. The position (i,j) of the region with the maximum class coincidence count is defined as the index corresponding to the class. The index corresponding to one selected class is thus determined, and the processing for the one class ends. As in the above-described case, it is determined in step 2012 whether all classes have been selected and processed, and the processing branches to step 201 or the end of the processing of the class corresponding index determination unit 178.

Upon determining, even based on the class coincidence count obtained in step 202-2, that a plurality of regions have the maximum class coincidence count, the process advances to step 208, as described above. At this time, it is determined that a plurality of kinds of indices correspond to the class selected in step 201, and the indices corresponding to all regions with the maximum class coincidence count obtained in step 202-2 are defined as the indices corresponding to the class. More specifically, for example, assume that number of regions having the maximum class coincidence count obtained in step 202-2 is 2, and the positions of the regions are $(i_1,j_1)$ and $(i_2,j_2)$. In this case, both the two indices $(i_1,j_1)$ and $(i_2,j_2)$ are determined as the indices corresponding to the selected class in step 208.

After the processing in step 208 has ended, a template corresponding to each of the plurality of indices determined in step 208 is obtained in step 209. The template is obtained by calculating, in each region with the maximum class coincidence count, the average vector of the weight vectors of neurons whose belonging class coincides with the selected class, and calculating the orthogonal basis of the vector. This orthogonal basis calculation is also performed using equation (2). However, since each weight vector has already undergone orthogonal basis calculation, simple normalization (make the vector size to 1) is performed actually. Since the weight vector of this embodiment has nine dimensions, the template is also obtained as a nine-dimensional vector. In step 209, such a template that is a nine-dimensional vector is obtained for each of the plurality of kinds of determined indices and recorded in correspondence with the index. The templates are recorded in the class corresponding index database 155 together with the corresponding indices, and used in the processing of the index determination unit 154 in actual image conversion.

When a plurality of kinds of indices correspond to one class, an inner product is calculated first, as described above. More specifically, the inner product between the extracted 3×3 pixel pattern and a template recorded for each of the plurality of kinds of indices corresponding to the class to which the pattern belongs is calculated. An index corresponding to the template with the maximum inner product is selectively read out from the class corresponding index database 155. In this embodiment, an inner product is simply used as the method of calculating the similarity to the templates. According to the above-described similarity calculation method using the second canonical angle (or its cosine), the extracted 3×3 pixel pattern needs also undergo the orthogonal basis calculation. However, since the templates used here have already undergone the orthogonal basis calculation. In this case, only the relationship between each template and a corresponding second canonical angle (or its cosine) is determined. It is therefore unnecessary to calculate the orthogonal basis of the extracted 3×3 pixel pattern (the result of relationship does not change depending on the presence/absence of orthogonal basis calculation).

After the end of processing in step 209, the processing branches from step 2012 to step 201 or the end of the processing of the class corresponding index determination unit 178, as in the above-described case. With the above-described processing, one or a plurality of indices corresponding to the selected class and corresponding templates are obtained for the case in which the class coincidence count obtained in step 202-1 is not 0 in all regions.

Finally, a case in which the class coincidence count is 0 in all regions, and the process advances from step 203 to step 2010 will be described.

First, in step 2010, a number of orthogonal basis patterns corresponding to the selected class and recorded in the class-specific orthogonal basis pattern group database 176 are sequentially input to the SOM one by one. If the number of orthogonal basis patterns is large to some extent, an arbitrary number of orthogonal basis patterns are input. In this embodiment, however, all orthogonal basis patterns corresponding to the selected class are sequentially input. At this time, as in the processing of the SOM generation processing unit 177, only detection of a winner neuron corresponding to an input orthogonal basis pattern is simply performed without updating the weight vector. More specifically, the inner product between the input orthogonal basis pattern and the weight vector of each of the 100×100 neurons in the generated SOM is calculated, and a neuron with the maximum inner product is detected as the winner neuron. In the winner neuron detection by the SOM generation processing unit 177 described above, a coincidence considering the determined class is used. In this case, however, since the classes never coincide, the inner product is simply obtained. Such winner neuron detection is performed for a number of orthogonal basis patterns input, and the number of times each neuron has been detected as a winner neuron is counted.

Next in step 2011, for each of the regions divided in SOM region division 200, the sum of the numbers of times a neuron in the region has been detected as a winner neuron is obtained. The sum of the numbers of times of winner neuron detection will be referred to as a winner count hereinafter. The winner count in each region obtained here is regarded as the equivalent to the class coincidence count, and the process advances to step 204-2. After that, the same processing as that from step 202-2 described above is performed. More specifically, if, out of the winner counts in each region obtained here, only one region has the maximum winner count, the process advances to step 205 to determine the index corresponding to the region as the index corresponding to the selected class. In this case, only one kind of index corresponds to the selected class.

On the other hand, if a plurality of regions have the maximum count, the process advances to step 208 to determine the indices corresponding to the plurality of regions as the indices corresponding to the selected class. However, the condition that a plurality of regions have the maximum count rarely occurs in a normal state. In this case, since a plurality of kinds of indices correspond to the selected class, a template corresponding to each of the plurality of kinds of indices is obtained in step 209, as described above. In step 209 described above, the average of the weight vectors of neurons that coincide with the selected class in that region is subjected to the orthogonal basis calculation and defined as a template. In this case, however, since there are no neurons that coincide with the selected class, the average of the weight vectors of all neurons in the region is calculated, subjected to the orthogonal basis calculation, and defined as a template. The template is recorded in the class corresponding index database 155, and used in the processing of the index determination unit 154.

After the end of the above-described processing (step 205 or step 209), the process advances to step 2012. The processing branches from step 2012 to step 201 or the end of the processing of the class corresponding index determination unit 178. With the above-described processing, one or a plurality of indices corresponding to the selected class and corresponding templates are obtained for the case in which the class coincidence count is 0.

As described above, each of the plurality of regions obtained by dividing the SOM is defined as the bin of a histogram having the same number of dimensions as that of the SOM. Based on the mapping state of the plurality of classes in each of the plurality of regions, a bin corresponding to each class is determined. With the above-described processing, one or a plurality of kinds of indices and corresponding templates are obtained for all classes (classes 0 to 255). The processing of the class corresponding index determination unit 178 (step 188) thus ends, and the process advances to the processing of the class corresponding index output unit 179.

Concerning the processing of the class corresponding index determination unit 178, a description of some portions (for example, step 206) has been omitted. Since the processing is supposed to be cumbersome and hard to understand, the processing of the class corresponding index determination unit 178 will be explained using an example of a generated SOM as shown in FIG. 21.

Figure 21:
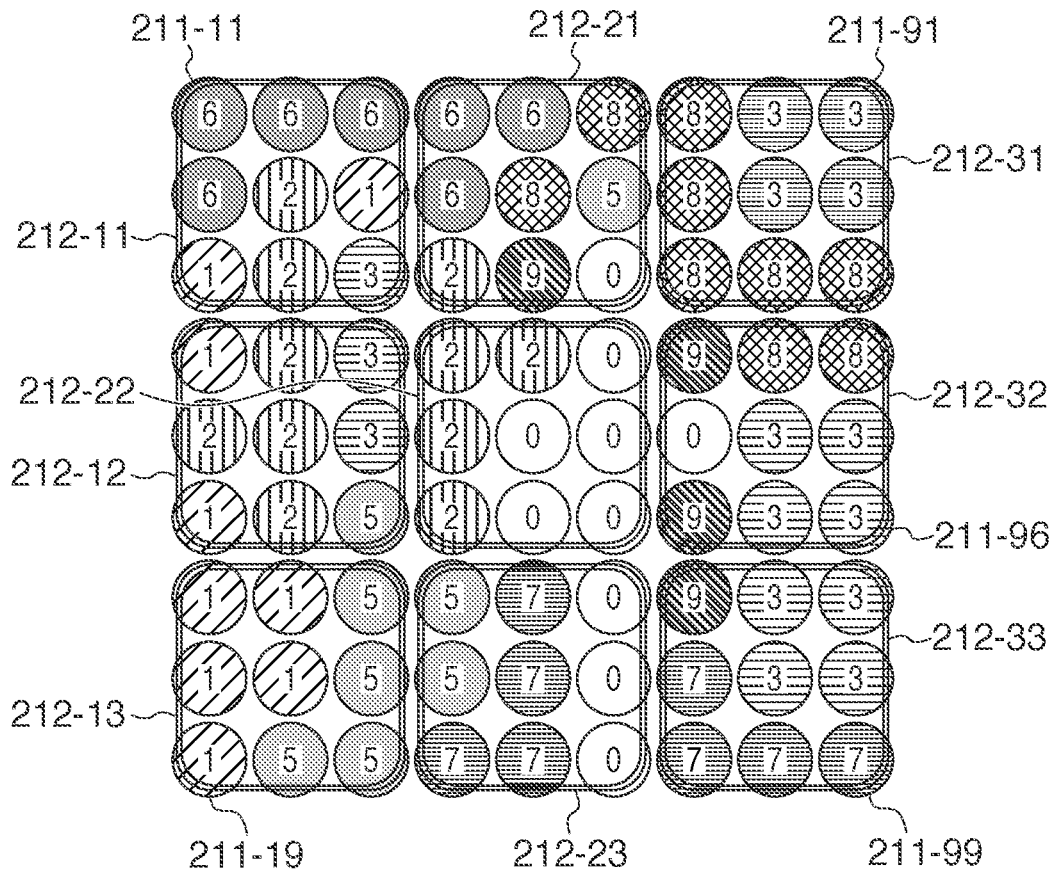
FIG. 21 is a view showing a simple example of SOM generated in the fourth embodiment.

The generated SOM shown in FIG. 21 originally has 100× 100=10,000 neurons, and the number of classes is 256. In this example, however, the total number of neurons are set to 9×9=81, and the number of classes is 10 from class 0 to class 9, for the descriptive convenience. The generated SOM is originally divided into 5×5=25 regions. However, a case in which the SOM is divided into 3×3=9 regions will be explained for the sake of simplicity.

Referring to FIG. 21, circles (for example, 211-11 and 211-96) represent the neurons of the SOM. A numerical value in each circle indicates the class to which the neuron belongs. In FIG. 21, a neuron that is the ith from the top and jth from the left is expressed as 211-$ij$ (only several neurons are illustrated). Regions (for example, 212-11 and 212-33) indicated by double line frames in FIG. 21 represent the regions obtained by dividing the SOM of this example. A region that is the ith from the top and jth from the left is expressed as 212-$ij$. Using the example of a SOM shown in FIG. 21, the method of determining an index corresponding to each of classes 0 to 9 will be described.

SOM region division (step 200) is done as illustrated in FIG. 21. Then, focus is placed on each class sequentially (step 201). Focus is placed on class 0, and the class coincidence count in each region is obtained (step 202-1) in the following way.

Region 212-11: 0
Region 212-21: 1
Region 212-31: 0
Region 212-12: 0
Region 212-22: 5 . . . maximum
Region 212-32: 1
Region 212-13: 0
Region 212-23: 3
Region 212-33: 0

For class 0, the maximum class coincidence count is 5, and only one region has the maximum class coincidence count. An index (2,2) corresponding to the region is determined as the index corresponding to class 0 (steps 204-1 and 205). With the same processing, the indices corresponding to the classes are (1,3) for class 1, (1,3) for class 5, (1,1) for class 6, (3,1) for class 8, and (3,2) for class 9.

As for class 2, the maximum class coincidence count is 4 in the regions 212-12 and 212-22. Hence, the process advances to 4-neighbor labeling (step 204-1). In 4-neighbor labeling, as described above, if neurons of the same class exist vertically or horizontally, they are connected to build a group (cluster) of several connected neurons (step 206). In the example of class 2, two clusters are built. One of the clusters is formed by connecting two neurons of class 2 in the region 212-11 and four neurons of class 2 in the region 212-12, that is, a total of six neurons. The other cluster is formed by connecting one neuron of class 2 in the region 212-21 and four neurons of class 2 in the region 212-22, that is, a total of five neurons. That is, in the 4-neighbor labeling, neurons of the same class that exist vertically or horizontally are connected to build a cluster. Out of the several built clusters, a cluster with the maximum number of connections is left. Neurons belonging to the remaining clusters are deleted. As for the two clusters described above, the number of connections is 6, that is, maximum in the former cluster. Hence, the five neurons belonging to the latter cluster are deleted (step 207). Using only the remaining neurons that are not deleted, the class coincidence count in each region is obtained again (step 202-2). For class 2, since the neurons of class 2 in the regions 212-21 and 212-22 are deleted and are therefore not counted as the class coincidence count. In this case, the class coincidence count is 2 in the region 212-11, 4 in the region 212-12, and 0 in the remaining regions. At this time, the maximum class coincidence count is 4 only in the region 212-12. Hence, the index corresponding to class 2 is (1,2) corresponding to the region 212-12. This processing corresponds to YES branch in step 204-2 and step 205.

When the same processing as that for class 2 is performed for class 3, neurons except those of class 3 in the region 212-32 and 212-33 are deleted (step 207). When the class coincidence count is obtained, the maximum class coincidence count is 4 in the regions 212-32 and 212-33 (step 202-2). In this case, (3,2) and (3,3) corresponding to these regions are determined as the indices corresponding to class 3 (steps 204-2 and 208). The average vector of the weight vectors of four neurons of class 3 in each region is obtained and subjected to the orthogonal basis calculation to obtain a template corresponding to each index (step 209). For example, a template corresponding to the index (3,2) is obtained by calculating the average vector of the weight vectors of the four neurons of class 3 in the region 212-32 and calculating the orthogonal basis of the average vector.

For class 7, even when the same processing as that for class 2 or 3 is executed, both two clusters built by 4-neighbor labeling have the maximum number of connections of 4. In this case, both clusters are left. Hence, no neurons are deleted (step 207). The class coincidence count is counted again (step 202-2). However, the result does not change from the class coincidence count previously obtained (step 202-1). That is, the maximum class coincidence count is 4 in both the regions 212-23 and 212-33, and 0 in the remaining regions. For this reason, the two indices (2,3) and (3,3) corresponding to these two regions correspond to class 7 (steps 204-2 and 208). As in the case of class 3, the average vector of the weight vectors of neurons of class 7 in each region is obtained and subjected to the orthogonal basis calculation to obtain a template corresponding to each index (step 209).

Class 4 will be explained finally. As is apparent from FIG. 21, no neuron of class 4 exists on the SOM. For this reason, the class coincidence count is 0 in all regions (step 202-1). Hence, the process advances to processing of inputting a number of orthogonal basis patterns corresponding to class 4 to the SOM (step 203). Note that a number of orthogonal basis patterns corresponding to class 4 are patterns recorded in a class 4 orthogonal basis pattern group 176-4 (not shown) in the class-specific orthogonal basis pattern group database 176. For example, assume that 1,000 orthogonal basis patterns corresponding to class 4 are sequentially input to the SOM. Processing of detecting a winner neuron corresponding to each input orthogonal basis pattern is performed (step 2010). At this time, the sum of the numbers of times a neuron in each region has been detected as a winner neuron is obtained (step 2011). Assume that as a result, the sum of the number of times of winner neuron detection in each region is as follows.

Region 212-11: 58
Region 212-21: 132
Region 212-31: 98
Region 212-12: 263 . . . maximum
Region 212-22: 263 . . . maximum
Region 212-32: 74
Region 212-13: 82
Region 212-23: 30
Region 212-33: 0

In this case, the maximum sum of the numbers of times of winner neuron detection is 263 in the two regions 212-12 and 212-22. Hence, (1,2) and (2,2) corresponding to the regions are the indices corresponding to class 4 (steps 204-2 and 208). The average of the weight vectors of all neurons in each region is obtained and subjected to the orthogonal basis calculation to obtain a template corresponding to each index (step 209). Since the sum of the numbers of times of winner neuron detection is the same and maximum in the two regions, the two indices correspond to the class, as described above. However, if, for example, the sum is 264 in the region 212-12 and 262 in the region 212-22, only the index (1,2) corresponds to class 4. Hence, in this case, it is unnecessary to obtain a template corresponding to the index.

The above-described results can be summarized as follows.

[Class]: [corresponding index]
Class 0: (2,2)
Class 1: (1,3)
Class 2: (1,2)
Class 3: (3,2), (3,3)
Class 4: (1,2), (2,2)
Class 5: (1,3)
Class 6: (1,1)
Class 7: (2,3), (3,3)
Class 8: (3,1)
Class 9: (3,2)

Since a plurality of indices correspond to each of classes 3, 4, 7, a template corresponding to each class is obtained in the above-described way, and recorded together with the corresponding indices. In this example, two kinds of indices correspond to one class at maximum. However, three or more kinds of indices may correspond. In this case as well, a template corresponding to each class is obtained, and recorded together with the corresponding indices. In the above example, there is no class corresponding to the index (2,1) corresponding to the region 212-21. This situation requires no special action, and simply prohibits element vote to a bin corresponding to the index in actual image conversion.

For the sake of simplicity, a small-scaled example has been described above. Actually, in this embodiment, a SOM including 100×100 neurons is divided into 5×5 regions, and indices corresponding to 256 classes are obtained. If a plurality of kinds of indices correspond to one class, a template corresponding to each index is obtained. A histogram (in this embodiment, a two-dimensional histogram having 5×5 bins) using the indices is used in actual image conversion. The differences from a histogram based on a normal LBP code are as follows.

First, as can be seen from the above-described example, the same index can be made to correspond to similar classes (classes mapped at closer positions on the SOM) (for example, classes 1 and 5 of the above example). Patterns of similar classes correspond to the same bin. For this reason, even when the class to which a pattern belongs varies due to a pattern variation, the same bin corresponds to the classes at high possibility, and the robustness against a variation can improve.

As in the above-described case, the number of bins of the histogram can be arbitrary and, more particularly, smaller than the number of classes. In a histogram based on a normal LBP code, the number of bins is 256. When such a histogram is used, for example, a histogram of a region of 10×10 pixels is to be obtained, the histogram becomes very coarse if the number of elements to be used to generate the histogram is small. In the histogram of this embodiment, however, the number of bins is as small as 5×5=25. Hence, a relatively dense histogram can be generated. It is not always preferable that the number of bins is small. However, in this embodiment, a histogram suitable for a problem can be generated in accordance with the number of elements to be used to generate a histogram.

Additionally, in the histogram based on the normal LBP code, one code (class) corresponds to only one bin. In the histogram of this embodiment, however, one class can correspond to a plurality of bins. In this case, a longer process time is necessary. However, if the distribution corresponding to one class on the SOM is relatively large (for example, class 3 of the above-described example), it can be divisionally expressed. This allows to generate a histogram with a higher expressive power.

Another large difference is that adjacent bins are similar in this histogram. In the histogram based on the normal LBP code, for example, even if LBP codes are adjacent, no particular association can be defined between the bins so that the bins are often handled as independent bins. In the histogram of this embodiment, however, adjacent bins are supposed to be similar, and certain association can be defined between them. An example of defining association is to apply a smoothing filter to a generated histogram on the histogram space. Applying a smoothing filter provides the same effect as that of voting to a bin while applying a weight to some extent to an adjacent bin. In this case, even when the class to which a pattern belongs varies due to a certain pattern variation, voting to an adjacent bin is also done, and the robustness can improve.

The processing of the class corresponding index determination unit 178 (step 188) according to this embodiment has been described above. The indices corresponding to all classes obtained by the class corresponding index output unit 179 are output to the outside (step 189). At this time, for a class to which a plurality of kinds of indices correspond, templates corresponding to the plurality of kinds of indices are also output. The indices corresponding to the classes and the templates corresponding to the plurality of kinds of indices, which are output here, are recorded in the class corresponding index database 155 and used in image conversion.

In this embodiment, the distribution map of each class is generated using the SOM technique, and the indices of the histogram corresponding to each class are determined based on it, and used in conversion. This enables image conversion which allows to preferably express the difference between conversion source patterns using values having dimensions lower to some extent such that, for example, similar conversion source patterns have indices at closer positions on the histogram. The number of dimensions is the number of dimensions of the histogram, and two in this case.

In this embodiment, after SOM generation, the indices of the histogram corresponding to each class are determined based on the SOM. However, a real number value corresponding to each class may be obtained from the generated SOM and used as a converted value corresponding to each class, as in the first to third embodiments. For example, the position of center of gravity is obtained for neurons corresponding to each class on the SOM. The coordinate values of the position of center of gravity may be used as the converted value corresponding to the class. Note that classification of each neuron can be done based on the weight vector of the neuron, as described above. Conversely, in the first to third embodiments, the position coordinates of each mapped class are used as a converted value corresponding to the class. These embodiments can be modified to use a multi-dimensional histogram based on each map, as in the fourth embodiment. In the fourth embodiment, since the generated SOM is a two-dimensional map, the histogram used is also a two-dimensional histogram. However, when a one- or three-dimensional SOM is generated, the histogram used can also be a one- or three-dimensional histogram.

An example of a pattern identification method will be described next, which converts a grayscale image corresponding to an extracted human face and including 20×20 pixels in the vertical and horizontal directions using the above-described image conversion method, and identifies the converted image as the face image of a specific person.

Figure 22:
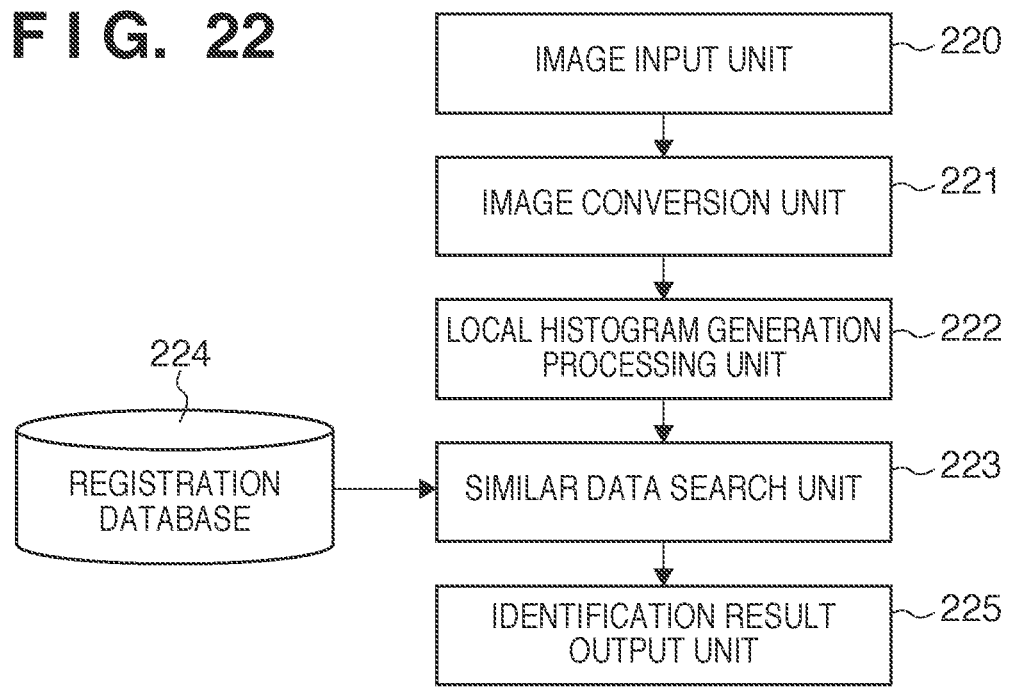
FIG. 22 is a block diagram showing the process blocks of a pattern identification method according to the fourth embodiment.
Figure 23:
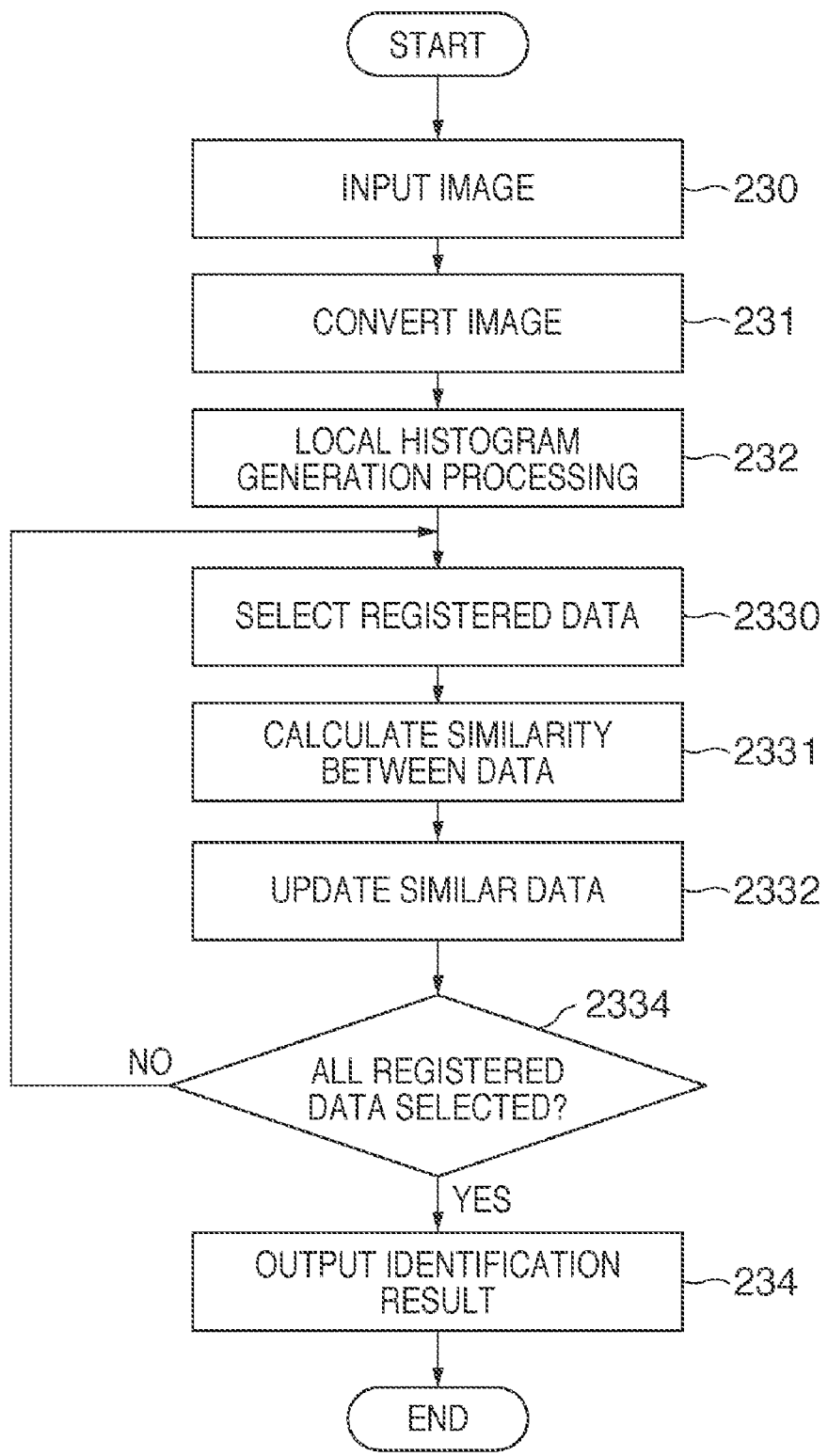
FIG. 23 is a flowchart illustrating pattern identification processing according to the fourth embodiment.

FIG. 22 is a block diagram showing the process blocks of the pattern identification method according to the fourth embodiment. FIG. 23 is a flowchart illustrating the processing procedure of the pattern identification method.

As is apparent from FIG. 22, the arrangement of the processing units of the pattern identification method according to this embodiment is also similar to the arrangement of the processing units of the pattern identification method according to each of the first to third embodiments, and the processing procedure is also the same. However, the process contents of the processing units are slightly different, and only the different parts will be described in detail.

First, an image input unit 220 inputs a grayscale image (to be simply referred to as an input image hereinafter) corresponding to an extracted human face and including 20×20 pixels in the vertical and horizontal directions (step 230).

An image conversion unit 221 converts the input image by the above-described image conversion method (step 231). In this embodiment, 18×18 pixels are selected as pixels of interest. An index of a two-dimensional histogram formed from two of integer values 1 to 5 corresponds to each pixel of interest. Hence, in this case, a converted image in which indices each formed from two of the integer values 1 to 5 are arranged in correspondence with the 18×18 pixels is obtained.

A local histogram generation processing unit 222 divides the result of 18×18 pixels converted by the image conversion unit 221 into 3×3 square regions (each region corresponds to 6×6 pixels). In each region, a two-dimensional histogram formed from 5×5 bins in the vertical and horizontal directions is generated. A spatial smoothing filter in the histogram space is applied to the two-dimensional histogram generated in each region. In this embodiment, a spatial filter having 0.6 at the center and 0.1 at its upper, lower, left, and right adjacent positions, as shown in FIG. 24A, is convoluted to apply a smoothing filter to the two-dimensional histogram. For example, simply assume that a two-dimensional histogram is generated in one region (a region formed from 6×6 pixels), and a two-dimensional histogram as shown in FIG. 24B is obtained. FIG. 24B shows a two-dimensional histogram including 5×5 bins and representing the number of votes in each bin. Upon convoluting using the filter, the edge portions of the two-dimensional histogram are expanded as shown in FIG. 24C. This expansion may be truncated. In this embodiment, however, the expansion is also included so that the histogram is regarded to have a total of 45 bins (in this case, the sum of the numerical values in the bins, which corresponds to 6×6=36 pixels, does not change). The local histogram generation processing unit 222 performs the processing of obtaining the histogram including 45 bins after application of the smoothing filter in each of the 3×3 divided square regions (step 232). A histogram group formed from a total of nine histograms (=one set) is thus obtained.

After the end of the processing of the local histogram generation processing unit 222, the process advances to processing of a similar data search unit 223. A registration database 224 holds, as the data of registered persons, histogram groups each corresponding to one registered person as one set. The similar data search unit 223 searches the data of the registered persons held in the registration database 224 for data nearest to the generated histogram group, and obtains the similarity to the data. The data of the registered persons are generated using at least one grayscale image corresponding to an extracted face per registered person. More specifically, the processing from the image input unit 220 to the local histogram generation processing unit 222 is executed for each image to generate one set of histogram group (nine histograms) per image. The histograms corresponding to each region are averaged to generate one set of histogram group formed from nine histograms. Upon averaging, for example, when 10 images are used, 10 histograms generated from the same region are averaged in each of the nine regions. A thus generated set of histograms are used as the data of a registered person. The registration database 224 records such an averaged histogram group of nine histograms corresponding to each registered person, and a label representing the person.

In the processing of the similar data search unit 223, first, one of the recorded histogram sets each including nine histograms from the registration database 224 (step 2330). The similarity between the selected set of histograms and one set of histograms generated by causing the local histogram generation processing unit 222 to process the input image is obtained (step 2331). The similarity between histograms can be obtained by any method. In this embodiment, the similarity is obtained using the Histogram Intersection method of reference 14.

More specifically, the Histogram Intersection of reference 14 is obtained between the nine corresponding histograms, and the sum of the nine Histogram Intersections is obtained as the similarity between one set of histograms.

If the obtained similarity is higher than that obtained so far, the similarity data is updated using the obtained similarity and the label of the person corresponding to the set of histograms selected from the registration database 224 at that time (step 2332). These processes are executed for all data recorded in the registration database 224. If unselected registered data remains, the process returns to step 2330. If all registered data have been selected and processed, the process advances to the next processing (step 2334).

Finally, an identification result output unit 225 outputs, based on the processing result from the similar data search unit 223, an identification result representing the person corresponding to the input image. In this case, final determination is performed based on the label corresponding to data with the highest similarity in the registration database 224, the highest similarity, and a predetermined threshold, and the result is output to the outside as the identification result, as in the first embodiment (step 234).

The processing from the image input unit 220 to the identification result output unit 225 enables to convert a grayscale image corresponding to an extracted human face and identify the converted image as the face image of a specific person. That is, according to this embodiment, conversion robust against a variation in brightness or the like (invariable against variations in brightness and contrast, like LBP) is performed. This conversion makes it possible to identify the image as the face image of a specific person robustly against a variation in brightness or the like of the input image. If 3×3 pixel patterns as the conversion sources are similar, almost similar corresponding indices are obtained using the image conversion method of this embodiment. For this reason, recognition can be done robustly not only against a variation in brightness or contrast but also against, for example, a variation in the size of the input image.

In this embodiment, an example has been described in which a converted image is used and divided into regions, histograms are generated in each region, and pattern identification is performed based on Histogram Intersections in each region. However, the pattern identification processing may be performed using, for example, another method such as Earth Mover's Distance of reference 15 for comparison of histograms.

In the fourth embodiment, an example of a method of converting a grayscale image corresponding to an extracted human face robustly against a variation in brightness or the like has been described. An example of a pattern identification method of identifying the converted image as the face image of a specific person has also been described.

Fifth Embodiment

In the fifth embodiment, an example in which the present invention is applied to the vector quantization technique will be described as a modification of the image conversion methods described in the first to fourth embodiments. In the fifth embodiment as well, an example of a pattern identification method will be described, which converts a grayscale image corresponding to an extracted human face, and identifies the converted image as the face image of a specific person, as in the first to fourth embodiments.

In the first to fourth embodiments, classification by a criterion as in LBP or CT is performed using pixel value patterns at a plurality of positions which are determined by the position of the pixel of interest. The pixel value patterns are then converted into a converted value (or index) obtained in advance. The classification by a criterion as in LBP or CT used in the first to fourth embodiments can be regarded as a kind of vector quantization in a broad sense of classifying a plurality of pixel value patterns, that is, multi-dimensional vector values into several classes. In this embodiment, the classification method of the first to fourth embodiments is modified to a classification method for vector quantization so as to demonstrate that the method is also applicable to the vector quantization technique.

FIG. 2 is a block diagram showing the process blocks of an image conversion method according to the fifth embodiment. The processing procedure of the image conversion method according to this embodiment is the same as that of the first embodiment shown in FIG. 4. As can be seen from the arrangement of the processing units shown in FIG. 2, the fundamental processing procedure of the image conversion method of this embodiment is the same as in the first embodiment. However, the process contents of a classification processing unit 263 are different. A representative vector database 268 which records data to be used by the classification processing unit 263 is added. In addition, converted values corresponding to classes are different. The differences from the first embodiment will be explained below in detail.

Processes from an image input unit 260 to a neighboring pattern extraction unit 262 (steps 40 to 42) are the same as in the first embodiment, and a description thereof will not be repeated. With the processing up to this point, one pixel of interest is selected, and a 3×3 pixel pattern having the pixel of interest at the center is extracted.

In the first embodiment, after the extraction of the 3×3 pixel pattern, the pattern is classified by the same criterion as in LBP. In the fifth embodiment, first, the classification processing unit 263 obtains the similarity between the extracted 3×3 pixel pattern and each of a plurality of representative vectors recorded in advance in the representative vector database 268. The extracted 3×3 pixel pattern is classified as a class corresponding to the representative vector with the highest similarity. The plurality of representative vectors recorded in the representative vector database 268 are a plurality of 3×3=nine-dimensional vectors obtained upon learning of vector quantization in advance, and this will be described later in detail. Each representative vector is recorded in the representative vector database 268 together with a corresponding class number. In this embodiment, a total of 100 representative vectors are obtained upon learning of vector quantization to be described later. For this reason, the representative vector database 268 records class numbers 0 to 99 corresponding to the 100 representative vectors. The similarity between each representative vector and the extracted 3×3 pixel pattern is obtained by a criterion similar to the mutual subspace method described in the fourth embodiment. In the fourth embodiment, variations in brightness and contrast are taken into consideration. In the fifth embodiment, however, the similarity is obtained in consideration of a primary luminance gradient variation in an arbitrary direction of the 3×3 pixel pattern as well.

Figure 12A:
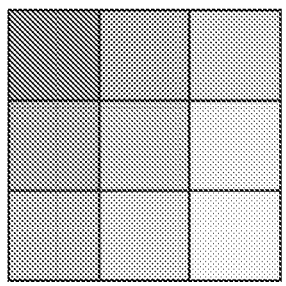
FIGS. 12A to 12D are views showing primary luminance gradient variation components in arbitrary directions and two basis patterns.
Figure 12B:
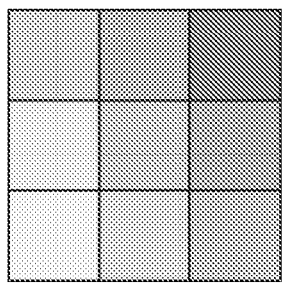
Figure 12C:
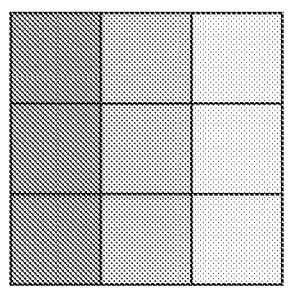
Figure 12D:
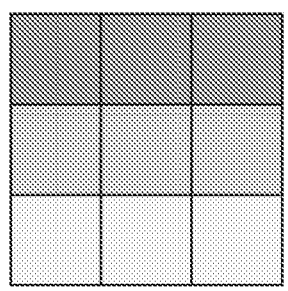

The primary luminance gradient variation in an arbitrary direction is, for example, a variation that applies a component having a predetermined gradient in a direction to the pattern, as shown in FIG. 12A or 12B. FIG. 12A shows a pattern having a predetermined luminance gradient in a direction rotated from the horizontal direction to the lower right by arctan(¾). FIG. 12B shows a pattern having a predetermined luminance gradient in a direction rotated from the horizontal direction to the lower left by arctan(5/12). The patterns shown in FIGS. 12A and 12B can be expressed by the linear sums in FIGS. 12C and 12D, although a detailed description thereof will be omitted. For this reason, when not only the brightness and contrast but also the primary luminance gradient in an variation in brightness or contrast is arbitrarily changed in a pattern x, the resultant pattern can be represented by ax+b1+ch+dv where a is an arbitrary positive real number and b, c, and d are arbitrary real numbers. In this case, h is a 3×3=nine-dimensional vector corresponding to the pattern shown in FIG. 12C, and h=$(-1/\sqrt{6}, 0, 1/\sqrt{6}, -1/\sqrt{6}, 0, 1/\sqrt{6}, -1/\sqrt{6}, 0, 1/\sqrt{6},)^T$. Similarly, v is a nine-dimensional vector corresponding to the pattern shown in FIG. 12D, and v=$(-1/\sqrt{6}, -1/\sqrt{6}, -1/\sqrt{6}, 0, 0, 0, 1/\sqrt{6}, 1/\sqrt{6}, 1/\sqrt{6})^T$. In the expression ax+b1+ch+dv, a and b correspond to the variations in brightness and contrast, and c and d correspond to the direction of luminance gradient and the strength of the gradient.

As in the fourth embodiment, assume that a ($>0$) or b, c, and d of ax+b1+ch+dv are arbitrary changed. In this case, ax+b1+ch+dv represents a four-dimensional subspace in the nine-dimensional space (the subspace is a half space because a$>0$). As in the fourth embodiment, when obtaining the similarity between patterns, the similarity between such four-dimensional subspaces is obtained. This makes it possible to obtain similarity invariable not only against a variation in brightness or contrast but also against the above-described luminance gradient variation. As the similarity between subspaces, the canonical angle of the subspaces is used, as in the mutual subspace method of reference 12. The four-dimensional subspaces have four canonical angles (first to fourth canonical angles). The fourth canonical angle is used as the similarity between patterns. This is because two patterns whose similarity is to be obtained exhibit the same variation in brightness that is, in the direction of 1 and the same variation in luminance gradient, that is, in the direction represented by the linear sum of h and v independently of the types of the patterns, as in the fourth embodiment. Hence, the first to third canonical angles are always 0.

As in the fourth embodiment, since the first to third canonical angles are self-evident, and only one canonical angle remains, the cosine of the fourth canonical angle is obtained by a simple method to be described below.

First, four orthonormal bases of the four-dimensional subspace are obtained using the Gram-Schmidt orthogonalization process of reference 13, as in the fourth embodiment. At this time, bases $u_1$, $u_2$, and $u_3$ are defined as normal bases in the directions of variations, that is, the directions of vector 1, h, and v which are common to an arbitrary pattern. That is, the basis $u_1$ is defined as 1/|1|, the basis $u_2$ as h, and the basis $u_3$ as v. The three bases are obviously perpendicular to each other. In addition, h and v are already normalized. Hence, these bases are directly used as orthonormal bases.

In this case, using the Gram-Schmidt orthogonalization process, an orthonormal basis $u_4$ for the pattern x is obtained by $$u_4 = \frac{x - \sum_{i=1}^{3}(u_i^T x) \cdot u_i}{\left| x - \sum_{i=1}^{3}(u_i^T x) \cdot u_i \right|} \quad (6)$$

The orthonormal basis $u_4$ is the orthogonal basis pattern corresponding to the pattern x in this embodiment. The processing of converting the pattern x into $u_4$ using equation (6) is defined as orthogonal basis calculation according to this embodiment. At this time, the cosine of the fourth canonical angle between the two patterns is obtained by calculating the inner product of the orthogonal basis pattern $u_4$ and each pattern, as in the fourth embodiment. As in the fourth embodiment, in a special case in which x=b1+ch+dv, the orthogonal basis pattern is obtained as a nine-dimensional vector whose all elements are 0. If x=b1+ch+dv in both patterns, the similarity is set to 1.

The pattern similarity of this embodiment is obtained basically in accordance with the above-described method by calculating the orthogonal bases of both patterns using equation (6) and calculating the inner product between them. The classification processing unit 263 also uses the above-described method. However, the classification processing unit 263 basically needs to determine only the level relationship between the similarities, as described above. In addition, the representative vector database 268 records representative vectors which have undergone the orthogonal basis calculation in advance, as will be described later. For these reasons, the classification processing unit 263 need not perform the orthogonal basis calculation of the extracted 3×3 pixel pattern. It is only necessary to simply calculate the inner product between the pattern and each representative vector and compare the values. The relationship does not change depending on the presence/absence of orthogonal basis calculation, as in template comparison of the fourth embodiment. Hence, the classification processing unit 263 first obtains the inner product between the extracted 3×3 pixel pattern and each of the 100 representative vectors recorded in the representative vector database 268. A class number corresponding to the representative vector with the maximum inner product is read out from the representative vector database 268, and the extracted 3×3 pixel pattern is classified as a class corresponding to the readout class number (step 43).

Processing from a converted value assignment unit 264 to a converted image output unit 267 is almost the same as that from the converted value assignment unit 14 to the converted image output unit 17 in the first embodiment, and a detailed description thereof will not be repeated.

The converted value assignment unit 264 refers to a class corresponding converted value database 265, and reads out a value corresponding to the determined class as a converted value corresponding to the selected pixel of interest (step 44). In this embodiment, the pattern is classified as one of classes 0 to 99. The class corresponding converted value database 265 referred here records a two-dimensional vector value formed from two numerical values in correspondence with each class. The two-dimensional vector values are defined in advance based on the mutual relationship between the classes, as in the first embodiment. How to determine the two-dimensional vector values will be described later in detail.

After the converted value assignment unit 264 has obtained the converted value, a converted image holding unit 266 records and holds the converted value that is a two-dimensional vector value as the converted value corresponding to the pixel of interest selected by the pixel-of-interest selection unit 261 (step 45).

With the above-described processing, the converted value that is a two-dimensional vector value is obtained in correspondence with the selected pixel of interest and recorded in the converted image holding unit 266. Such converted values are obtained for 18×18 pixels, as in the first embodiment. If an unselected pixel remains, the process returns to the processing of the pixel-of-interest selection unit 261. If all the 18×18 pixels have been selected and processed, the process advances to the next processing (step 46).

Converted values that are two-dimensional vector values are thus obtained for all the 18×18 pixels, and recorded in the converted image holding unit 266. Finally, the converted image output unit 267 outputs the result recorded in the converted image holding unit 266 to the outside (step 47). The image conversion processing is thus completed. With the above-described processing, an image in which two-dimensional vector values obtained for the pixels of interest are arranged in correspondence with the 18×18 pixels is output to the outside, as in the first embodiment.

Figure 9:
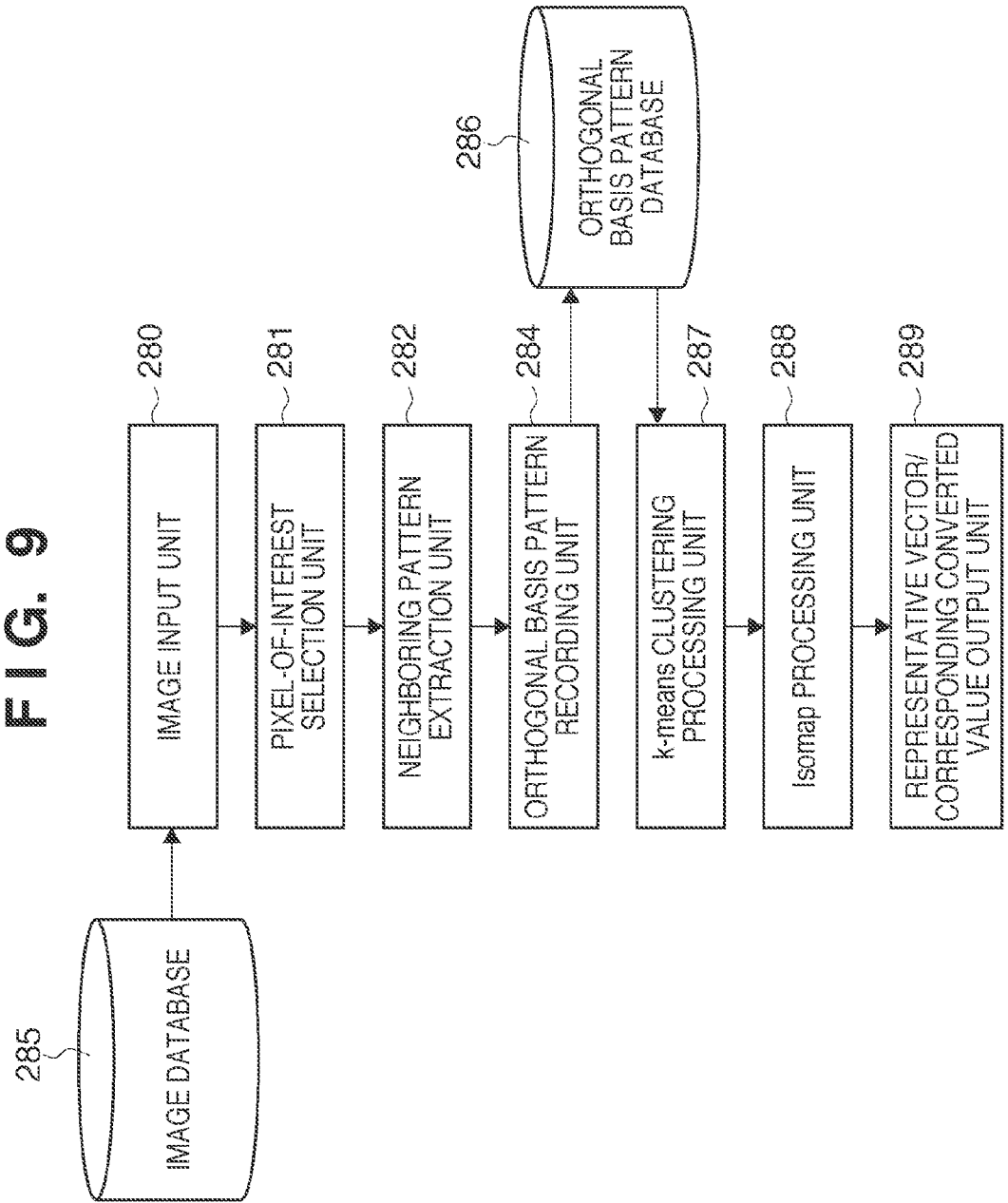
FIG. 9 is a block diagram showing the process blocks of a method of obtaining converted values corresponding to classes according to the fifth embodiment.
Figure 10:
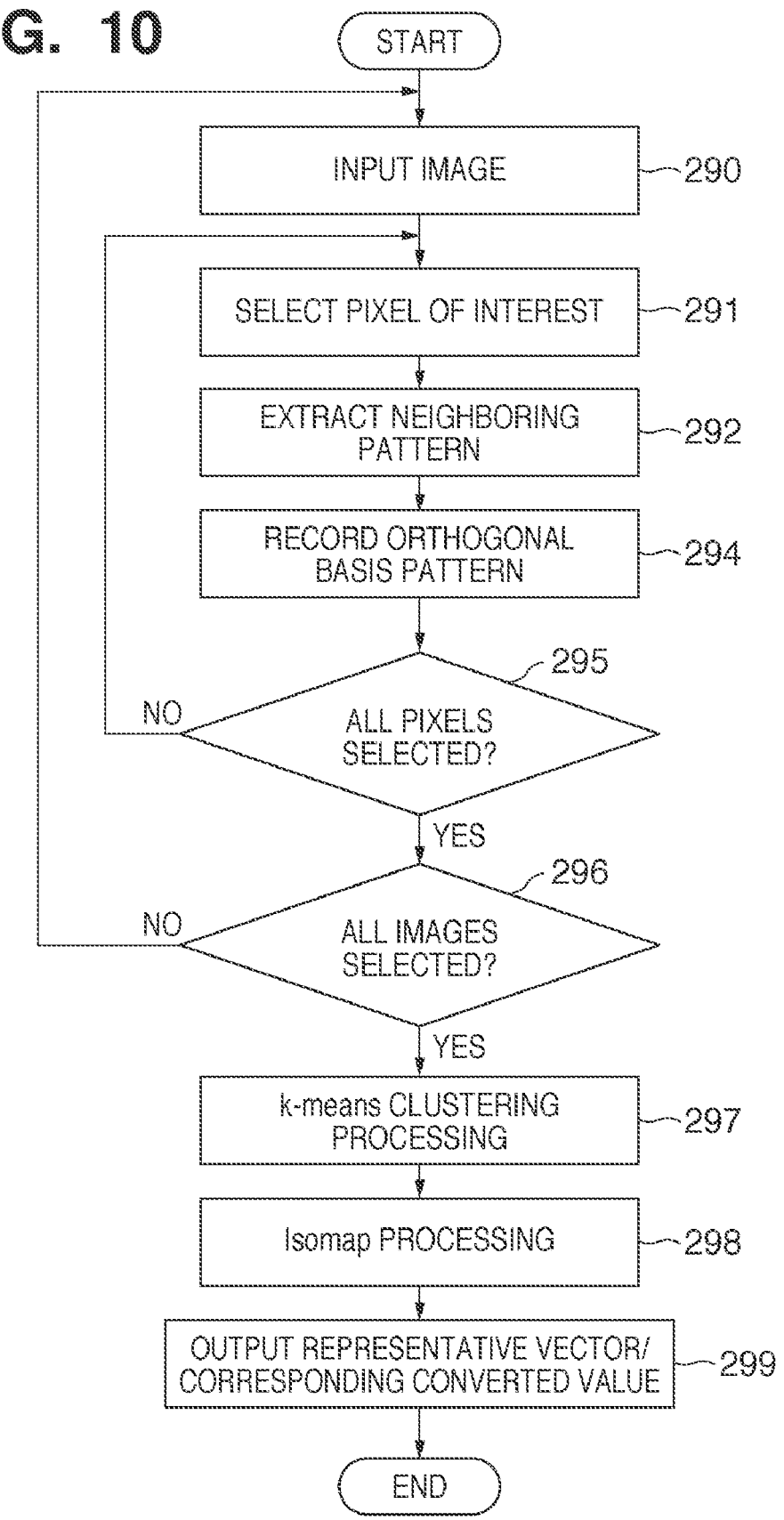
FIG. 10 is a flowchart illustrating processing of a method of obtaining representative vectors and converted values corresponding to classes based on the mutual relationship between classes corresponding to the representative vectors according to the fifth embodiment.

How to obtain representative vectors and converted values corresponding to classes, which are important in this embodiment, will be explained next. FIG. 9 is a block diagram showing the process blocks of a method of obtaining representative vectors and converted values corresponding to classes according to this embodiment. FIG. 10 is a flowchart illustrating the processing procedure of the method of obtaining the representative vectors and the converted values.

First, an image input unit 280 selectively inputs one of a number of grayscale images held in an image database 285 (step 290). As in the fourth embodiment, an arbitrary grayscale image which has not undergone normalization of brightness and the like is input. As for the image size, an image including 640×480 pixels is used as the input image as in the fourth embodiment. Such an arbitrary grayscale image is used to raise the applicability to a pattern identification method for various kinds of images.

A pixel-of-interest selection unit 281 and a neighboring pattern extraction unit 282 of the succeeding stages are the same as the pixel-of-interest selection unit 261 and the neighboring pattern extraction unit 262 described above. The only difference is that the size of the input image is 20×20 pixels or 640×480 pixels, as in the fourth embodiment. That is, the pixel-of-interest selection unit 281 sequentially selects pixels of interest for a total of 638×478=304,964 pixels except one pixel line of each of the upper, lower, left, and right edges of the input image, and the neighboring pattern extraction unit 282 extracts a 3×3 pixel pattern with each selected pixel of interest at the center (steps 291 and 292). In the first embodiment, the extracted pattern is classified. In the fifth embodiment, however, since the representative vectors to be used for classification are not defined yet, the same classification as in the first embodiment is impossible. In the fifth embodiment, the process advances to the processing of an orthogonal basis pattern recording unit 284 of the succeeding stage without classifying the extracted pattern.

The orthogonal basis pattern recording unit 284 first calculates the orthogonal basis of the extracted 3×3 pixel pattern using equation (6), and records the orthogonal basis in an orthogonal basis pattern database 286. Since the orthogonal basis pattern is a nine-dimensional pattern, it is recorded as the sequence of nine numerical values, as in the fourth embodiment (step 294).

The processing in steps 291 to 294 is executed for a total of 638×478=304,964 pixels to be selected as pixels of interest in an image input in step 290, as in the fourth embodiment. If a pixel unselected as a pixel of interest remains, the process returns to the processing of the pixel-of-interest selection unit 281. If all the 304,964 pixels have been selected and processed, the process advances to the next processing (step 295).

With the above-described processing, 304,964 orthogonal basis patterns per image are recorded in the orthogonal basis pattern database 286. This processing is executed for all images held in the image database 285, as in the first embodiment. If an uninput image remains, the process returns to the processing of the image input unit 280. If all images have been input and processed, the process advances to the next processing (step 296).

In this embodiment, 100 images are used as the input images, as in the fourth embodiment. When 304,964 orthogonal basis patterns are extracted from each image, a total of 100×304,964=30,496,400 orthogonal basis patterns are recorded in the orthogonal basis pattern database 286.

Next, using the k-means clustering method of reference 16, a k-means clustering processing unit 287 performs clustering of a number of orthogonal basis patterns recorded in the orthogonal basis pattern database 286.

A plurality of clusters after the clustering correspond to each class. One representative vector corresponds to each class, as described above. In this embodiment, an orthogonal basis of the average of orthogonal basis patterns belonging to each cluster is used as a representative vector.

In the k-means clustering, each data is compared with the average vector of temporary clusters during execution of clustering. The comparison is generally done using an Euclidean distance or Mahalanobis distance. In this embodiment, however, the similarity between patterns similar to the above-described mutual subspace method is used. More specifically, when executing clustering, the inner product between each orthogonal basis pattern and an orthogonal basis of the average vector of temporary clusters (to be referred to as an orthogonal basis cluster mean hereinafter) is obtained. Clustering is executed based on the thus obtained inner products.

The k-means clustering processing unit 287 first selects a plurality of orthogonal basis patterns at random from a number of orthogonal basis patterns recorded in the orthogonal basis pattern database 286. In this embodiment, since the number of classes is 100, 100 orthogonal basis patterns are selected at random. The 100 selected orthogonal basis patterns have already undergone the orthogonal basis calculation and are therefore directly used as the initial orthogonal basis cluster mean.

Next, for each of the all orthogonal basis patterns recorded in the orthogonal basis pattern database 286, one of the 100 clusters to which the orthogonal basis pattern belongs is determined. More specifically, the inner product between each orthogonal basis pattern and each of the 100 orthogonal basis cluster means is obtained. An orthogonal basis pattern is determined to belong to a cluster corresponding to an orthogonal basis cluster mean with the maximum inner product.

Subsequently, for each of the 100 clusters, the average of all orthogonal basis patterns determined to belong to the cluster is obtained and subjected to the orthogonal basis calculation. The obtained orthogonal basis is defined as a new orthogonal basis cluster mean corresponding to the cluster. Note that since the orthogonal basis patterns have already undergone the orthogonal basis calculation, normalization to make the size to 1 is performed here as the orthogonal basis calculation.

Using the 100 newly obtained orthogonal basis cluster means, one of the 100 clusters to which each of the orthogonal basis patterns belongs is determined again by the above-described method. Similarly, 100 new orthogonal basis cluster means are obtained based on the determination result. This processing is repeatedly executed. If all the 100 newly obtained orthogonal basis cluster means coincide with the 100 immediately preceding orthogonal basis cluster means, the repetitive processing ends. The 100 finally obtained orthogonal basis cluster means are defined as the representative vectors corresponding to the 100 classes. The class numbers 0 to 99 are added to the representative vectors in an appropriate order. The obtained representative vectors and the class numbers corresponding to them are recorded in the representative vector database 268 and used in image conversion. The processing of the k-means clustering processing unit 287 thus ends (step 297).

In this embodiment, as described above, clustering is performed by a method based on the k-means clustering method of reference 16. However, for example, spectral clustering described in reference 17 or the like may be used.

The representative vectors corresponding to the classes are obtained by the processing up to the k-means clustering processing unit 287. The method of obtaining converted values corresponding to the classes based on the mutual relationship between the classes corresponding to the representative vectors will be described next.

After the end of the processing of the k-means clustering processing unit 287, the process advances to the processing of an Isomap processing unit 288. The Isomap processing unit 288 maps the 100 obtained representative vector data on a target space having predetermined dimensions using Isomap of reference 10 used in the third embodiment. That is, position coordinates of points corresponding to the classes are obtained on the target space with predetermined dimensions. In the third embodiment, the inter-class distances are obtained by the group average method, and the Isomap processing is performed using the obtained inter-class distances. In the fifth embodiment, however, the Euclidean distances between the representative vectors are simply used as the inter-class distances. Except this point, the processing of the Isomap processing unit 288 is the same as that of the Isomap processing unit 138 of the third embodiment, and a detailed description thereof will not be repeated. In this embodiment, the target space is a two-dimensional space. However, the number of dimensions is not limited to two. The number of dimensions is preferably determined using Cross Validation.

With the processing of the Isomap processing unit 288, position coordinates on the target space are obtained in correspondence with the 100 classes (step 298). In this embodiment, since the number of dimensions of the target space is two, the position coordinates are expressed by two numerical values. Position coordinates for each class indicate the converted value of a two-dimensional vector value corresponding to each class. In this embodiment, the points corresponding to the classes are mapped using Isomap. However, the present invention is not limited to this. For example, MDS of reference 5 may be used in place of Isomap. Mapping for dimension reduction may be done simply using PCA or using nonlinear principal component analysis. Alternatively, various methods such as Locally Linear Embedding of reference 18 and Locality Preserving Projections of reference 19 are usable for this mapping.

In this embodiment, the distances between the classes are defined based on the distances between the representative vectors. For example, the distances between the classes may be defined by the cluster analysis method as in the first embodiment using pattern groups classified as the respective classes.

Finally, a representative vector/corresponding converted value output unit 289 outputs, to the outside, the obtained representative vectors (added with the class numbers) corresponding to the 100 classes and the two-dimensional coordinate values corresponding to the classes. The processing of obtaining the representative vectors and the converted values corresponding to the classes thus ends (step 299). The output representative vectors corresponding to the 100 classes and the two-dimensional coordinate values corresponding to the classes are held in the representative vector database 268 and the class corresponding converted value database 265, respectively, and used in image conversion.

As described above, according to this embodiment, the representative vectors to be used for classification are first obtained by clustering processing of a number of patterns. The distances between the classes (the mutual relationship between the classes) are obtained using the representative vectors corresponding to the classes. The converted values corresponding to the classes are determined based on the distances. This enables image conversion which allows converted values having dimensions lower to some extent to preferably express the difference between conversion source patterns, as in the first embodiment.

An example of a pattern identification method will be explained next, which converts a grayscale image corresponding to an extracted human face using the above-described image conversion method, and identifies the converted image as the face image of a specific person.

The arrangement of processing units of the pattern identification method according to this embodiment is the same as that of the first embodiment shown in FIG. 5. The processing procedure is also the same as in FIG. 6. The process contents of the processing units are also almost the same as in the first embodiment and will briefly be described.

First, an image input unit 50 inputs a grayscale image (input image) corresponding to an extracted human face and including 20×20 pixels in the vertical and horizontal directions (step 60).

An image conversion unit 51 converts the input image using the image conversion method, thereby obtaining a converted image in which two-dimensional vector values are arranged in correspondence with 18×18 pixels (step 61).

A dimension reduction-processing unit 52 reduces the number of dimensions of the converted image by regarding it as an 18×18×2=648-dimensional vector.

A nearest neighbor search unit 53 searches the data of registered persons held in a registration database 54 for data nearest to the dimension-reduced data (steps 630 to 634).

Finally, an identification result output unit 55 outputs, based on the search result, an identification result representing the person corresponding to the input image (step 64). In this case as well, final determination is performed based on the label obtained by the search in correspondence with data with the minimum Euclidean distance and the distance, and the result is output to the outside.

The above-described processing enables to convert a grayscale image corresponding to an extracted human face using the image conversion method of this embodiment and identify the converted image as the face image of a specific person. According to this embodiment, conversion robust against a variation in brightness or the like (in this embodiment, invariable not only against a variation in brightness or contrast but also against a primary luminance gradient variation in an arbitrary direction) is performed. Performing image conversion using the image conversion method of this embodiment in advance makes it possible to identify an input image as the face image of a specific person robustly against a variation in brightness or the like. When this embodiment is used, almost similar converted values are obtained even if a pattern slightly varies, as in the first embodiment. For this reason, recognition can be done robustly not only against a variation in brightness or contrast but also against, for example, a slight variation in the position of the input image because the converted value rarely changes largely.

As the pattern identification method of this embodiment as well, an example of pattern identification of a converted image using dimension reduction by PCA and the so-called nearest neighbor method has been described, as in the first embodiment. However, the present invention is not limited to this. For example, the pattern identification processing may be done using a neural network or SVM.

In the fifth embodiment, an example in which the present invention is applied to the vector quantization technique has been described above. An example of a pattern identification method of identifying a converted image as the face image of a specific person robustly against a variation in brightness or the like has been described.

In all the above embodiments, processing for an extracted face image has been described as an example. However, the present invention is applicable to any kind of image such as a scenic image or a handwritten character image. The present invention is applicable not only to a two-dimensional image but also to, for example, three-dimensional volume data or moving image data of an image extended in the time-axis direction. For example, the present invention is also applicable to a method of performing classification based on comparison with adjacent data not only in the spatial direction but also in the temporal direction, like VLBP of reference 20, if it is possible to define the mutual relationship between the classes to be classified.

Even when the present invention is applied to vector quantization, image data is not particularly limited to two-dimensional image data. The present invention is also applicable to volume data or moving image data.

As described above, according to the present invention, it is possible to allow converted values having dimensions lower to some extent to preferably express the difference between conversion source patterns in image conversion using LBP or vector quantization.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-152870, filed Jun. 26, 2009, which is hereby incorporated by reference herein in its entirety.

What is claimed is:

1. An image conversion method comprising:
    a setting step of setting a value as a converted value corresponding to each of a plurality of classes, wherein the converted value corresponding to each of the plurality of classes is determined so as to preserve a distance or similarity between classes of pixel patterns each formed from a pixel classified as one of the plurality of classes and peripheral pixels;
    a selection step of sequentially selecting a pixel of interest from an input image;
    a classification step of classifying the selected pixel of interest as one of the plurality of classes in accordance with a neighboring pattern obtained based on a relationship between a value of the pixel of interest and values of peripheral pixels located at predetermined relative positions with respect to the pixel of interest; and
    a conversion step of converting the value of the pixel of interest into a converted value set for a class to which the pixel of interest has been classified in the classification step, wherein at least one of the steps is performed by a processor.

2. The method according to claim 1, wherein the peripheral pixels are a plurality of pixels adjacent to the pixel of interest.

3. The method according to claim 1, wherein the peripheral pixels are a plurality of pixels located at positions spaced apart from the pixel of interest by a predetermined distance.

4. The method according to claim 1, wherein, in the classification step, the neighboring pattern is acquired based on a result of comparison between a pixel value of the pixel of interest and pixel values of the peripheral pixels.

5. The method according to claim 4, wherein, in the setting step, the converted value corresponding to each of the plurality of classes is set so as to preserve a distance or similarity between neighboring patterns for a pixel of interest classified as one of the plurality of classes and peripheral pixels.

6. The method according to claim 1, wherein, in the classification step, a distance or similarity between the neighboring pattern and a representative pattern of each of the plurality of classes is obtained, and the pixel of interest is classified as one of the plurality of classes based on the distance or similarity.

7. The method according to claim 6, wherein, in the setting step, the converted value is set so as to preserve a distance or similarity between the representative patterns of the plurality of classes.

8. The method according to claim 7, wherein the representative pattern is a representative vector obtained by vector quantization of a plurality of pattern sample groups each prepared in advance and classified as one of the plurality of classes.

9. The method according to claim 8, wherein the converted value is a vector value, and a dimension of the vector value is lower than that of the representative vector.

10. A non-transitory storage medium storing a program which causes a computer to execute an image conversion method of claim 1.

11. An image conversion apparatus comprising:
    a setting unit configured to set a value as a converted value corresponding to each of a plurality of classes, wherein the converted value corresponding to each of a plurality of classes is determined so as to preserve a distance or similarity between classes of pixel patterns each formed from a pixel classified as one of the plurality of classes and peripheral pixels;
a selection unit configured to sequentially select a pixel of interest from an input image;
a classification unit configured to classify the selected pixel of interest as one of the plurality of classes in accordance with a neighboring pattern obtained based on a relationship between a value of the pixel of interest and values of peripheral pixels located at predetermined relative positions with respect to the pixel of interest; and
a conversion unit configured to convert the value of the pixel of interest into a converted value set for a class to which the pixel of interest has been classified by said classification unit.

* * * * *